(12) United States Patent
Tateishi et al.

(10) Patent No.: US 8,641,785 B2
(45) Date of Patent: Feb. 4, 2014

(54) AQUEOUS PIGMENT DISPERSION AND AQUEOUS INK FOR INKJET RECORDING

(75) Inventors: Keiichi Tateishi, Kanagawa (JP); Hiroshi Yamamoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 47 days.

(21) Appl. No.: 13/394,164

(22) PCT Filed: Sep. 2, 2010

(86) PCT No.: PCT/JP2010/065076
§ 371 (c)(1),
(2), (4) Date: Mar. 5, 2012

(87) PCT Pub. No.: WO2011/027844
PCT Pub. Date: Mar. 10, 2011

(65) Prior Publication Data
US 2012/0165437 A1    Jun. 28, 2012

(30) Foreign Application Priority Data

Sep. 4, 2009  (JP) .................................. 2009-205359
Sep. 2, 2010  (JP) .................................. 2010-197182

(51) Int. Cl.
C09B 67/00   (2006.01)
C09B 31/00   (2006.01)

(52) U.S. Cl.
USPC ............. 8/637.1; 8/639; 8/662; 8/688; 8/690; 8/692; 8/693; 534/680; 106/31.13

(58) Field of Classification Search
USPC .......... 8/637.1, 639, 662, 688, 690, 692, 682; 534/680; 106/31.13
See application file for complete search history.

(56) References Cited

U.S. PATENT DOCUMENTS

| | | | |
|---|---|---|---|
| 2,936,306 A | 5/1960 | Schmid et al. | |
| 4,579,949 A | 4/1986 | Rochat et al. | |
| 4,685,934 A | 8/1987 | Benguerel et al. | |
| 4,870,164 A | 9/1989 | Kuhne et al. | |
| 4,935,502 A | 6/1990 | Kuhne et al. | |
| 5,194,088 A | 3/1993 | Babler et al. | |
| 5,484,943 A | 1/1996 | Zambounis et al. | |
| 5,591,865 A | 1/1997 | Hao et al. | |
| 5,616,725 A | 4/1997 | Zambounis et al. | |
| 5,646,299 A | 7/1997 | Hao et al. | |
| 5,650,520 A | 7/1997 | Hao et al. | |
| 5,910,577 A | 6/1999 | Metz et al. | |
| 7,125,446 B2 | 10/2006 | Potenza et al. | |
| 8,062,383 B2* | 11/2011 | Tateishi | 8/637.1 |
| 8,080,067 B2* | 12/2011 | Tateishi et al. | 8/637.1 |
| 8,118,885 B2* | 2/2012 | Tateishi et al. | 8/637.1 |
| 2003/0213405 A1 | 11/2003 | Harada et al. | |
| 2006/0016368 A1 | 1/2006 | Ozawa et al. | |
| 2006/0167236 A1 | 7/2006 | Schupp et al. | |
| 2008/0058531 A1 | 3/2008 | Schmidt et al. | |
| 2008/0199615 A1 | 8/2008 | Harada et al. | |
| 2008/0274283 A1 | 11/2008 | Tateishi et al. | |
| 2010/0160504 A1 | 6/2010 | Morimoto et al. | |
| 2011/0300344 A1 | 12/2011 | Tateishi | |

FOREIGN PATENT DOCUMENTS

| | | |
|---|---|---|
| EP | 2045300 A1 | 4/2009 |
| EP | 2474575 A1 | 7/2012 |
| EP | 2474581 A1 | 7/2012 |
| JP | 56-38354 A | 4/1981 |
| JP | 58-210084 A | 12/1983 |
| JP | 61-36362 A | 2/1986 |
| JP | 5-222314 A | 8/1993 |
| JP | 8-48908 A | 2/1996 |
| JP | 11-100519 A | 4/1999 |
| JP | 2003-238854 A | 8/2003 |
| JP | 2003-277662 A | 10/2003 |
| JP | 2005-535738 A | 11/2005 |
| JP | 2007-63520 A | 3/2007 |
| JP | 4073453 B2 | 2/2008 |
| JP | 2008-231178 A | 10/2008 |
| JP | 2010-65212 A | 3/2010 |
| JP | 2010-168577 A | 8/2010 |
| WO | 2009005137 A2 | 1/2009 |

OTHER PUBLICATIONS

International Search Report (PCT/ISA/210) dated Nov. 2, 2010, issued in International Application No. PCT/JP2010/065076.
Written Opinion (PCT/ISA/237) dated Nov. 2, 2010, issued in International Application No. PCT/JP2010/065076.
Search Report, dated Oct. 11, 2013, issued by the European Patent Office, in counterpart Application No. 10813792.8.

\* cited by examiner

*Primary Examiner* — Robert D. Harlan
(74) *Attorney, Agent, or Firm* — Sughrue Mion, PLLC

(57) ABSTRACT

An aqueous pigment dispersion containing A and B, wherein A is an azo pigment, an example of which is shown below, and in a crystal form having at least one characteristic peak at Bragg angles (2θ) of 5 to 15° and 20 to 30° in X-ray diffraction with characteristic Cu Kα line, a tautomer, a salt or hydrate thereof; and B is a vinyl polymer containing a specific structural unit, a structural unit derived from a salt-forming group-containing monomer (a), and a structural unit derived from a monomer selected from a styrene series macromer (b) and a hydrophobic monomer (c), provided that the water-insoluble vinyl polymer has at least either of 2 or more hydroxyl groups and 1 or more carboxyl groups at the end of the main chain:

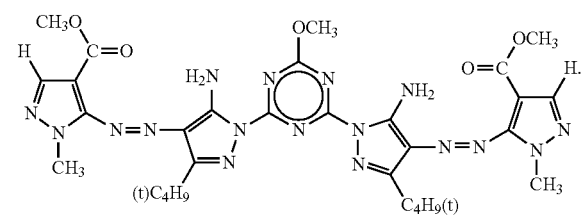

14 Claims, 10 Drawing Sheets

Pig.-1

Pig.-18

Pig.-6

Pig.-10

Pig.-12

Pig.-15

Pig.-16

Pig.-19

Pig.-21

Pig.-24

Pig.-30

Pig.-31

Pig.-34

AQUEOUS PIGMENT DISPERSION AND AQUEOUS INK FOR INKJET RECORDING

TECHNICAL FIELD

The present invention relates to an aqueous pigment dispersion having excellent dispersion stability and storage stability, which contains an azo pigment showing excellent ink ejection properties and realizing good hue and high print density (high tinctorial strength), and high image fastness of printed products (for example, light fastness, gas fastness, heat fastness, and water fastness), a vinyl polymer, and an aqueous medium, and to an aqueous ink for inkjet recording.

BACKGROUND ART

In recent years, as image-recording materials, materials for forming color images have been predominant and, specifically, recording materials for an ink jet system, recording materials for a thermal transfer system, recording materials for an electrophotographic system, transfer type silver halide light-sensitive materials, printing inks, and recording pens have found widespread use. Also, in photographing devices such as CCDs for photographing equipment, and in LCDs and PDPs for display, color filters are used for recording or reproducing a color image. In these color image recording materials and color filters, colorants (dyes or pigments) of three primary colors of a so-called additive color mixing process or subtractive color mixing process have been used in order to display or record full-color images. In actuality, however, there is no fast colorant having the absorption characteristics capable of realizing a preferred color reproduction region and resisting various use conditions and environmental conditions. Thus, the improvement thereof has strongly been desired.

In particular, use of recording materials has extended from domestic use to industrial use and, as a result, they are required to have performance at a higher level (regarding hue, tinctorial strength, and image fastness to light, gas, heat, moisture, and chemicals).

With respect to coloring materials to be used (for example, an ink for inkjet recording), dye inks are required to be changed from water-soluble inks to oil-soluble inks and, in the case where a much higher level of performance is required (from indoor use to outdoor use), the inks are required to be changed from dye inks to pigment inks.

With respect to outdoor uses, not only preserving properties of each single color but well-balanced preserving properties between respective colors and well-balanced preserving properties with each color in low density regions to high density regions are required to be provided at higher levels than in indoor uses.

Difference between dyes and pigments in using manner is that, while dyes are used in a state of being dissolved (a state of molecular dispersion) in a medium such as fibers or solvents, pigments are used in a state of solid particles (molecular aggregate) finely dispersed in a medium without being dissolved.

The dyes or pigments to be used for the above-mentioned uses are required to have in common the following properties. That is, they are required to have absorption characteristics favorable in view of color reproduction and have good fastness under the conditions of the environment wherein they are used, for example, fastness against light, heat, and an oxidative gas such as ozone.

In addition, in the case where the colorant is a pigment, the pigment is further required to be substantially insoluble in water or in an organic solvent, to have a good fastness to chemicals, and not to lose the preferred absorption characteristics it shows in a molecularly dispersed state even when used as pigment particles. Although the required properties described above can be controlled by adjusting the intensity of intramolelcular and intermolecular mutual action, both of them are in a trade-off relation with each other, thus being difficult to allow them to be compatible with each other.

Besides, in the case of using a pigment as the colorant, the pigment is additionally required to have a particle size and a particle shape necessary for realizing desired transparency, to have good fastness under the conditions of the environment wherein they are used, for example, fastness against light, heat, and an oxidative gas such as ozone, to have good fastness to an organic solvent and chemicals such as a sulfurous acid gas, and to be capable of being dispersed in a used medium to a level of fine particles, with the dispersed state being stable. In particular, there is a strong demand for a pigment which has a good yellow hue and a high tinctorial strength and is fast to light, heat, moisture, and active gases in the environment.

That is, in comparison with a dye which is required to have properties as colorant molecules, the pigment is required to have more properties, i.e., it is required to satisfy all of the above-mentioned requirements as a solid of an aggregate of a colorant (dispersion of fine particles) as well as the properties as molecules of a colorant molecule. As a result, a group of compounds which can be used as pigments are extremely limited in comparison with dyes. Even when high-performance dyes are converted to pigments, few of them can satisfy requirement for the properties as a dispersion of fine particles. Thus, such pigments are difficult to develop. This can be confirmed from the fact that the number of pigments registered in Color Index is no more than 1/10 of the number of dyes.

Azo pigments are excellent in hue and tinctorial strength which are characteristics of coloring, and hence they have widely been used in printing inks, inks for an inkjet system, and electrophotographic materials. Of the pigments, diarylide pigments are the most typically used yellow azo pigments. Examples of such diarylide pigments include C.I. pigment yellow 12, C.I. pigment yellow 13, and C.I. pigment yellow 17. However, the diarylide pigments are inferior in fastness, particularly light fastness, and hence they are inappropriate for prints which are to be stored for a long time.

In order to remove such defects, there have been disclosed azo pigments having a fastness improved by increasing molecular weight or by introducing a group having a strong intermolecular mutual action (see, for example, patent documents 1 to 3). However, even the improved pigments, for example, the pigments described in patent document 1 have the defect that they have still insufficient light fastness though improved to some extent, and pigments described in, for example, patent documents 2 and 3 have a greenish hue and a low tinctorial strength, thus being inferior in coloring characteristics.

Also, patent document 4 discloses colorants which have absorption characteristics of excellent color reproducibility and has a sufficient fastness. However, all of the specific compounds described in the patent document are soluble in water or in an organic solvent, thus being insufficient in resistance to chemicals.

Incidentally, patent document 5 describes an example of using a dye as a colorant and dissolving it in a water medium to use as a water-soluble ink for inkjet recording. Also, patent document 6 describes an anion-type monoazo compound characterized by light fastness. However, the level of image fastness of these is not satisfying at a high level, and they fail to provide a using manner as a pigment.

In the case of expressing a full-color image based on the subtractive color mixing process using three colors of yellow, magenta, and cyan or using four colors further including black, use of a pigment having an inferior fastness as a yellow pigment would change gray balance of the prints with the lapse of time, and use of a pigment having inferior coloring characteristics would reduce color reproducibility upon printing. Thus, in order to obtain prints which can maintain high color reproducibility for a long time, there have been desired a yellow pigment and a pigment dispersion which have both good coloring characteristics and good fastness.

Also, patent document 7 discloses colorants, as dyes, having absorption characteristics excellent in color reproducibility with an extremely high-level fastness.

On the other hand, with many of typical organic pigments, there exist polymorphic forms, and it has been known that such pigments take two or more crystal forms in spite of having the same chemical composition.

With some organic pigments, fine and size distribution-controlled particles can be obtained by selecting appropriate reaction conditions upon synthesis. There are pigments such as copper phthalocyanine green which are formed into pigments by allowing extremely fine and aggregated particles produced upon synthesis to grow in a subsequent step with size distribution being controlled, and pigments such as copper phthalocyanine blue pigment which are formed into pigments by pulverizing coarse and uneven particles produced upon synthesis in a subsequent step and controlling the size distribution. For example, a diketopyrrolopyrrole pigment is generally synthesized by reacting a succinic diester with an aromatic nitrile in an organic solvent (see, for example, patent document 8). The crude diketopyrrolopyrrole pigment is heat-treated in water or in an organic solvent, and then subjected to pulverization such as wet milling into a form appropriate for use (see, for example, patent document 9). For example, with a diketopyrrolopyrrole pigment of C.I. Pigment Red 254, an α-type crystal form and a β-type crystal form are known (see, for example, patent document 10). Also, with an azo pigment of C.I. Pigment Yellow 181, several crystal forms are known (see, for example, patent document 11).

RELATED ART DOCUMENTS

Patent document

Patent document 1: JP-A-56-38354
Patent document 2: U.S. Pat. No. 2,936,306
Patent document 3: JP-A-11-100519
Patent document 4: JP-A-2003-277662
Patent document 5: U.S. Pat. No. 7,125,446
Patent document 6: JP-A-61-36362
Patent document 7: Japanese Patent No. 4,073,453
Patent document 8: JP-A-58-210084
Patent document 9: JP-A-5-222314
Patent document 10: JP-A-8-48908
Patent document 11: US Patent Application Publication No. 2008/058531

DISCLOSURE OF THE INVENTION

Problems that the Invention is to Solve

However, all of the specific compounds described in patent document 7 have such a high solubility for an organic solvent that, in case of using as pigments, an intended fine particle dispersion of the pigment cannot be obtained, with a solution wherein the colorant is dissolved or an emulsion being obtained. As a result, it has been difficult to use as a coloring material containing a pigment dispersed therein for the purpose of providing various required performances at high levels.

An object of the present invention is to provide an aqueous ink for inkjet recording, which contains an azo pigment showing excellent ink ejection properties and realizing good hue and high print density (high tinctorial strength), and high image fastness of printed products (for example, light fastness, gas fastness, heat fastness, and water fastness (particularly, light fastness for outdoor use)), a vinyl polymer, and an aqueous medium, and to an aqueous pigment dispersion having excellent dispersion stability and storage stability.

Means for Solving the Problem

As a result of intensive investigations in consideration of the above-mentioned circumstances, the inventors have found that the inventors have found that azo pigments wherein the carbon atom adjacent to an azo group is substituted by a carbonyl group capable of forming an intramolecular hydrogen bond have excellent coloring properties, form dispersed particles of a small particle diameter, and have both tinctorial strength and light fastness, and have further found that these problems can be solved by combining the azo pigment with both a vinyl polymer having a specific structure and an aqueous medium, thus having achieved the present invention.

Thus, the objectives of the present invention are achieved by the following means.

(1) An aqueous pigment dispersion containing A and B.

A: an azo pigment represented by the following general formula (1) and in a crystal form having at least one characteristic peak at Bragg angles (2θ) of 5 to 15° and 20 to 30° in X-ray diffraction with characteristic Cu Kα line, a tautomer thereof, or a salt or hydrate thereof; and B: a vinyl polymer containing a structural unit represented by the following general formula (A1), a structural unit derived from a salt-forming group-containing monomer (a), and a structural unit derived from a monomer selected from a styrene series macromer (b) and a hydrophobic monomer (c), provided that the water-insoluble vinyl polymer has at least either of 2 or more hydroxyl groups and 1 or more carboxyl groups at the end of the main chain.

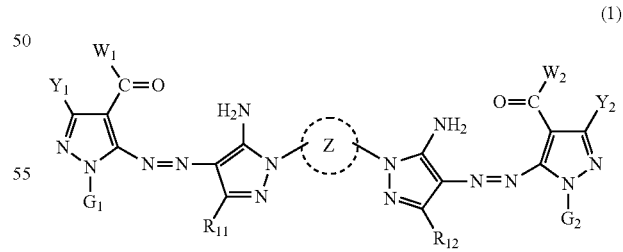

(1)

In the general formula (1), Z represents a 5- to 6-membered heterocyclic ring, $Y_1$, $Y_2$, $R_{11}$, and $R_{12}$ each independently represents a hydrogen atom or a substituent, $G_1$ and $G_2$ each independently represents a hydrogen atom, an alkyl group, an aralkyl group, an alkenyl group, an alkynyl group, an aryl group, or a heterocyclic group, and $W_1$ and $W_2$ each independently represents an alkoxy group, an amino group, an alkyl group, or an aryl group.

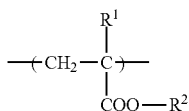
(A1)

In the general formula (A1), $R^1$ represents a hydrogen atom or a methyl group, and $R^2$ represents an arylalkyl group which may have a substituent (2) The aqueous pigment dispersion according to (1), wherein $W_1$ and $W_2$ in the azo pigment represented by the general formula (1), a tautomer thereof, or a salt or hydrate thereof each independently represents an alkoxy group containing a total carbon atoms of 5 or less, an amino group, or an alkylamino group containing a total carbon atoms of 5 or less.

(3) The aqueous pigment dispersion according to (1) or (2), wherein $G_1$ and $G_2$ in the azo pigment represented by the general formula (1), a tautomer thereof, or a salt or hydrate thereof each independently represents an alkyl group containing a total carbon atoms of 3 or less.

(4) The aqueous pigment dispersion for inkjet recording according to any one of (1) to (3), wherein Z in the azo pigment represented by the general formula (1), a tautomer thereof, or a salt or hydrate thereof represents a 6-membered nitrogen-containing heterocyclic ring.

(5) The aqueous pigment dispersion according to (1), wherein the azo pigment represented by the general formula (1) is represented by the following general formula (10).

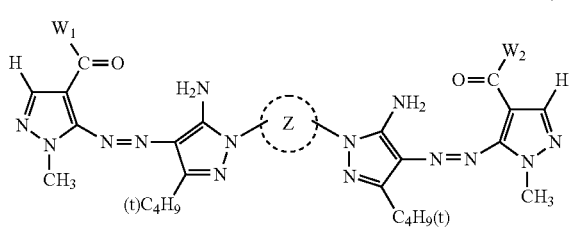
(10)

In the general formula (10), Z represents a 5- to 6-membered nitrogen-containing heterocyclic ring, and $W_1$ and $W_2$ each independently represents an alkoxy group, an amino group, an alkyl group, or an aryl group.

(6) The aqueous pigment dispersion according to (5), wherein the azo pigment represented by the general formula (10) is represented by the following general formula (11).

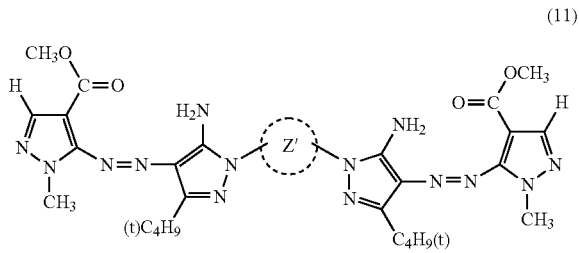
(11)

In the general formula (11), Z' represents a 6-membered nitrogen-containing heterocyclic ring.

(7) The aqueous pigment dispersion according to any one of (1) to (6), wherein the azo pigment represented by the general formula (1), a tautomer thereof, or a salt or hydrate thereof contains at least one azo pigment represented by the following general formula (1a) and having characteristic X-ray peaks at Bragg angles)(2θ±0.2°) in X-ray diffraction with characteristic Cu Kα line of 7.2° and 25.9 or a tautomer thereof.

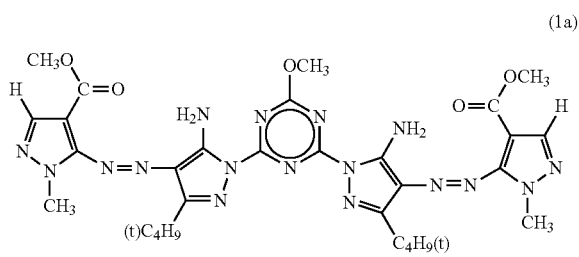
(1a)

(8) The aqueous pigment dispersion according to any one of (1) to (6), wherein the azo pigment represented by the general formula (1), a tautomer thereof, or a salt or hydrate thereof contains at least one azo pigment represented by the following general formula (2a) and having characteristic X-ray peaks at Bragg angles)(2θ±0.2°) in X-ray diffraction with characteristic Cu Kα line of 7.6°, 25.6°, and 27.7 or a tautomer thereof.

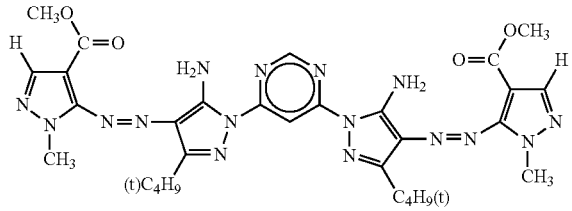
(2a)

(9) The aqueous pigment dispersion according to any one of (1) to (6), wherein the azo pigment represented by the general formula (1), a tautomer thereof, or a salt or hydrate thereof contains at least one azo pigment represented by the following general formula (3a) and having characteristic X-ray peaks at Bragg angles (2θ±0.2°) in X-ray diffraction with characteristic Cu Kα line of 7.5°, 11.2°, 18.6°, 21.2°, and 23.9 or a tautomer thereof.

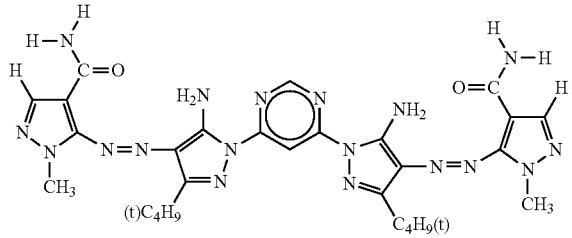
(3a)

(10) The aqueous pigment dispersion according to any one of (1) to (9), wherein the structural unit represented by the general formula (A1) is a structural unit derived from benzyl (meth)acrylate.

(11) The aqueous pigment dispersion according to any one of (1) to (10), wherein the styrene series macromer (b) is a styrene macromer having a polymerizable functional group at one end thereof.
(12) The aqueous pigment dispersion according to any one of (1) to (11), wherein the water-insoluble vinyl polymer further contains a structural unit represented by the following general formula (A2).

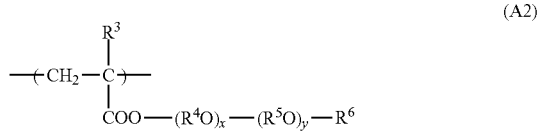

(A2)

In the formula (A2), $R^3$ represents a hydrogen atom or a methyl group, $R^4O$ represents an oxypropylene group, $R^5O$ represents an oxyalkylene group containing 2 or 4 carbon atoms, $R^6$ represents a hydrogen atom, an alkyl group, or a phenyl group which may have an alkyl group, x and y each represents an average addition mole number, with each of y $R^5Os$ being the same or different from every other $R^5O$.
(13) The aqueous pigment dispersion according to any one of (1) to (12), which further contains an aqueous medium.
(14) An aqueous ink for inkjet recording comprising the aqueous pigment dispersion described in any one of (1) to (13).

Advantages of the Invention

According to the present invention, there are provided, by combining a specific azo pigment, a specific vinyl polymer, and an aqueous medium, (1) an aqueous pigment dispersion having excellent storage stability, which contains an azo pigmen, a vinyl polymer, and an aqueous medium and (2) an aqueous ink for inkjet recording which contains an azo pigment showing excellent ink ejection properties and realizing good hue and high print density (high tinctorial strength), and high image fastness of printed products (light fastness), a vinyl polymer, and an aqueous medium.

The aqueous pigment dispersion of the invention can be used for an ink for printing such as inkjet printing, a color toner for electrophotography, a display such as LCD or PDP, a color filter to be used in photographing equipment such as CCD, a paint, and a colored plastic.

MODE FOR CARRYING OUT THE INVENTION

<Aqueous Pigment Dispersion>

Figure 1:
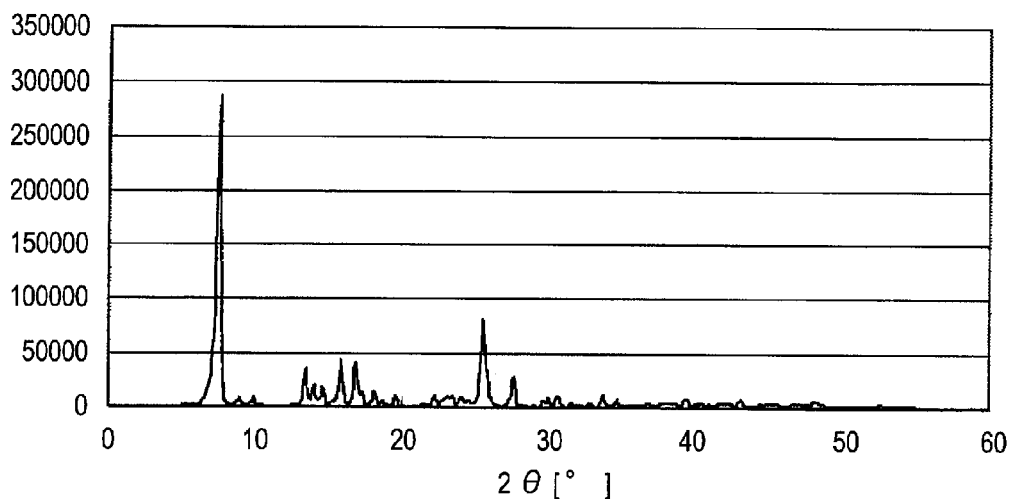
FIG. 1 is a Cu Kα X-ray diffraction pattern of an azo pigment obtained in Synthesis Example 1.

The aqueous pigment dispersion of the present invention contains A and B:

A: an azo pigment represented by the following general formula (1) and in a crystal form having at least one characteristic peak at Bragg angles (2θ) of 5 to 15° and 20 to 30° in X-ray diffraction with characteristic Cu Kα line, a tautomer thereof, or a salt or hydrate thereof; and B: a vinyl polymer containing a structural unit (A1) represented by the following general formula (A1), a structural unit derived from a salt-forming group-containing monomer (a), and a structural unit derived from a monomer selected from a styrene series macromer (b) and a hydrophilic monomer (c) (provided that the water-insoluble vinyl polymer has at least either of 2 or more hydroxyl groups and 1 or more carboxyl group at the end of the main chain):

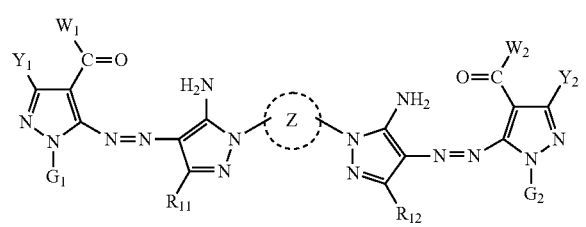

(1)

(in the general formula (1), Z represents a 5- to 6-membered heterocyclic ring, $Y_1$, $Y_2$, $R_{11}$, and $R_{12}$ each independently represents a hydrogen atom or a substituent, $G_1$ and $G_2$ each independently represents a hydrogen atom, an alkyl group, an aralkyl group, an alkenyl group, an alkynyl group, an aryl group, or a heterocyclic group, and $W_1$ and $W_2$ each independently represents an alkoxy group, an amino group, an alkyl group, or an aryl group);

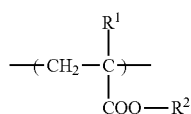

(in the general formula (A1), $R^1$ represents a hydrogen atom or a methyl group, and $R^2$ represents an arylalkyl group which may have a substituent).

The aqueous pigment dispersion of the invention realizes, by containing A and B described above, 1: an aqueous pigment dispersion having excellent storage stability, which contains an azo pigment and a vinyl polymer, and 2: excellent ink ejection properties, good hue and high print density (high tinctorial strength), and high image fastness of printed products (light fastness, ozone gas fastness, heat fastness, and moisture fastness).

The pigment dispersion of the invention preferably further contains an aqueous medium.

Hereinafter, the aqueous pigment dispersion of the invention may in some cases be referred to as "aqueous dispersion".

[Azo Pigments Represented by the General Formula (1)]

The compounds represented by the general formula (1) are liable to produce intramolecular and intermolecular action of the colorant molecules due to the specific structure thereof, and show low solubility in water or an organic solvent, thus being able to be formed into preferred form azo pigments.

Pigments are used by finely dispersing in a medium as particles of aggregates molecules as is different from dyes which are used by dissolving in water or an organic solvent in a molecular dispersion state.

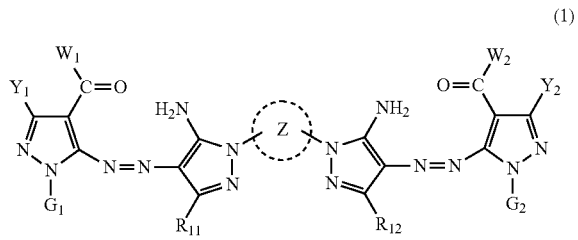

(In the general formula (1), Z represents a 5- to 6-membered heterocyclic ring, $Y_1$, $Y_2$, $R_{11}$, and $R_{12}$ each independently represents a hydrogen atom or a substituent, $G_1$ and $G_2$ each independently represents a hydrogen atom, an alkyl group, an aralkyl group, an alkenyl group, an alkynyl group, an aryl group, or a heterocyclic group, and $W_1$ and $W_2$ each independently represents an alkoxy group, an amino group, an alkyl group, or an aryl group.)

The alkoxy group represented by $W_1$ or $W_2$ is preferably a substituted or unsubstituted alkoxy group containing from 1 to 30 carbon atoms, more preferably a substituted or unsubstituted alkoxy group containing from 1 to 8 carbon atoms, still more preferably a substituted or unsubstituted alkoxy group containing from 1 to 4 carbon atoms, and examples thereof include a methoxy group, an ethoxy group, a n-propoxy group, an i-propoxy group, a n-butoxy group, an i-butoxy group, a s-butoxy group, a t-butoxy group, a n-octyloxy group, and a 2-methoxyethoxy group, with a methoxy group being particularly preferred.

The amino group represented by $W_1$ or $W_2$ includes an alkylamino group, an arylamino group, and a heterocyclic amino group, and is preferably an amino group, a substituted or unsubstituted alkylamino group containing from 1 to 30 carbon atoms, or a substituted or unsubstituted anilino group containing from 6 to 30 carbon atoms. Of these, an amino group, a substituted or unsubstituted alkylamino group containing from 1 to 8 carbon atoms, or a substituted or unsubstituted anilino group containing from 6 to 18 carbon atoms are preferred, and an amino group, a substituted or unsubstituted alkylamino group containing from 1 to 4 carbon atoms, or a substituted or unsubstituted anilino group containing from 6 to 12 carbon atoms are more preferred. Examples thereof include an amino group ($-NH_2$), a methylamino group ($-NHCH_3$), a dimethylamino group $\{-N(CH_3)_2\}$, an anilino group (NHPh), an N-methyl-anilino group $\{-N(CH_3)Ph\}$, and a diphenylamino group $\{-N(Ph)_2\}$. Of these, an amino group is particularly preferred.

The alkyl group represented by $W_1$ or $W_2$ includes straight, branched, or cyclic, substituted or unsubstituted alkyl groups, with a cycloalkyl group, a bicycloalkyl group and, further, a tricyclic group having more cyclic structures being also included. An alkyl group in the substituents to be described hereinafter (for example, an alkyl group in an alkoxy group or an alkylthio group) also represents the alkyl group of the above-described concept. More specifically, the alkyl group is preferably an alkyl group containing from 1 to 30 carbon atoms, and examples thereof include a methyl group, an ethyl group, a n-propyl group, an i-propyl group, a n-butyl group, an i-butyl group, a s-butyl group, a t-butyl group, a n-octyl group, an eicosyl group, a 2-chloroethyl group, a 2-cyanoethyl group, and a 2-ethylhexyl group. The cycloalkyl group is preferably a substituted or unsubstituted cycloalkyl group containing from 3 to 30 carbon atoms, and examples thereof include a cyclohexyl group, a cyclopentyl group, and a 4-n-dodecylcyclohexyl group. The bicycloalkyl group is preferably a substituted or unsubstituted bicycloalkyl group containing from 5 to 30 carbon atoms, i.e., a monovalent group formed by removing one hydrogen atom from a bicycloalkane containing from 5 to 30 carbon atoms, and examples thereof include a bicyclo[1,2,2]heptan-2-yl group and a bicyclo[2,2,2]octan-3-yl group.

The aryl group represented by $W_1$ or $W_2$ is preferably a substituted or unsubstituted aryl group containing from 6 to 30 carbon atoms. Of these, a substituted or unsubstituted aryl group containing from 6 to 18 carbon atoms are preferred, and a substituted or unsubstituted aryl group containing from 6 to 12 carbon atoms are more preferred, and examples thereof include a phenyl group, a p-tolyl group, a naphthyl group, a m-chlorophenyl group, and an o-hexadecanoylaminophenyl group.

$W_1$ and $W_2$ each preferably represents independently an alkoxy group, an amino group, or an alkyl group, more preferably represents an alkoxy group or an amino group, still more preferably represents an alkoxy group containing a total of 5 or less carbon atoms, an amino group ($-NH_2$ group), or an alkylamino group containing a total of 5 or less carbon atoms, particularly preferably represents an alkoxy group containing a total of 3 or less carbon atoms or an alkylamino group containing a total of 3 or less carbon atoms, with a methoxy group being most preferred. In the case where $W_1$ and $W_2$ represent an alkoxy group containing a total of 5 or less carbon atoms, an amino group, or an alkylamino group containing a total of 5 or less carbon atoms, the colorant molecules are liable to produce strong intramolecular and intermolecular mutual action (hydrogen bonding or π-π stacking), and hence they can easily constitute a pigment having a more stable molecular alignment (for example, 3-dimensional network), thus being preferred in the points of good hue and high fastness (to light, gas, heat, water, and chemicals).

In the general formula (1), $R_{11}$ and $R_{12}$ each independently represents a hydrogen atom or a substituent. Examples of the substituent when $R_{11}$ and $R_{12}$ each independently represents a substituent include a straight or branched alkyl group containing from 1 to 12 carbon atoms, a straight or branched aralkyl group containing from 7 to 18 carbon atoms, a straight or branched alkenyl group containing from 2 to 12 carbon atoms, a straight or branched alkynyl group containing from 2 to 12 carbon atoms, a straight or branched cycloalkyl group containing from 3 to 12 carbon atoms, a straight or branched cycloalkenyl group containing from 3 to 12 carbon atoms (for example, methyl, ethyl, n-propyl, i-propyl, n-butyl, i-butyl, sec-butyl, t-butyl, 2-ethylhexyl, 2-methylsulfonylethyl, 3-phenoxypropyl, trifluoromethyl or cyclopentyl), a halogen atom (for example, a chlorine atom or a bromine atom), an aryl group (for example, phenyl, 4-t-butylphenyl or 2,4-di-t-amylphenyl), a heterocyclic group (for example, imidazolyl, pyrazolyl, triazolyl, 2-furyl, 2-thienyl, 2-pyrimidinyl or 2-benzothiazolyl), a cyano group, a hydroxyl group, a nitro group, a carboxy group, an amino group, an alkyloxy group (for example, methoxy, ethoxy, 2-methoxyethoxy or 2-methylsulfonylethoxy), an aryloxy group (for example, phenoxy, 2-methylphenoxy, 4-t-butylphenoxy, 3-nitrophenoxy, 3-t-butyloxycarbonylphenoxy, or 3-methoxycarbonylphenyloxy), an acylamino group (for example, acetamido, benzamido or 4-(3-t-butyl-4-hydroxyphenoxy)butanamido), an alkylamino group (for example, methylamino, butylamino, diethylamino or methylbutylamino), an arylamino group (for example, phenylamino or 2-chloroanilino), an ureido group (for example, phenylureido, methylureido or N,N-dibutylureido), a sulfamoylamino group (for example, N,N-dipropylsulfamoylamino), an alkylthio group (for example, methylthio, octylthio or 2-phenoxyethylthio), an arylthio group (for example, phenylthio, 2-butoxy-5-t-octylphenylthio or 2-carboxyphenylthio), an alkyloxycarbonylamino group (for example, methoxycarbonylamino), an alkylsulfonylamino group and an arylsulfonylamino group (for example, methylsulfonylamino, phenylsulfonylamino or p-toluenesulfonylamino), a carbamoyl group (for example, N-ethylcarbamoyl or N,N-dibutylcarbamoyl), a sulfamoyl group (for example, N-ethylsulfamoyl, N,N-dipropylsulfamoyl or N-phenylsulfamoyl), a sulfonyl group (for example, methylsulfonyl, octylsulfonyl, phenylsulfonyl or p-toluenesulfonyl), an alkyloxycarbonyl group (for example, methoxycarbonyl or butyloxycarbonyl), a heterocyclic oxy group (for example, 1-phenyltetrazol-5-oxy or 2-tetrahydropyranyloxy), an azo group (for example, phenylazo, 4-methoxyphenylazo, 4-pivaloylaminophenylazo or 2-hydroxy-4-propanoylphenylazo), an acyloxy group (for example, acetoxy), a carbamoyloxy group (for example, N-methylcarbamoyloxy or N-phenylcarbamoyloxy), a silyloxy group (for example, trimethylsilyloxy or dibutylmethylsilyloxy), an aryloxycarbonylamino group (for example, phenoxycarbonylamino), an imido group (for example, N-succinimido or N-phthalimido), a heterocyclic thio group (for example, 2-benzothiazolylthio, 2,4-di-phenoxy-1,3,5-triazol-6-thio or 2-pyridylthio), a sulfinyl group (for example, 3-phenoxypropylsulfinyl), a phosphonyl group (for example, phenoxyphosphonyl, octyloxyphosphonyl, or phenylsulfonyl), an aryloxycarbonyl group (for example, phenoxycarbonyl), an acyl group (for example, acetyl, 3-phenylpropanoyl, or benzoyl), and an ionic hydrophilic group (for example, a carboxyl group, a sulfo group, a phosphono group, or a quaternary ammonium group).

In the general formula (1), $R_{11}$ and $R_{12}$ each preferably represents independently a substituted or unsubstituted acylamino group containing a total of from 1 to 8 carbon atoms, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms, more preferably represents a straight or branched alkyl group containing a total of from 1 to 8 carbon atoms, or an aryl group containing a total of from 6 to 18 carbon atoms. Of these, a straight or branched alkyl group containing a total of from 1 to 8 carbon atom is preferred and, more specifically, a methyl group, an i-propyl group, or a t-butyl group is preferred, an i-propyl group or a t-butyl group is particularly preferred, with a t-butyl group being most preferred.

When $R_{11}$ and $R_{12}$ represent a straight or branched alkyl group containing a total of a small number (for example, the number of carbon atoms of 1 to 4) of carbon atoms, the steric alignment of the colorant molecules can be controlled with ease (aligned with a definite distance and a definite angle). As a result, pigment particles having a stable intramolecular and intermolecular mutual action (hydrogen bonding or π-π stacking) are easily formed, which serves to easily constitute a more stable molecular alignment (for example, 3-dimensional network) and is therefore preferred in view of improving hue, tinctorial strength, and high image fastness (light fastness, gas fastness, heat fastness, water fastness and chemical fastness).

In the general formula (1), Z represents a heterocyclic group which may further be condensed with other ring(s). Z preferably represents a substituted or unsubstituted 5- or 6-membered heterocyclic group, particularly preferably a 6-membered, nitrogen-containing heterocyclic group containing from 3 to 10 carbon atoms.

To illustrate the heterocyclic group represented by W without restricting the substitution position, there can be illustrated pyridyl, pyrazinyl, pyridazinyl, pyrimidinyl, triazinyl, quinolinyl, isoquinolinyl, quinazolinyl, cinnolinyl, phthalazinyl, quinoxalinyl, pyrrolyl, indolyl, furyl, benzofuryl, thienyl, benzothienyl, pyrazolyl, imidazolyl, benzimidazolyl, triazolyl, oxazolyl, benzoxazolyl, thiazolyl, benzothiazolyl, isothiazolyl, benzisothiazolyl, thiadiazolyl, isoxazolyl, benzisoxazolyl, pyrrolidinyl, piperidinyl, piperazinyl, imidazolidinyl, thiazolinyl, and sulfolanyl.

Preferred examples of the heterocyclic group include pyridyl, pyrimidinyl, S-triazinyl, pyridazinyl, pyrazinyl, 1,2,4-thiadiazolyl, 1,3,4-thiadiazolyl, and imidazolyl, and more preferred examples thereof include pyridyl, pyrimidinyl, S-triazinyl, pyridazinyl, and pyrazinyl. In view of hue, tinctorial strength, and image fastness, pyrimidinyl and S-triazinyl are particularly preferred. In view of hue and image fastness, pyrimidinyl having substituents at 4- and 6-positions and S-triazinyl having an alkoxy group containing from 1 to 4 carbon atoms at 2-position are still more preferred. Of them, pyrimidinyl having substituents at 4- and 6-positions is most preferred in the point of well improved light fastness of image.

When Z represents a pyrimidinyl group or an S-triazinyl group, the bis-type azo colorant easily forms intramolecular hydrogen bond between the amino group and the nitrogen-containing 6-membered heterocyclic ring, and the steric alignment of the colorant molecules can be controlled with ease (aligned with a definite distance and a definite angle). As a result, pigment particles having a stable intramolecular and intermolecular mutual action (hydrogen bonding or π-π stacking) are easily formed, which serves to easily constitute a more stable molecular alignment (for example, 3-dimensional network) and is therefore preferred in view of improving hue, tinctorial strength, and high image fastness (light fastness, gas fastness, heat fastness, water fastness, and chemical fastness).

$G_1$ and $G_2$ each independently represents a hydrogen atom, an alkyl group, an aralkyl group, an alkenyl group, an alkynyl group, an aryl group, or a heterocyclic group, particularly preferably represents a hydrogen atom, a methyl group, an ethyl group, a n-propyl group, an i-propyl group, a n-butyl group, an i-butyl group, a sec-butyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, or a pyrazinyl group, more preferably represents a hydrogen atom, a methyl group, a phenyl group, a pyridyl group, a pyrimidinyl group, or a pyrazinyl group. Of these, a straight or branched alkyl group containing a total of from 1 to 8 carbon atoms, a 2-pyridyl group, a 2,6-pyrimidinyl group, and a 2,5-pyrazinyl group are preferred, and an alkyl group containing a total of 3 or less carbon atoms is more preferred. Further, in view of hue and image fastness, a hydrogen atom or a methyl group is preferred, with a methyl group being particularly preferred in view of hue and light fastness.

Examples of the substituent when $Y_1$ and $Y_2$ each independently represents a substituent include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-xulfonylamino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl- or heterocyclic azo group, an imido group, a phosphino group, a phosphinyl group, a phosphinyloxy group, a phosphinylamino group, and a silyl group. Particularly preferred examples of Y include a hydrogen atom, an alkyl group (for example, a methyl group), an aryl group (for example, a phenyl group), a heterocyclic group (for example, a 2-pyridyl group), and an alkylthio group (for example, a methylthio group), and more preferred are a hydrogen atom, a straight or branched alkyl group containing a total of from 1 to 4 carbon atoms, a phenyl group, and a methylthio group. Further, in view of hue and image fastness, a hydrogen atom and a methyl group are preferred, with a hydrogen atom being particularly preferred in view of hue and light fastness.

As substituents in the case where $G_1$, $G_2$, $Y_1$, $Y_2$, $W_1$, $W_2$, $R_{11}$, $R_{12}$, and Z further have a substituent, there can be illustrated the following substituents (hereinafter also referred to as "substituent J" in some cases).

Examples of the substituents include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl- or heterocyclic azo group, an imido group, a phosphino group, a phosphinyl group, a phosphinyloxy group, a phosphinylamino group, and a silyl group.

More specifically, examples of the halogen atom include a fluorine atom, a chlorine atom, a bromine atom, and an iodine atom.

Examples of the alkyl group include straight, branched, or cyclic, substituted or unsubstituted alkyl groups, with a cycloalkyl group, a bicycloalkyl group and, further, a tricyclic structure having more cyclic structures being also included. An alkyl group in the substituents to be described hereinafter (for example, an alkyl group in an alkoxy group or an alkylthio group) also represents the alkyl group of the above-described concept. More specifically, the alkyl group is preferably an alkyl group containing from 1 to 30 carbon atoms, and examples thereof include a methyl group, an ethyl group, a n-propyl group, an isopropyl group, a t-butyl group, a n-octyl group, an eicosyl group, a 2-chloroethyl group, a 2-cyanoethyl group, and a 2-ethylhexyl group. The cycloalkyl group is preferably a substituted or unsubstituted cycloalkyl group containing from 3 to 30 carbon atoms, and examples thereof include a cyclohexyl group, a cyclopentyl group, and a 4-n-dodecylcyclohexyl group. The bicycloalkyl group is preferably a substituted or unsubstituted bicycloalkyl group containing from 5 to 30 carbon atoms, i.e., a monovalent group formed by removing one hydrogen atom from a bicycloalkane containing from 5 to 30 carbon atoms, and examples thereof include a bicyclo[1,2,2]heptan-2-yl group and a bicyclo[2,2,2]octan-3-yl group.

Examples of the aralkyl group include substituted or unsubstituted aralkyl groups. Preferred examples of the substituted or unsubstituted aralkyl groups include aralkyl groups containing from 7 to 30 carbon atoms, such as a benzyl group and a 2-phenethyl group.

Examples of the alkenyl group include straight, branched, or cyclic, substituted or unsubstituted alkenyl groups, with a cycloalkenyl group and a bicycloalkenyl group being also included. More specifically, the alkenyl group is preferably a substituted or unsubstituted alkenyl group containing from 2 to 30 carbon atoms, and examples thereof include a vinyl group, an allyl group, a prenyl group, a geranyl group, or an oleyl group. The cycloalkenyl group is preferably a substituted or unsubstituted cycloalkyl group containing from 3 to 30 carbon atoms, i.e., a monovalent group formed by removing one hydrogen atom from a cycloalkene containing from 3 to 30 carbon atoms, and examples thereof include a 2-cyclopentenn-1-yl group and a 2-cyclohexen-1-yl group. The bicycloalenkyl group is a substituted or unsubstituted bicycloalkenyl group, preferably a substituted or unsubstituted bicycloalkenyl group containing from 5 to 30 carbon atoms, i.e., a monovalent group formed by removing one hydrogen atom from a bicycloalkene containing one double bond, and examples thereof include a bicyclo[2,2,1]hept-2-en-1-yl group and a bicyclo[2,2,2]oct-2-en-4-yl group.

The alkynyl group is preferably a substituted or unsubstituted alkynyl group containing from 2 to 30 carbon atoms, such as an ethynyl group, a propargyl group, or a trimethylsilylethynyl group.

The aryl group is preferably a substituted or unsubstituted aryl group containing from 6 to 30 carbon atoms, such as a phenyl group, a p-tolyl group, a naphthyl group, a m-chlorophenyl group, or an o-hexadecanoylaminophenyl group.

The heterocyclic group is preferably a monovalent group formed by removing one hydrogen atom from a 5- or 6-membered, substituted or unsubstituted, aromatic or non-aromatic, heterocyclic compound, more preferably a 5- or 6-membered aromatic heterocyclic group containing from 3 to 30 carbon atoms, such as a 2-furyl group, a 2-thienyl group, a 2-pyrimidinyl group, or a 2-benzothiazolyl group.

The alkoxy group is preferably a substituted or unsubstituted alkoxy group containing from 1 to 30 carbon atoms, and examples thereof include a methoxy group, an ethoxy group, an isopropoxy group, a t-butoxy group, a n-octyloxy group, and a 2-methoxyethoxy group.

The aryloxy group is preferably a substituted or unsubstituted aryloxy group containing from 6 to 30 carbon atoms, and examples thereof include a phenoxy group, a 2-methylphenoxy group, a 4-t-butylphenoxy group, a 3-nitrophenoxy group, and a 2-tetradecanoylaminophenoxy group.

The silyloxy group is preferably a substituted or unsubstituted silyloxy group containing from 0 to 20 carbon atoms, and examples thereof include a trimethylsilyloxy group and a diphenylmethylsilyloxy group.

The heterocyclic oxy group is preferably a substituted or unsubstituted heterocyclic oxy group containing from 2 to 30 carbon atoms, and examples thereof include a 1-phenyltetrazol-5-oxy group and a 2-tetrahydropyranyloxy group.

The acyloxy group is preferably a formyloxy group, a substituted or unsubstituted alkylcarbonyloxy group containing from 2 to 30 carbon atoms, a substituted or unsubstituted arylcarbonyloxy group containing from 6 to 30 carbon atoms, and examples thereof include an acetyloxy group, a pivaloyloxy group, a stearoyloxy group, a benzoyloxy group, and a p-methoxyphenylcarbonyloxy group.

The carbamoyloxy group is preferably a substituted or unsubstituted carbamoyloxy group containing from 1 to 30 carbon atoms, and the examples thereof include an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group.

The alkoxycarbonyloxy group is preferably a substituted or unsubstituted alkoxycarbonyloxy group containing from 2 to 30 carbon atoms, and the examples thereof include a methoxycarbonyloxy group, an ethoxycarbonyloxy group, a t-butoxycarbonyloxy group, and a n-octylcarbonyloxy group.

The aryloxycarbonyloxy group is preferably a substituted or unsubstituted aryloxycarbonyloxy group containing from 7 to 30 carbon atoms, and the examples thereof include a phenoxycabonyloxy group, a p-methoxyphenoxycarbonyloxy group, and a p-n-hexadecyloxyphenoxycarbonyloxy group.

The amino group includes an alkylamino group, an arylamino group, and a heterocyclic amino group, and is preferably an amino group, a substituted or unsubstituted alkylamino group containing from 1 to 30 carbon atoms, or a substituted or unsubstituted anilino group containing from 6 to 30 carbon atoms. Examples thereof include a methylamino group, a dimethylamino group, an anilino group, an N-methyl-anilino group, and a diphenylamino group.

The acylamino group is preferably a formylamino group, a substituted or unsubstituted alkylcarbonylamino group containing from 1 to 30 carbon atoms, or a substituted or unsubstituted arylcarbonylamino group containing from 6 to 30 carbon atoms. Examples thereof include an acetylamino group, a pivaloylamino group, a lauroylamino group, a benzoylamino group, and a 3,4,5-tri-n-octyloxyphenylcarbonylamino group.

The aminocarbonylamino group is preferably a substituted or unsubstituted aminocarbonylamino group containing from 1 to 30 carbon atoms, and the examples thereof include a carbamoylamino group, an N,N-dimethylaminocarbonylamino group, an N,N-diethylaminocarbonylamino group, and a morpholinocarbonylamino group.

The alkoxycarbonylamino group is preferably a substituted or unsubstituted alkoxycarbonylamino group containing from 2 to 30 carbon atoms, and the examples thereof include a methoxycarbonylamino group, an ethoxycarbonylamino group, a t-butoxycarbonylamino group, a n-octadecyloxycarbonylamino group, and an N-methyl-methoxycarbonylamino group.

The aryloxycarbonylamino group is preferably a substituted or unsubstituted aryloxycarbonylamino group containing from 7 to 30 carbon atoms, and the examples thereof include a phenoxycarbonylamino group, a p-chlorophenoxycarbonylamino group, and a m-n-octyloxyphenoxycarbonylamino group.

The sulfamoylamino group is preferably a substituted or unsubstituted sulfamoylamino group containing from 0 to 30 carbon atoms, and the examples thereof include a sulfamoylamino group, an N,N-dimethylaminosulfonylamino group, and an N-n-octylaminosulfonylamino group.

The alkyl- or aryl-sulfonylamino group is preferably a substituted or unsubstituted alkylsulfonylamino group containing from 1 to 30 carbon atoms, or a substituted or unsubstituted arylsulfonylamino group containing from 6 to 30 carbon atoms, and the examples thereof include a methylsulfonylamino group, a butylsulfonylamino group, a phenylsulfonylamino group, a 2,3,5-trichlorophenylsulfonylamino group, and a p-methylphenylsulfonylamino group.

The alkylthio group is preferably a substituted or unsubstituted alkylthio group containing from 1 to 30 carbon atoms, and the examples thereof include a methylthio group, an ethylthio group, and a n-hexadecylthio group.

The arylthio group is preferably a substituted or unsubstituted arylthio group containing from 6 to 30 carbon atoms, and the examples thereof include a phenylthio group, a p-chlorophenylthio group, and a m-methoxyphenylthio group.

The heterocyclic thio group is preferably a substituted or unsubstituted heterocyclic thio group containing from 2 to 30 carbon atoms, and the examples thereof include a 2-benzothiazolylthio group and a 1-phenyltetrazol-5-ylthio group.

The sulfamoyl group is preferably a substituted or unsubstituted sulfamoyl group containing from 0 to 30 carbon atoms, and the examples thereof include an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, and an N-(N'-phenylcarbamoyl) sulfamoyl group.

The alkyl- or aryl-sulfinyl group is preferably a substituted or unsubstituted alkylsulfinyl group containing from 1 to 30 carbon atoms, or a substituted or unsubstituted arylsulfinyl group containing from 6 to 30 carbon atoms, and the examples thereof include a methylsulfinyl group, an ethylsulfinyl group, a phenylsulfinyl group, and a p-methylphenylsulfinyl group.

The alkyl- or aryl-sulfonyl group is preferably a substituted or unsubstituted alkylsulfonyl group containing from 1 to 30 carbon atoms, or a substituted or unsubstituted arylsulfonyl group containing from 6 to 30 carbon atoms, and the examples thereof include a methylsulfonyl group, an ethylsulfonyl group, a phenylsulfonyl group, and a p-methylphenylsulfonyl group.

The acyl group is preferably a formyl group, a substituted or unsubstituted alkylcarbonyl group containing from 2 to 30 carbon atoms, a substituted or unsubstituted arylcarbonyl group containing from 7 to 30 carbon atoms, or a substituted or unsubstituted heterocyclic carbonyl group containing from 2 to 30 carbon atoms wherein the heterocyclic ring is connected to the carbonyl group via a carbon atom. Examples thereof include an acetyl group, a pivaloyl group, a 2-chloroacetyl group, a stearoyl group, a benzoylamino group, a p-n-octyloxyphenylcarbonyl group, a 2-pyridylcarbonyl group, and a 2-furylcarbonyl group.

The aryloxycarbonyl group is preferably a substituted or unsubstituted aryloxycarbony group containing from 7 to 30 carbon atoms, and the examples thereof include a phenoxycarbonyl group, an o-chlorophenoxycarbonyl group, a m-nitrophenoxycarbonyl group, and a p-t-butylphenoxycarbonyl group.

The alkoxycarbonyl group is preferably a substituted or unsubstituted alkoxycarbony group containing from 2 to 30 carbon atoms, and the examples thereof include a methoxycarbonyl group, an ethoxycarbonyl group, a t-butoxycarbonyl group, and a n-octadecyloxycarbonyl group.

The carbamoyl group is preferably a substituted or unsubstituted carbamoyl group containing from 1 to 30 carbon atoms, and the examples thereof include a carbamoyl group, an N-methylcarbamoyl group, an N,N-dimethylcarbamoyl group, an N,N-di-n-octylcarbamoyl group, and an N-(methylsulfonyl)carbamoyl group.

The aryl or heterocyclic azo group is preferably a substituted or unsubstituted aryl azo group containing from 6 to 30 carbon atoms, or a substituted or unsubstituted heterocyclic azo group containing from 3 to 30 carbon atoms, and the examples thereof include phenylazo, p-chlorophenylazo, and 5-ethylthio-1,3,4-thiadiazol-2-ylazo.

The imido group is preferably an N-succinimido group or an N-phthalimido group.

The phosphino group is preferably a substituted or unsubstituted phosphino group containing from 0 to 30 carbon atoms, and the examples thereof include a dimethylphosphino group, a diphenylphosphino group, and a methylphenoxyphosphino group.

The phosphinyl group is preferably a substituted or unsubstituted phosphinyl group containing from 0 to 30 carbon atoms, and the examples thereof include a phosphinyl group, a dioctyloxyphosphinyl group, and a diethoxyphosphinyl group.

The phosphinyloxy group is preferably a substituted or unsubstituted phosphinyloxy group containing from 0 to 30 carbon atoms, and the examples thereof include a diphenoxyphosphinyloxy group and a dioctyloxyphosphinyloxy group.

The phosphinylamino group is preferably a substituted or unsubstituted phosphinylamino group containing from 0 to 30 carbon atoms, and the examples thereof include a dimethoxyphosphinylamino group and a dimethylaminophosphinylamino group.

The silyl group is preferably a substituted or unsubstituted silyl group containing from 0 to 30 carbon atoms, and the examples thereof include a trimethylsilyl group, a t-butyldimethylsilyl group, and a phenyldimethylsilyl group.

Of the above-described substituents, with those which have a hydrogen atom, the hydrogen atom may be substituted by the above-described substituent. Examples of such substituents include an alkylcarbonylaminosulfonyl group, an arylcarbonylaminosulfonyl group, an alkylsulfonylaminocarbonyl group, and an arylsulfonylaminocarbonyl group. Examples thereof include a methylsulfonylaminocarbonyl group, a p-methylphenylsulfonylaminocarbonyl group, an acetylaminosulfonyl group, and a benzoylaminosulfonyl group.

Additionally, with respect to a preferred combination of the substituents in the compound represented by the foregoing general formula (1), those compounds are preferred wherein at least one of the various substituents is the preferred group having been described hereinbefore, those compounds are more preferred wherein more of the various substituents are the preferred groups having been described hereinbefore, and those compounds are most preferred wherein all of the substituents are the preferred groups having been described hereinbefore.

Particularly preferred combinations of the groups in the azo pigments of the invention represented by the general formula (1) contain the following (a) to (e).

(a) $W_1$ and $W_2$ each independently represents an alkoxy group (e.g., a methoxy group, an ethoxy group, an i-propoxy group, or a t-butoxy group), an amino group (e.g., a $—NH_2$ group, a methylamino group, a dimethylamino group, or an aniline group), an alkyl group (e.g., a methyl group, an ethyl group, a n-propyl group, an i-propyl group, a t-butyl group, or a cyproopyl group), or an aryl group (e.g., a phenyl group, a p-tolyl group, or a naphthyl group), more preferably represents an alkoxy group, an amino group, or an alkyl group, still more preferably an alkoxy group or an amino group, yet more preferably an alkoxy group containing a total of 5 or less carbon atoms, an amino group ($—NH_2$ group), or an alkylamino group containing a total of 5 or less carbon atoms, particularly preferably an alkoxy group containing a total of 3 or less carbon atoms, an amino group ($—NH_2$ group), or an alkylamino group containing a total of 3 or less carbon atoms, with a methoxy group ($—OCH_3$ group), an ethoxy group ($—OC_2H_5$ group), or an amino group ($—NH_2$ group) being further preferred, and a methoxy group ($—OCH_3$ group) being most preferred.

(b) $R_{11}$ and $R^{12}$ each independently represents a hydrogen atom or a substituent (for example, a substituted or unsubstituted acylamino group containing a total of from 1 to 8 carbon atoms, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms), more preferably a straight or branched alkyl group containing from 1 to 8 carbon atoms, still more preferably a methyl group, an i-propyl group, or a tert-butyl group, particularly preferably an i-propyl group or a t-butyl group, with a t-butyl group being most preferred.

(c) Z represents a divalent heterocyclic group which may further be condensed with other ring. Z preferably represents a 5- to 8-membered heterocyclic group, more preferably represents a 5- or 6-membered, substituted or unsubstituted heterocyclic group, still more preferably represents a 6-membered nitrogen-containing heterocyclic ring. Examples of preferred heterocyclic ring include a pyrrole ring, a pyrazole ring, a triazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring, a pyridazine ring, and a pyrazine ring, with a 6-membered nitrogen-containing heterocyclic group, specifically a 6-membered nitrogen-containing heterocyclic group containing from 3 to 10 carbon atoms, being particularly preferred. More preferred examples of the heterocyclic ring include a pyridine ring, a pyrimidine ring, an S-triazine ring, a pyridazine ring, and a pyrazine ring, still more preferred examples thereof include a pyridine ring, a pyrimidine ring, an S-triazine ring, a pyridazine ring, and a pyrazine ring, yet more preferred examples thereof include a pyrimidine ring and an S-triazine ring, particularly preferred examples thereof include a pyrimidine ring and an S-triazine ring, further more preferred examples thereof include a pyrimidine ring having a substituent at 4- and 6-positions and an S-triazine ring having an alkoxy group containing from 1 to 4 carbon atoms at 2-position, with a pyrimidine ring having a substituent at 4- and 6-positions being most preferred.

(d) $G_1$ and $G_2$ each independently represents a hydrogen atom, an alkyl group, a cycloalkyl group, an aralkyl group, an alkenyl group, an alkynyl group, an aryl group, or a heterocyclic group, particularly preferably a hydrogen atom, a methyl group, an ethyl group, a n-propyl group, an isopropyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, or a pyrazinyl group, more preferably represents a hydrogen atom, a methyl group, a phenyl group, a pyridyl group, a pyrimidinyl group, or a pyrazinyl group. Of these, a methyl group, a 2-pyridyl group, a 2,6-pyrimidinyl group, and a 2,5-pyrazinyl group are preferred, with a methyl group being most preferred.

(e) $Y_1$ and $Y_2$ each independently represents a hydrogen atom, an alkyl group (e.g., a methyl group), an aryl group (e.g., a phenyl group), a heterocyclic group (e.g., a 2-pyridyl group), or an alkylthio group (e.g., a methylthio group), more preferably represents a hydrogen atom, a methyl group, a phenyl group, or a methylthio group, with a hydrogen atom being most preferred.

The invention also includes in its scope tautomers of the azo pigments represented by the general formula (1).

Although the general formula (1) is shown in the form of limiting structure among several tautomer forms which are possible in view of chemical structure, the azo pigments may be tautomers of other structure than the shown one, and may be used as a mixture containing plural tautomers.

For example, with the pigment represented by the general formula (1), azo-hydrazone tautomers represented by the following general formula (1') can be considered. The invention also includes in its scope tautomers of the azo pigments represented by the general formula (1') which are tautomers of the azo pigment represented by the general formula (1).

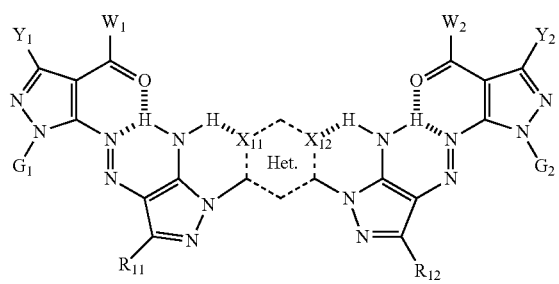

$G_1, G_2, R_{11}, R_{12}, W_1, W_2, Y_1, Y_2$ are the same as defined for $G_1, G_2, R_{11}, R_{12}, W_1, W_2, Y_1, Y_2$ in the general formula (1).

Het. represents a heterocyclic ring which Z in the above general formula 1 constitutes, and $X_{11}$ and $X_{12}$ each independently represents a hetero atom in the heterocyclic ring which Het. constitutes.

Also, in the invention, the azo pigments represented by the general formula (1) preferably have a substituent capable of forming an intramolecular hydrogen bond or an intramolecular cross hydrogen bond. The pigments preferably have at least one substituent capable of forming intramolecular cross hydrogen bond, more preferably have at least 3 substituents capable of forming intramolecular hydrogen bonds, and particularly preferably have at least three substituents capable of forming intramolecular hydrogen bonds, with at least two of the hydrogen bonds forming an intramolecular cross hydrogen bond.

Of the azo pigments represented by the general formula (1), azo pigments represented by the above general formulae (2) can be illustrated as particularly preferred azo pigments as has been said hereinbefore.

The reason that the structure is preferred is that, as is shown by the general formula (2), the nitrogen atom(s), hydrogen atom(s), and hetero atom(s) (nitrogen atoms of the azo group or its tautomer of the hydrazone group, and the oxygen atom of the carbonyl group, or the nitrogen atom of the amino group) constituting the heterocyclic ring contained in the azo pigment structure readily form at least one intramolecular cross hydrogen bond (intramolecular hydrogen bond).

More preferably, as is shown by the general formula (2), the nitrogen atom(s), hydrogen atom(s) of the amino group,

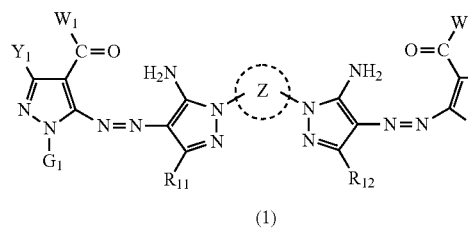

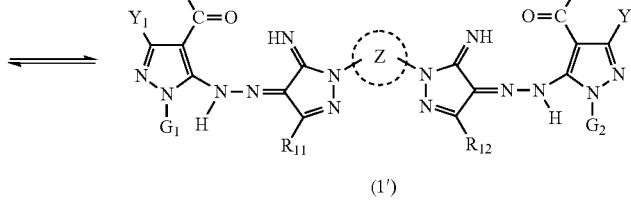

(In the general formula (1'), $R_{11}, R_{12}, W_1, W_2, Y_1, Y_2, G_1, G_2,$ and Z are the same as defined for $R_{11}, R_{12}, W_1, W_2, Y_1, Y_2, G_1, G_2,$ and Z in the general formula (1).

Of the azo pigments of the invention represented by the general formula (1), azo pigments which are represented by the following general formula (2) are preferred.

and hetero atom(s) (nitrogen atoms of the azo group or its tautomer of the hydrazone group, and the oxygen atom of the carbonyl group, or the nitrogen atom of the amino group) constituting the heterocyclic ring contained in the azo pigment structure readily form at least four intramolecular hydrogen bonds, with at least two of them being intramolecular cross hydrogen bonds.

As a result, flatness of the molecule is enhanced, the intramolecular and intermolecular mutual action (hydrogen bonding or π-π stacking) is improved, crystallinity of the azo pigment represented by, for example, the general formula (2) is enhanced (higher structure of the pigment becoming liable to be formed), and hence performances required as pigments, i.e., light fastness, heat stability, moist heat stability, water fastness, gas fastness, and/or solvent resistance, can markedly be improved, thus such pigments being most preferred.

In the invention, as to crystal forms of the azo pigment represented by the above general formula (1), there exist in some cases polymorphic crystal forms such as α-type, β-type, and γ-type. In such cases, the crystal form can be identified with ease from the results of X-ray diffraction measurement of a particular azo pigment based on the specific positions or number and intensity ratio of peaks in characteristic Cu Kα X-ray diffraction in terms of Bragg angles) (2θ±0.2°. In the invention, the measurement of X-ray diffraction can be conducted according to Japanese Industrial Standards JISK0131 (General Rule of X-ray diffractiometry) using a powder X-ray diffractometer, RINT 2500 (manufactured by Rigaku Industrial Corp.).

In the invention, the azo pigment represented by the above-described formula (1) having at least one characteristic peak at Bragg angles (2θ) of 5 to 15° and 20 to 30° in X-ray diffraction with characteristic Cu Kα line can realize, when combined with a specific vinyl polymer and an aqueous medium to be described hereinafter, excellent ink ejection properties, good hue and high print density (high tinctorial strength), and high image fastness of printed products (for example, light fastness, gas fastness, heat fastness, and water fastness). Additionally, in the invention, it is necessary for the azo pigment to satisfy the above-described requirements, whereby above-described better effects than those of other crystal form of corresponding pigment particles having the same chemical composition and the same colorant molecular structural formula can be obtained.

Additionally, "characteristic X-ray diffraction peak" as used in the invention means a powder X-ray diffraction peak which shows a particularly preferred crystal form among the crystal forms that the azo colorant represented by the same chemical structural formula can take depending upon 3-dimensional molecular alignment thereof.

Also, in the invention, the compounds represented by the general formulae (1) and (2) containing isotopes (e.g., 2H, 3H, 13C, and 15N) can also be employed.

In the invention, in view of the effects, an azo pigment represented by the following general formula (10) is more preferred, and an azo pigment represented by the general formula (11) is particularly preferred.

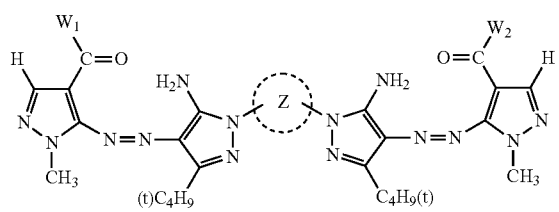

(10)

(In the general formula (10), Z represents a 5- or 6-membered, nitrogen-containing heterocyclic ring, and $W_1$ and $W_2$ each independently represents an alkoxy group, an amino group, an alkyl group, or an aryl group.

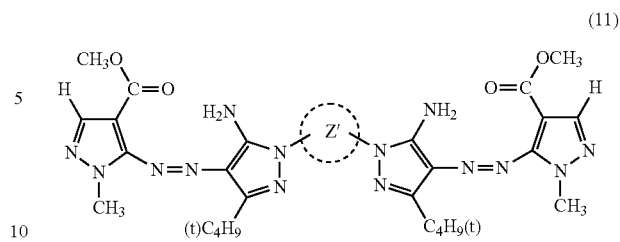

(11)

(In the general formula (11), Z' represents a 6-membered nitrogen-containing heterocyclic ring.)

As the 6-membered nitrogen-containing heterocyclic ring represented by Z' in the general formula (11), there are illustrated the same ones as the 6-membered nitrogen-containing heterocyclic ring represented by Z in the general formula (1), and preferred examples are also the same as described there.

Specific examples of the azo pigments represented by the foregoing general formulae (1) and (2) will be shown below which, however, do not limit azo pigments to be used in the invention. Also, each of the following structures of the specific examples is shown in the limiting structural formula selected from among several tautomers possible in view of chemical structure. However, needless to say, the pigments may be in other tautomer structures than the descried ones.

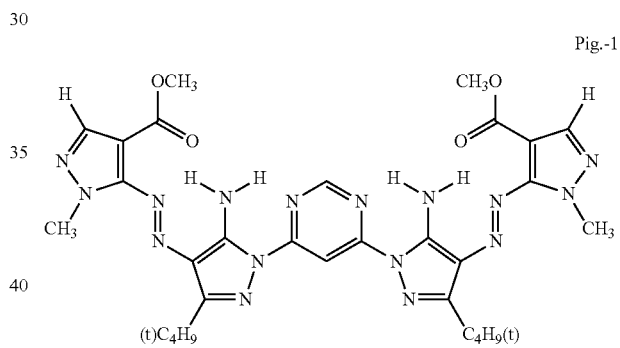

Pig.-1

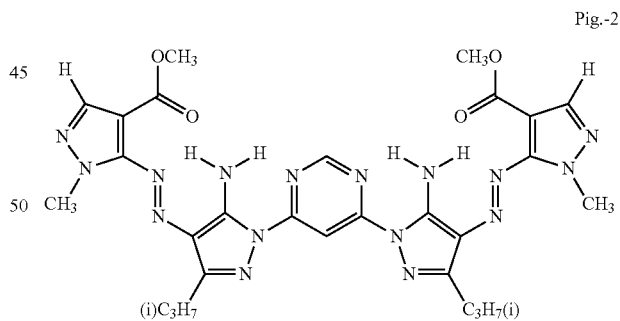

Pig.-2

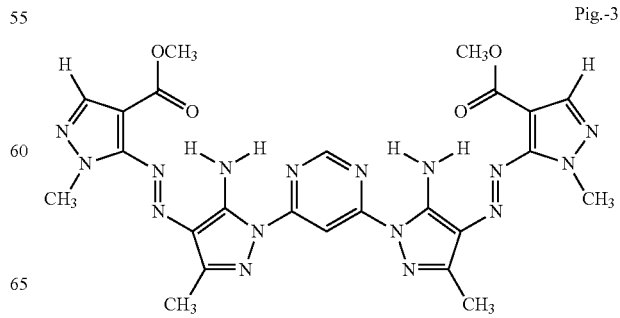

Pig.-3

-continued

-continued

-continued

-continued

-continued

Pig.-43
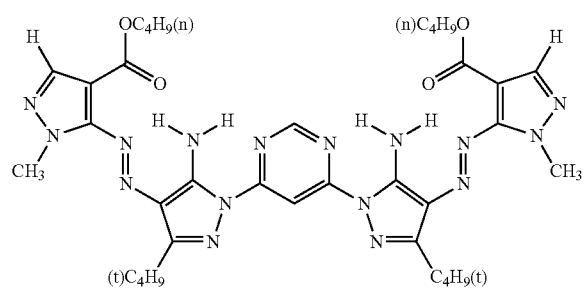

Pig.-44
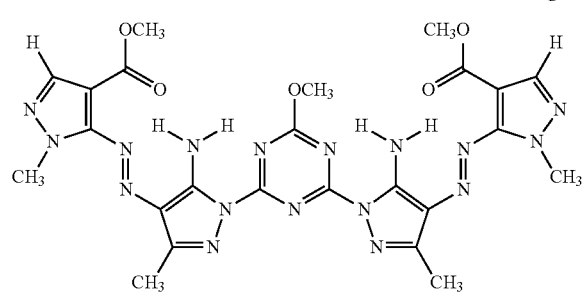

Pig.-45
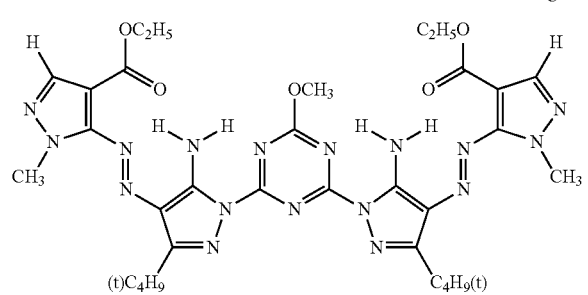

Pig.-46
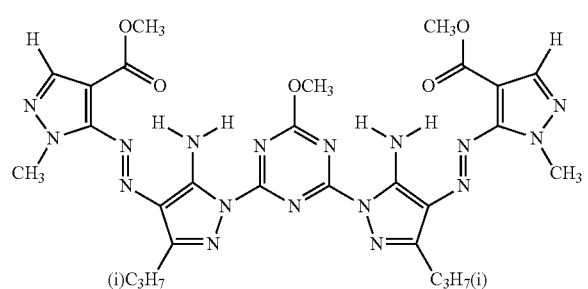

Of the above-described pigments, Pig.-1, Pig.-18, and Pig.-25 are preferred in view of the effects of the invention. As Pig.-1, a crystal form having characteristic X-ray diffraction peaks at Bragg angles (2θ±0.2°) of 7.6, 25.6, and 27.7° in X-ray diffraction with characteristic Cu Kα line is preferred. As Pig.-18, a crystal form having characteristic X-ray diffraction peaks at Bragg angles (2θ±0.2°) of 7.2 and 25.9° in X-ray diffraction with characteristic Cu Kα line is preferred. As Pig.-25, a crystal form having characteristic X-ray diffraction peaks at Bragg angles (2θ±0.2°) of 7.5°, 11.2°, 18.6°, 21.2°, and 23.9° in X-ray diffraction with characteristic Cu Kα line is preferred.

That is, in one embodiment of the invention, with the azo pigment represented by the general formula (1), a tautomer thereof, or a salt or hydrate thereof, the azo pigment represented by the following general formula (1a) and having characteristic X-ray diffraction peaks at Bragg angles (2θ±0.2°) of 7.2° and 25.9° in X-ray diffraction with characteristic Cu Kα line, and a tautomer thereof are preferred.

(1a)
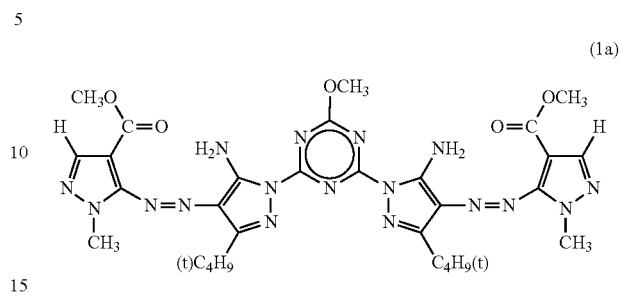

In another embodiment of the invention, with the azo pigment represented by the general formula (1), a tautomer thereof, or a salt or hydrate thereof, the azo pigment represented by the following general formula (2a) and having characteristic X-ray diffraction peaks at Bragg angles) (2θ±0.2° of 7.6, 25.6°, and 27.7° in X-ray diffraction with characteristic Cu Kα line, and a tautomer thereof are preferred.

(2a)
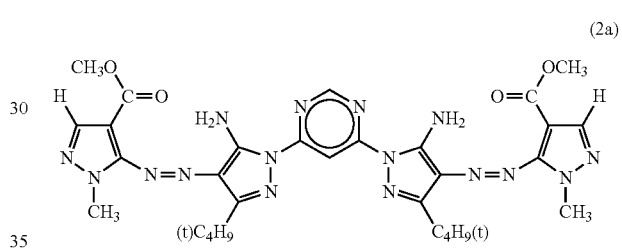

In further embodiment of the invention, with the azo pigment represented by the general formula (1), a tautomer thereof, or a salt or hydrate thereof, the azo pigment represented by the following general formula (3a) and having characteristic X-ray diffraction peaks at Bragg angles) (2θ±0.2°) of 7.5°, 11.2°, 18.6°, 21.2,°, and 23.9° in X-ray diffraction with characteristic Cu Ka line, and a tautomer thereof are preferred.

(3a)
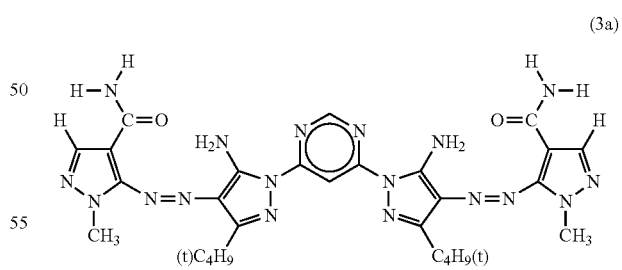

In the invention, even when tautomers exist due to the structures of the compounds, they are described in one typical form thereof. However, tautomers of different structures than those described in the invention are also included in the azo pigments of the invention. Further, salts and hydrates of the azo pigments of the invention are also included in the azo pigments of the invention.

The pigments of the invention represented by the general formula (1) may have a chemical structure represented by the general formula (1) or may be the tautomers thereof, and may be the pigments of any crystal form called polymorphic form.

Polymorphism means that crystals having the same chemical composition can be different from each other in the conformation of building block (molecules or ions) in the crystal. Chemical and physical properties of the pigments are decided by the crystal structure, and polymorphic forms of the same pigment can be discriminated from each other by rheology, color, and other color characteristics. Also, different polymorphic forms can be confirmed by X-Ray Diffraction (results of powder X-ray diffractometry) or by X-Ray Analysis (results of X-ray analysis of crystal structure).

In the case where the pigments of the invention represented by the general formulae (1) and (2) exhibit polymorphism, they may be in any polymorphic forms and may be a mixture of two or more polymorphic forms. However, pigments wherein a single crystal form is predominant are preferred. That is, pigments not contaminated with polymorphic form crystals are preferred. The content of the azo pigment having a single crystal form is from 70% to 100%, preferably from 80% to 100%, more preferably from 90% to 100%, still more preferably from 95% to 100%, particularly preferably 100%, based on the entire azo pigment. When the azo pigment contains a single crystal form azo pigment as a major component, regularity of alignment of the pigment molecules is improved, and the intramolecular and intermolecular mutual action is enhanced, thus a high-level three-dimensional network being easily formed. As a result, performances required for pigments, such as hue, light fastness, humidity fastness, fastness to an oxidative gas, and solvent resistance, are improved, thus the above-described content being preferred.

The mixing ratio of polymorphic forms in the azo pigment can be confirmed from values obtained by physicochemical measurement such as X-ray crystal structure analysis of single crystal, powder X-ray diffractometry (XRD), microscopic photography of the crystals (TEM), or IR (KBr method).

With those which have acid groups among the azo pigments of the invention represented by the general formula (1), part or all of the acid groups may be in a salt form, or the pigment may be a mixture of a salt type pigment and a free acid type pigment. Examples of the salt type include salts of an alkali metal such as Na, Li, or K, salts of an alkaline earth metal such as Mg, Ca, or Ba, salts of ammonium optionally substituted by an alkyl group or a hydroxyalkyl group, and salts of an organic amine. Examples of the organic amine include a lower alkyl amine, a hydroxyl-substituted lower alkyl amine, a carboxy-substituted lower alkyl amine, and a polyamine having from 2 to 10 alkyleneimine units containing from 2 to 4 carbon atoms. With these salt type pigments, they are not necessarily limited to one as to kind, but may be in a mixture of two or more thereof.

Further, as to the structure of the pigment to be used in the invention, in the case where plural acid groups exist in one molecule, the plural acid groups may be of a salt type or an acid type, and may be different from each other.

The azo pigments represented by the general formula (1) may be hydrates which contain water molecules within the crystal.

Next, one example of a process for producing the azo pigment represented by the above general formula (1) will be described below. For example, a heterocyclic amine represented by the following general formula (A) is diazotized under acidic condition, then subjected to a coupling reaction with a compound represented by the following general formula (B), and subjected to an after-treatment in a conventional manner to thereby produce the azo pigment represented by the general formula (1).

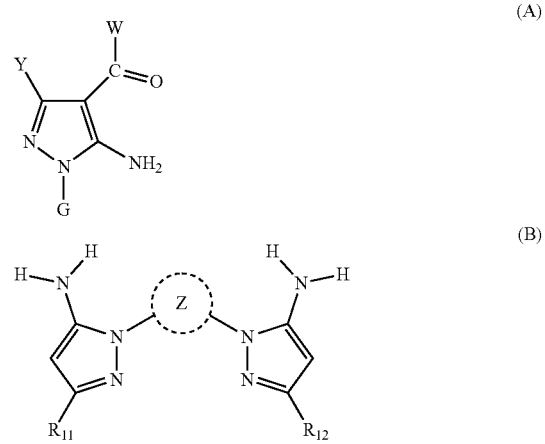

In the general formulae (A) and (B), G, Y, W, $R_{11}$, $R_{12}$, and Z are the same as corresponding $G_1$, $G_2$, $Y_1$, $Y_2$, $W_1$, $W_2$, $R_{11}$, $R_{12}$, and Z in the general formula (1).

The heterocyclic amines represented by the general formula (A) can generally be produced by a known conventional process, for example, a process described in Helv. Chim. Acta. 41, 1958, 1052-1056 or in Helv. Chim. Acta. 42, 1959, 349-352, or a similar process.

The compounds represented by the general formula (B) can generally be produced by a process described in WO 06/082669 or in JP-A-2006-57076, or a similar process.

The diazotization reaction of the heterocyclic amine represented by the general formula (A) can be conducted, for example, by reacting it with a reagent such as sodium nitrite, nitrosylsulfonic acid, or isoamyl nitrite in an acidic solvent such as sulfuric acid, phosphoric acid, acetic acid, hydrochloric acid, or methanesulfonic acid at a temperature of 15° C. or less for about 10 minutes to about 6 hours.

The coupling reaction is preferably conducted by reacting the diazonium salt obtained by the above-mentioned process with the compound represented by the general formula (B) at 40° C. or less, preferably 25° C. or less, for about 10 minutes to about 12 hours.

The product obtained by the reaction may form precipitated crystals but, in general, water or an alcoholic solvent is added to the reaction solution to thereby precipitate crystals, and the precipitated crystals can be collected by filtration. Also, an alcoholic solvent or water may be added to the reaction solution to thereby precipitate crystals, and the precipitated crystals can be collected by filtration. The crystals thus collected by filtration are washed and dried, as needed, to obtain the azo pigment represented by the general formula (1).

The compounds represented by the general formula (1) are obtained as a crude azo pigment (crude) by the above-described production process. In the case of using them as the pigments of the invention, they are preferably subjected to after-treatment. As methods of the after-treatment, there are illustrated, for example, a pigment particle-controlling step such as milling treatment (e.g., solvent-salt milling, salt milling, dry milling, solvent milling or acid pasting) or solvent heating treatment; and a surface-treating step using, for example, a resin, a surfactant or a dispersing agent.

The compound of the invention represented by the general formula (1) is preferably subjected to the after-treatment of solvent heating treatment and/or solvent salt milling.

Examples of the solvent to be used in the solvent heating treatment include water; aromatic hydrocarbon series solvents such as toluene and xylene; halogenated hydrocarbon series solvents such as chlorobenzene and o-dichlorobenzene; alcoholic solvents such as isopropanol and isobutanol; polar aprotic organic solvents such as N,N-dimethylformamide, N,N-dimethylacetamide, and N-methyl-2-pyrrolidone; glalcial acetic acid; pyridine; and a mixture thereof. An inorganic or organic acid or base may further be added to the above-described solvents. The temperature of the solvent heating treatment varies depending upon the desired primary particle size of the pigment, but is preferably from 40 to 150° C., more preferably from 60 to 100° C. Also, the treating time is preferably from 30 minutes to 24 hours.

As the solvent-salt milling, there is illustrated, for example, the procedure wherein a crude azo pigment, an inorganic salt, and an organic solvent which does not dissolve them are placed in a kneader, and knead-milling of the mixture is conducted therein. As the inorganic salt, water-soluble inorganic salts can preferably be used. For example, inorganic salts such as sodium chloride, potassium chloride, and sodium sulfate are preferably used. Also, it is more preferred to use inorganic salts having an average particle size of from 0.5 to 50 μm. The amount of the inorganic salt to be used is preferably a 3- to 20-fold amount by weight, more preferably a 5- to 15-fold amount by weight, based on the crude pigment. As the organic solvent, water-soluble organic solvents can preferably be used and, since the solvent becomes easily vaporizable due to an increase in temperature upon kneading, high-boiling solvents are preferred in view of safety. Examples of such organic solvents include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, and a mixture thereof. The amount of the water-soluble organic solvent to be used is preferably a 0.1- to 5-fold amount by weight based on the crude azo pigment. The kneading temperature is preferably from 20 to 130° C., particularly preferably from 40 to 110° C. As a kneader, there can be used, for example, a kneader or a mix muller.

(Water-Insoluble Vinyl Polymer)

The water-insoluble vinyl polymer to be used in the invention has a structural unit represented by the following general formula (A1), a structural unit derived from a salt-forming group-having monomer (a), and a structural unit derived from a styrene series macromer (b) and/or a hydrophobic monomer (c):

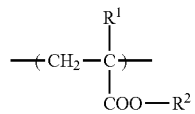

(A1)

(in the general formula (A1), $R^1$ represents a hydrogen atom or a methyl group, and $R^2$ represents an arylalkyl group which may have a substituent).

In the general formula (A1), $R^1$ represents a hydrogen atom or a methyl group. $R^2$ may have a substituent, and represents an arylalkyl group containing from 7 to 22, preferably from 7 to 18, still more preferably from 7 to 12 carbon atoms or represents an aryl group containing from 6 to 22, preferably from 6 to 18, still more preferably from 6 to 12 carbon atoms. The substituent may contain a hetero atom. Examples of the hetero atom include nitrogen atom, oxygen atom, and sulfur atom.

Specific examples of $R^2$ include a benzyl group, a phenethyl group (phenylethyl group), a phenoxyethyl group, a diphenylmethyl group, and a trityl group.

Specific examples of the substituent include an alkyl group, an alkoxy group or an acyloxy group containing, preferably, from 1 to 9 carbon atoms, a hydroxyl group, an ether group, an ester group, and a nitro group.

As the structural unit represented by the general formula (A1), a structural unit derived from benzyl (meth)acrylate is particularly preferred in view of realizing high glossiness.

The structural unit represented by the general formula (A1) is preferably obtained by polymerizing a monomer represented by the following general formula (A1-1):

(in the general formula (A1-1), $R^1$ and $R^2$ are the same as defined hereinbefore).

Specifically, the polymer having the structural unit represented by formula (1) can be synthesized by polymerizing phenyl (meth)acrylate, benzyl (meth)acrylate, 2-phenylethyl (meth)acrylate, phenoxyethyl (meth)acrylate, 1-naphthyl acrylate, 2-naphthyl (meth)acrylate, phthalimidomethyl (meth)acrylate, p-nitrophenyl (meth)acrylate,e 2-hydroxy-3-phenoxypropyl (meth)acrylate, 2-methacryloyloxyethyl-2-hydroxypropyl phthalate, or 2-acryloyloxyethylphthalic acid. Of these, benzyl (meth)acrylate is particularly preferred. These may be used independently or as a mixture of two or more thereof.

Additionally, the term "(meth)acrylate" as used in the invention means "acrylate", "methacrylate", or a mixture thereof The water-insoluble vinyl polymer to be used in the invention preferably further contains a structural unit represented by the following general formula (A2):

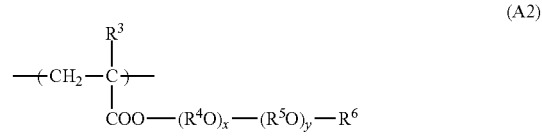

(A2)

(in the general formula (A2), $R^3$ represents a hydrogen atom or a methyl group, $R^4O$ represents an oxypropylene group, $R^5O$ represents an oxyalkylene group containing 2 or 4 carbon atoms, $R^6$ represents a hydrogen atom, an alkyl group, or a phenyl group which may have an alkyl group, x and y each represents an average addition mole number, with each of y $R^5Os$ being the same or different from every other $R^5O$).

In the general formula (A2), $R^3$ represents a hydrogen atom or a methyl group, and $R^4O$ represents an oxypropylene group. $R^4O$ may include —CH(CH$_3$)CH$_2$O— in addition to —CH$_2$CH(CH$_3$)O—. $R^5O$ represents an oxyalkylene group containing 2 or 4 carbon atoms, and represents an oxyethylene group or an oxytetramethylene group.

$R^6$ represents a hydrogen atom, an alkyl group containing from 1 to 20 carbon atoms or a phenyl group which may have an alkyl group containing from 1 to 9 carbon atoms. In view of high print density and good storage stability, $R^6$ is preferably an alkyl group containing from 1 to 12 carbon atoms, more preferably an alkyl group containing from 1 to 8 carbon atoms. Also, it is preferably a phenyl group which may have an alkyl group containing from 1 to 8 carbon atoms. Examples of the alkyl group containing from 1 to 8 carbon atoms include a methyl group, an ethyl group, a propyl group, an isopropyl group, a butyl group, a t-butyl group, a hexyl group, an octyl group, and a 2-ethylhexyl group.

$R^4O$ and $R^5O$ are incorporated by random-addition or block-addition. In the case where $R^4O$ and $R^5O$ are incorporated by block-addition, either of —COO—$(R^4)_x$—$(R^5O)_y$—$R^6$ and —COO—$(R^5)$x-$(R^4O)$y-$R^6$ suffices. x and y each represents average addition mole number, and x is a number of from 1 to 30, preferably from 3 to 20, particularly preferably from 3 to 15. y is a number of from 0 to 30, preferably from 0 to 20, still more preferably from 0 to 15, with each of y $R^5$Os being the same as or different from every other $R^5O$.

The structural unit represented by the general formula (A2) is preferably obtained by polymerizing a monomer represented by the following general formula (A2-1):

$$CH_2{=}CR^3COO{-}(R^4O)x{-}(R^5O)y{-}R^6 \qquad (A2\text{-}1)$$

(in the general formula, $R^3$, $R^4O$, $R^5O$, $R^6$, x, and y are the same as described hereinbefore).

Of the structural units represented by the general formula (A2), a structural unit represented by the following general formula (A3) or (A4) is preferred since it can impart high print density. The water-insoluble vinyl polymer to be used in the invention may have both the structural unit represented by the following general formula (A3) and the structural unit represented by the following general formula (A4):

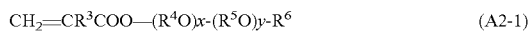

(A3)

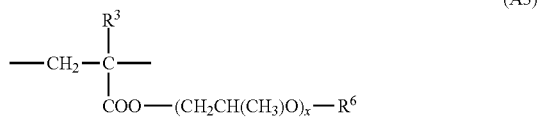

(in the general formula (A3), $R^3$, x, and $R^6$ are the same as described hereinbefore).

The general formula (A3) corresponds to the general formula (A2) wherein y is 0.

The structural unit represented by the general formula (A3) is preferably obtained by polymerizing a monomer represented by the following general formula (A3-1):

$$CH_2{=}CR^3COO{-}(CH_2CH(CH_3)O)x{-}R^6 \qquad (A3\text{-}1)$$

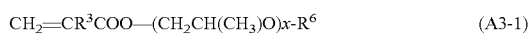

(in the general formula, $R^3$, $R^6$ and x are the same as described hereinbefore).

Specific examples thereof include polypropylene glycol mono(meth)acrylate, methoxypolypropylene glycol mono (meth)acrylate, ethoxypolypropylene glycol mono(meth) acrylate, octoxypolypropylene glycol mono(meth)acrylate, stearoxypolypropylene glycol mono(meth)acrylate, nonylphenoxypolypropylene glycol mono(meth)acrylate, and phenoxypolypropylene glycol mono(meth)acrylate. Of these, polypropylene glycol mono(meth)acrylate is particularly preferred. These may be used alone or as a mixture of two or more thereof.

On the other hand, the general formula (A4) corresponds to the general formula (A2) wherein y is 1 or more.

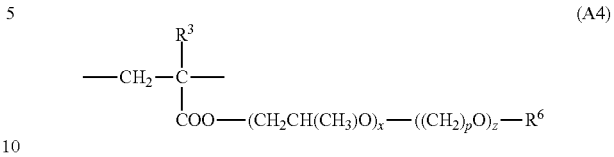

(A4)

(In the general formula (A4), $R^3$, $R^6$ and x are the same as described hereinbefore. ($CH_2CH(CH_3)O$) and (($CH_2$)PO) are incorporated by random-addition or block-addition. In the case of block-addition, either of —COO—$(R^4)$x-$(R^5O)Z$—$R^6$ and —COO—$(R^5)$x-$(R^4O)Z$—$R^6$ suffices. p is a number of 2 or 4, and z represents an average addition mole number, and is a number of from 1 to 30, preferably from 2 to 20, still more preferably from 3 to 15.)

The structural unit represented by the general formula (A4) is preferably obtained by polymerizing a monomer represented by the following general formula (A4-1) or (A4-2):

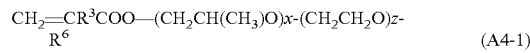

(A4-1)

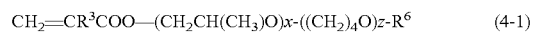

(4-1)

(In the general formula (A4), $R^3$, $R^6$, x, and z are the same as described hereinbefore. ($CH_2CH(CH_3)O$) and (($CH_2CH_2$) O), and ($CH_2CH(CH_3)O$) and (($CH_2)_4O$) are incorporated by random-addition or block-addition. In the case of block-addition, either of $CH_2{=}CR^3COO{-}(CH_2CH(CH_3)O)$x-$(CH_2CH_2O)$z-$R^6$ and $CH_2{=}CR^3COO{-}(CH_2CH_2O)$z-$(CH_2CH(CH_3)O)$x-$R^6$, and either of $CH_2{=}CR^3COO{-}$ $(CH_2CH(CH_3)O)$x-$((CH_2)_{4O})$z-$R^6$ and $CH_2{=}CR^3COO{-}$ $((CH_2)4O)$z $(CH_2CH(CH_3)O)$x-$R^6$ suffices.)

Specific examples thereof include ethylene glycol/propylene glycol (meth)acrylate, poly(ethylene glycol/propylene glycol) mono(meth)acrylate [wherein ethylene glycol and propylene glycol are bound in a random manner], octoxypolyethylene glycol/polypropylene glycol mono(meth)acrylate [wherein polyethylene glycol and polypropylene glycol are bound in a block manner, with polyethylene glycol block and polypropylene glycol block being bound in this order from the (meth)acryl group side, or in reverse order; hereinafter the same], octoxypoly(ethylene glycol/propylene glycol) mono(meth)acrylate, stearoxypolyethylene glycol/ polypropylene glycol mono(meth)acrylate, stearoxypoly (ethylene glycol/propylene glycol) mono(meth)acrylate, phenoxypolyethylene glycol/polypropylene glycol mono (meth)acrylate, phenoxypoly(ethyleneglycol/propylene glycol) mono(meth)acrylate, nonylphenoxypolyethylene glycol/polypropylene glycol mono(meth)acrylate, nonylphenoxypoly(ethylene glycol/propylene glycol) mono (meth)acrylate, and poly(propylene glycol/tetramethylene glycol) monomethacrylate. Of these, poly(ethylene glycol/ propylene glycol) mono(meth)acrylate and poly(propylene glycol/tetramethylene glycol) monomethacrylate are particularly preferred. These may be used alone or as a mixture of two or more thereof.

In view of obtaining both printing density and glossiness and imparting rub-fastness, the weight ratio of the structural unit represented by the foregoing general formula (A1) to the structural unit represented by the foregoing general formula (A2) in the water-insoluble vinyl polymer to be used in the invention [structural unit represented by the general formula (A1/structural unit represented by the general formula (A2)]

is preferably from 1/2 to 10/1, more preferably from 1/2 to 8/1, still more preferably from 1/2 to 5/1, most preferably from 1/1 to 5/1.

The water-insoluble vinyl polymer to be used in the invention contains a structural unit derived from a salt-forming group-containing monomer (a). The structural unit derived from the salt-forming group-containing monomer (a) can be obtained by polymerizing the salt-forming group-containing monomer (a) but, alternatively, a salt-forming group (an anionic group or a cationic group) may be introduced into a polymer chain after forming the polymer by polymerization.

As the salt-forming group-containing monomer (a), anionic monomer (a-1) and a cationic monomer (a-2) are preferred.

As the anionic monomer (a-1), there are illustrated one or more members selected from the group consisting of an unsaturated carboxylic acid monomer, an unsaturated sulfonic acid monomer, and an unsaturated phosphoric acid monomer.

Examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid.

Examples of the unsaturated sulfonic acid monomer include styrenesulfonic acid, 2-acrylamido-2-methylpropanesulfonic acid, 3-sulfopropyl (meth)acrylate, and bis(3-sulfopropyl)itaconic ester.

Examples of the unsaturated phosphoric acid monomer include vinylphosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate.

Among the above anionic monomers, in view of viscosity and ejection properties of the resultant inks, the unsaturated carboxylic acid monomers are preferred, with acrylic acid and methacrylic acid being more preferred.

As the cationic monomer (a-2), there are illustrated one or more members selected from the group consisting of an unsaturated tertiary amine-containing vinyl monomer and an unsaturated ammonium salt-containing vinyl monomer.

Examples of the unsaturated tertiary amine-containing vinyl monomer include N,N-dimethylaminoethyl (meth)acrylate, N,N-dimethylaminopropyl (meth)acrylate, N,N-diethylaminoethyl (meth)acrylate, N,N-dimethylaminopropyl (meth)acrylamide, vinylpyrrolidone, 2-vinylpyridine, 4-vinylpyridine, 2-methyl-6-vinylpyridine, and 5-ethyl-2-vinylpyridine.

Examples of the unsaturated ammonium salt-containing monomer include quaternized product of N,N-dimethylaminoethyl (meth)acrylate, a quaternized product of N,N-diethylaminoethyl (meth)acrylate, and a quaternized product of N,N-dimethylaminopropyl (meth)acrylate.

Among the above anionic monomers, N,N-dimethylaminoethyl (meth)acrylate, N,N-dimethylaminopropyl (meth)acrylate, and vinylpyrrolidone are preferred.

The above-described salt-forming group-containing monomers (a) may be used alone or as a mixture of two or more thereof.

In view of improving dispersion stability, printing density, and marker fastness, the water-insoluble vinyl polymer to be used in the invention further contains a structural unit derived from a styrene series macromer (b) and/or a hydrophilic monomer (c).

Examples of the structural unit derived from the styrene series macromer (b) include a styrene homopolymer having a polymerizable functional group at one end thereof and a copolymer with a monomer other than styrene. The polymerizable functional group existing at one end is preferably an acryloyloxy group or methacryloyloxy group, and a water-insoluble vinyl polymer having the structural unit derived from a styrene series macromer can be obtained by copolymerizing these.

Examples of other monomer include (1) (meth)acrylonitrile, (2) a (meth)acrylate containing from 1 to 22, preferably from 1 to 18 carbon atoms and optionally having a hydroxyl group, (3) a monomer containing an aromatic ring other than styrene.

Specific examples of (meth)acrylates (2) include methyl (meth)acrylate, ethyl (meth)acrylate, (iso)propyl (meth)acrylate, 2-hydroxyethyl (meth)acrylate, (iso- or tertiary-)butyl (meth)acrylate, 2-ethylhexyl (meth)acrylate, (iso)octyl (meth)acrylate, (iso)decyl (meth)acrylate, and (iso)stearyl (meth)acrylate.

Additionally, "(iso or tertiary)" and "(iso)" as used in this specification mean both the case where a branched structure represented by "iso" or "tertiary" exists and the case where such branched structure does not exist (normal).

Also, examples of the monomer containing an aromatic ring other than styrene include aromatic ring-containing vinyl monomers containing from 6 to 22 carbon atoms, such as α-methylstyrene, vinyltoluene, vinylnaphthalene, ethylvinylbenzene, 4-vinylbiphenyl, 1,1-diphenylethylene, benzyl (meth)acrylate, phenoxyethyl (meth)acrylate, 2-hydroxy-3-phenoxypropyl acrylate, and 2-methacryloyloxyethyl-2-hydroxypropyl phthalate.

These may be used alone or as a mixture of two or more thereof.

In view of sufficient incorporation of the coloring material in the water-insoluble vinyl polymer particles and improvement of printing density, the content of the structural unit derived from styrene in the styrene series macromer (b) is preferably 60% by weight or more, more preferably 70% by weight or more, particularly preferably 90% by weight or more.

As a styrene-based macromer, one obtained by suitable synthesis may be used, or a commercially available product may be used.

In view of keeping viscosity at a low level while increasing copolymerization ratio in order to enhance storage stability, the number-average molecular weight of the styrene series macromer (b) is preferably from 1,000 to 10,000, more preferably from 2,000 to 8,000.

The number-average molecular weight of the styrene series macromere is a value obtained by measuring according to gel permeation chromatography using as a solvent tetrahydrofuran containing 50 mmol/L of acetic acid and using polystyrene as the standard material.

Examples of the commercially available product of the styrene series macromer include AS-6, AS-6S, AN-6, AN-6S, HS-6, and HS-6S manufactured by Toagosei Co., Ltd.

On the other hand, the structural unit derived from the hydrophobic monomer (c) can be obtained by polymerizing the hydrophobic monomer but, alternatively, a hydrophobic monomer may be introduced into a polymer chain after forming the polymer by polymerization.

As the hydrophobic monomer (c), a (meth)acrylate (c-1) having an alkyl group containing from 1 to 22 carbon atoms or a monomer (c-2) represented by the following general formula (A5) is preferred:

$$CH_2=C(R^7)-R^8 \qquad (A5)$$

(in the general formula, $R^7$ represents a hydrogen atom or an alkyl group containing from 1 to 5 carbon atoms, and $R^8$ represents an aromatic ring-containing hydrocarbon group containing from 6 to 22 carbon atoms).

Examples of the (meth)acrylate (c-1) having an alkyl group containing from 1 to 22 carbon atoms include methyl (meth) acrylate, ethyl (meth)acrylate, (iso)propyl (meth)acrylate, (iso- or tertiary-)butyl (meth)acrylate, 2-ethylhexyl (meth) acrylate, (iso)octyl (meth)acrylate, (iso)decyl (meth)acrylate, (iso)dodecyl (meth)acrylate, (iso)stearyl (meth)acrylate, and behenyl (meth)acrylate.

As the monomer (c-2) represented by the general formula (A5), one or more member selected from styrene, vinylnaphthalene, α-methylstyrene, vinyltoluene, ethylvinylbenzene, 4-vinylbiphenyl, and 1,1-diphenylethylene are preferred in view of printing density. Of these, one or more of the styrene series monomers selected from styrene, α-methylstyrene, and vinyltoluene are more preferred.

The water-insoluble vinyl polymer to be used in the invention may further contain other structural unit. Examples of the other structural unit preferably include structural units derived from silicone series macromers having a polymerizable functional group at one end and represented by the following general formula (A6) and alkyl methacrylate series macromers having a polymerizable functional group at one end (e.g., methyl methacrylate series macromer, butyl acrylate series macromer, or isobutyl methacrylate series macromer):

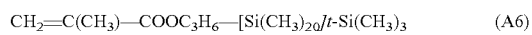

(in the general formula, t represents a number of from 8 to 40).

The water-insoluble vinyl polymer is preferably a polymer obtained by copolymerizing a monomer mixture containing the monomer represented by the foregoing general formula (A1-1), the salt-forming group-containing monomer (a), the styrene series macromer (b) and/or the hydrophobic monomer (c) and, as needed, a monomer represented by the foregoing general formula (A2-1) (hereinafter referred to as "monomer mixture").

The content of the monomer represented by the foregoing general formula (A1-1) in this monomer mixture or of the structural unit represented by the foregoing general formula (A1) in the water-insoluble vinyl polymer is preferably from 10 to 80% by weight, more preferably from 20 to 80% by weight, particularly preferably from 25 to 75% by weight, in view of improvement of printing density and glossiness as an aqueous ink, and rub-fastness and good dispersion stability.

The content of the salt-forming group-containing monomer (a) (content as non-neutralized form, hereinafter the same) in the monomer mixture or the content of the structural unit derived from the salt-forming group-containing monomer (a) in the water-insoluble vinyl polymer is preferably from 3 to 30% by weight, more preferably from 5 to 25% by weight, particularly preferably from 5 to 20% by weight, in view of improvement of printing density and glossiness as an aqueous ink, and good dispersion stability.

The content of the styrene series macromer (b) in the monomer mixture or the content of the structural unit derived from the styrene series macromer (b) in the water-insoluble vinyl polymer is preferably from 0 to 40% by weight, more preferably from 5 to 35% by weight, particularly preferably from 5 to 30% by weight, in view of improvement of printing density as an aqueous ink.

The content of the hydrophobic monomer (c) in the monomer mixture or the content of the structural unit derived from the hydrophobic monomer (c) in the water-insoluble vinyl polymer is preferably from 0 to 40% by weight, more preferably from 0 to 20% by weight, in view of improvement of printing density and good dispersion stability as an ink.

In the invention, at least one of the styrene series macromer (b) and the hydrophobic monomer (c) is necessary, with the styrene series macromer (b) being more preferred to contain.

The content of the monomer represented by the foregoing general formula (A2-1) in this monomer mixture or of the structural unit represented by the foregoing general formula (A2) in the water-insoluble vinyl polymer is preferably from 5 to 60% by weight, more preferably from 8 to 55% by weight, particularly preferably from 10 to 50% by weight, in view of improvement of printing density and glossiness as an aqueous ink, and rub-fastness and good dispersion stability.

Also, the weight ratio of [structural unit represented by the general formula (A2)/structural unit derived from the salt-forming group-containing monomer (a)] is preferably from 10/1 to 1/1, more preferably from 5/1 to 1/1 in view of improving dispersibility of the water-insoluble vinyl polymer and printing density.

Regarding "water-insoluble" of the water-insoluble vinyl polymer to be used in the invention, the dissolution amount (25° C.) of the vinyl polymer in 100 g of water after 100% neutralizing with sodium hydroxide or acetic acid according to kind of the salt-forming group is preferably 10 g or less, more preferably 5 g or less, particularly preferably 5 g or less, in view of obtaining low viscosity of the aqueous ink.

The water-insoluble vinyl polymer is used after neutralizing the salt-forming group derived from the salt-forming group-containing monomer with a neutralizing agent to be described hereinafter. The neutralization degree of the salt-forming group is preferably from 10 to 200%, more preferably from 20 to 150%, particularly preferably from 50 to 150%.

Here, the term "neutralization degree" can be determined according to the following general formula in the case where the salt-forming group is an anionic group.

{[Weight (g) of neutralizing agent/equivalent amount of neutralizing agent]/[acid value of polymer (KOH mg/g)×weight (g) of polymer/(56×1000)]}×100

In the case where the salt-forming group is an anionic group, the neutralization degree can be determined according to the following general formula.

{[Weight (g) of neutralizing agent/equivalent amount of neutralizing agent]/[amine value of polymer (HCL mg/g)×weight (g) of polymer/(36.5× 1000)]}×100

The acid value or the amine value can be determined by calculation based on structural units of the water-insoluble vinyl polymer. Alternatively, it can also be determined by dissolving the polymer in a suitable solvent (e.g., methyl ethyl ketone) and titrating the solution.

In view of dispersion stability of coloring material, water fastness, and ejection properties, the weight-average molecular weight of the water-insoluble vinyl polymer to be used in the invention is preferably from 5,000 to 500,000, more preferably from 10,000 to 400,000, particularly preferably from 10,000 to 300,000.

Additionally, the weight-average molecular weight of the water-insoluble vinyl polymer is measured according to the method of gel chromatography using, as a solvent, dimethylformamide containing 60 mmol/L of phosphoric acid and 50 mmol/L of lithium bromide and using polystyrene as a standard substance.

In the case where the water-insoluble vinyl polymer to be used in the invention is a graft polymer, it has 2 or more hydroxyl groups and/or 1 or more carboxyl groups at the end of the main chain.

Here, to have 2 or more hydroxyl groups and/or 1 or more carboxyl groups at the end of the polymer means that, when a hetero atom other than carbon atom is contained in the main chain of the polymer and when the main chain is divided into two moieties at the hetero atom, 2 or more hydroxyl groups and/or 1 or more carboxyl groups exist on the side having a smaller molecular weight. Examples of the hetero atom include S, O, and N. The molecular weight on the smaller molecular weight side is preferably from 45 to 500, still more preferably from 45 to 300, particularly preferably from 45 to 200.

Such water-insoluble vinyl polymer can be obtained by, for example, copolymerizing the monomer mixture according to known polymerization methods such as bulk polymerization, solution polymerization, suspension polymerization, and emulsion polymerization in the presence of a chain transfer agent having 2 or more hydroxyl groups and/or a chain transfer agent having 1 or more carboxyl group to be described hereinafter. Of these polymerization methods, solution polymerization method is preferred.

Solvents to be used in the solution polymerization method are not particularly limited, but polar organic solvents are preferred. When the polar organic solvent has water compatibility, it may be used as a mixture with water. Examples of the polar organic solvent include aliphatic alcohols containing from 1 to 3 carbon atoms such as methanol and ethanol; ketones such as acetone and methyl ethyl ketone; and esters such as ethyl acetate. Of these, methanol, ethanol, acetone, methyl ethyl ketone, or a mixed solvent of one or more thereof with water is preferred.

Upon polymerization, a radical polymerization initiator can be used. As the radical polymerization initiator, azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile), and 1,1'-azobis(1-cyclohexanecarbonitrile) are appropriate. Also, organic peroxides such as t-butyl peroxyoctoate, di-t-butyl peroxide, and dibenzoyl oxide may also be used.

The amount of the radical polymerization initiator is preferably from 0.001 to 5 mol, more preferably from 0.01 to 2 mol, per 1 mol of the monomer mixture.

In the invention, it is preferred to produce a water-insoluble vinyl polymer having 2 or more hydroxyl groups and/or 1 or more carboxyl groups at the end of the main chain by using, upon polymerization, a chain transfer agent having 2 or more hydroxyl groups and/or 1 or more carboxyl groups.

The chain transfer agent having 2 or more hydroxyl groups includes mercapto group-containing chain transfer agents represented by the following general formulae (A7) and (A8):

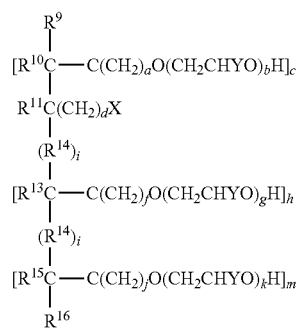

(in the general formula, $R^9$, $R^{10}$, $R^{11}$, $R^{13}$, $R^{15}$, and $R^{16}$ each independently represents a hydrogen atom, $-C_nH_{2n+1}$ (wherein n is an integer of from 1 to 18) or $-C_nH_{2n}O(CH_2CHYO)_qH$ (wherein Y represents a hydrogen atom or a methyl group, q is a number of from 0 to 20, and n is the same as described hereinbefore), $R^{12}$ and $R^{14}$ each independently represents a hetero atom, $-C_nH_{2n}-$ (wherein n is the same as described hereinbefore) or a divalent hydrocarbon group which may contain a hetero atom, X represents a mercapto group, a, d, f, and j each independently represents from 0 to 12, b, g, and k each independently represents a number of from 0 to 30, c, h, and m each independently represents an integer of from 1 to 5, and e and i each independently represents 0 or 1, provided that the total number of hydroxyl groups per molecule is 2 or more);

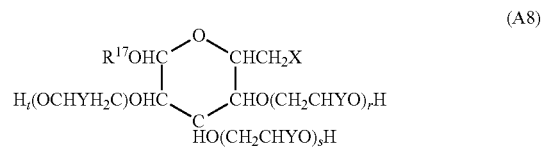

(in the general formula, $R^{17}$ represents a hydrogen atom or $-C_nH_{2n+1}$ (wherein n is the same as described hereinbefore, Y and X are the same as described hereinbefore, and r, s, and t each independently represents a number of from 0 to 30, provided that the total number of hydroxyl groups per molecule is 2 or more). These may be used alone, or as a mixture of two or more thereof.

Examples of the mercapto group-containing chain transfer agent represented by the above-described general formula (A7) include monomercapto products of glycerin, diglycerin, triglycerin, tetraglycerin, trimethylolethane, trimethylolpropane, trimethylolbutane, 1,2,6-hexanetriol, 2-ethyl-2-(hydroxymethyl)-1,3-propanediol, 2-methyll-2-(hydroxymethyl)-1,3-propanediol, pentaerythritol, erythritol, D-, L- and DL-threitol, adonitol, D- and L-arabitol, xylitol, dulcitol, L-iditol, D-mannitol, and D-sorbitol. Among these, 3-mercapto-1,2-propanediol (1-thioglycerol) which is a monomercapto-compound of glycerol (thioglycerol), 2-mercapto-1,3-propanediol (2-thioglycerol), 6-mercaptodiglycerol which is a monomercapto-compound of diglycerin, and a monomercapto-compound of pentaerythritol are preferred, with 3-mercapto-1,2-propanediol being more preferred, in view of obtaining an aqueous ink having excellent ejection properties and glossiness.

Examples of the mercapto-group containing chain transfer agent represented by the above-described formula (A8) include a monomercapto-compound of glucose, a monomercapto-compound of α-methylglucoside, and a monomercapto-compound of β-methyl-D-alloside. Among these, the monomercapto-compound of glucose is preferred and, specifically, 1-thio-β-D-glucose is more preferred, in view of obtaining an aqueous ink having excellent ejection properties and glossiness.

In view of obtaining an aqueous ink having excellent ejection properties and glossiness and in view of dispersion stability, the amount of the chain transfer agent having 2 or more hydroxyl groups is preferably from 0.001 to 10 parts by weight per 100 parts by weight of all monomers to be subjected to polymerization. Also, in view of balancing water fastness, rub-fastness, ejection stability, and blurring fastness, the amount of the chain transfer agent is preferably from 0.01 to 7 parts by weight, more preferably from 0.1 to 5 parts by weight per 100 parts by weight of all monomers to be subjected to polymerization.

On the other hand, as the chain transfer agent having 1 or more carboxyl groups, mercaptoacetic acid, mercaptopropionic acid, mercaptosuccinic acid, thiolactic acid, 4,4'-dithiobutyric acid, 3,3'-dithiopropionic acid, dithioglycolic acid, and the like are illustrated. Of these, mercaptoacetic acid, mercaptopropionic acid, and mercaptosuccinic acid are preferred.

In view of obtaining an aqueous ink having excellent ejection properties and glossiness and in view of improving dispersion stability of the water-insoluble polymer, the amount of the chain transfer agent having 1 or more carboxyl groups is preferably from 0.001 to 10 parts by weight per 100 parts by weight of all monomers to be subjected to polymerization. Also, in view of obtaining an aqueous ink excellent in water fastness, rub-fastness, ejection stability, and blurring fastness, the amount of the chain transfer agent is preferably from 0.01 to 7 parts by weight, more preferably from 0.1 to 5 parts by weight per 100 parts by weight of all monomers to be subjected to polymerization.

Also, other chain transfer agents may be used, as needed, together with the above-described chain transfer agents, for example, mercaptans such as octylmercaptan, n-dodecylmercaptan, t-dodecylmercaptan, n-tetradecylmercaptan, and mercaptoethanol; thiuram disulfides; hydrocarbons; unsaturated cyclic hydrocarbon compounds; and unsaturated heterocyclic compounds.

Polymerization conditions of the monomer mixture cannot be determined in a general manner since they differ depending upon kinds of radical polymerization initiators to be used, kinds of monomers, and kinds of solvents. Usually, however, polymerization temperature is preferably from 30 to 100° C., more preferably from 50 to 80° C., and polymerization period is preferably from 1 to 20 hours. Also, polymerization atmosphere is preferably an inert gas atmosphere such as a nitrogen gas atmosphere or an argon gas atmosphere.

After completion of the polymerization reaction, the produced water-insoluble vinyl polymer can be isolated from the reaction solution according to known methods such as re-precipitation, removal of solvent by distillation, or the like. Also, the thus-obtained water-insoluble polymer can be purified by removing unreacted monomers or the like through repeated re-precipitation, membrane separation, chromatography, extraction, or the like.

(Coloring Material)

As coloring materials, pigments and hydrophobic dyes are preferred in view of water fastness. Among them, pigments are preferably used in order to realize high weather fastness which has strongly been required in recent years.

In the case of using the pigments and the hydrophobic dyes in an aqueous ink, it is required to make them into fine particles which are stable in an ink, by using a surfactant and a water-insoluble polymer. Particularly, in view of blurring fastness and water fastness, it is preferred to incorporate the pigment and the hydrophobic dye in the water-insoluble polymer particles.

The pigments may be any of inorganic pigments and organic pigments. Also, they may be used, as needed, together with extender pigments.

Examples of the inorganic pigment include carbon black, metal oxides, metal sulfides, and metal chlorides. Of these, carbon black is preferred particularly in a black aqueous ink. The carbon black includes furnace black, thermal lamp black, acetylene black, and channel black.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, and quinophthalone pigments.

Specific examples thereof include products such as C.I. Pigment Yellow 13, 17, 74, 83, 97, 109, 110, 120, 128, 139, 151, 154, 155, 174, 180; Pigment Red 48, 57:1, 122, 146, 176, 184, 185, 188, 202; C.I. Pigment Violet 19, 23; C.I. Pigment Blue 15, 15:1, 15:2, 15:3, 15:4, 16, 60; and Pigment Green 7, 36.

Examples of the extender pigment include silica, calcium carbonate, and talc.

The hydrophobic dyes may be any ones that can be incorporated in water-insoluble polymer particles, and are not particularly limited with respect to the kinds. In view of incorporating the dye in the water-insoluble polymer with good efficiency, those dyes are preferred which dissolve in an amount of 2 g/L or more, preferably 20 to 500 g/L (25° C.), in an organic solvent used upon production of the water-insoluble polymer.

As the hydrophobic dyes, there are illustrated oil-soluble dyes and disperse dyes, with oil-soluble dyes being preferred.

Examples of the oil-soluble dyes include C.I. Solvent Black, C.I. Solvent Yellow, C.I. Solvent Red, C.I. Solvent Violet, C.I. Solvent Blue, C.I. Solvent Green, and C.I. Solvent Orange with various product numbers, which are marketed from Orient Chemical Co., Ltd., BASF AG, etc.

Examples of the disperse dyes include C.I. Disperse Yellow, C.I. Disperse Orange, C.I. Disperse red, C.I. Disperse Violet, C.I. Disperse Blue, and C.I. Disperse Green with various product numbers. Of these, C.I. Solvent Yellow 29 and 30 are preferred as yellow, C.I. Solvent Blue 70 is preferred as cyan, C.I. Solvent Red 18 and 49 are preferred as magenta, C.I. Solvent Black 3 and 7 and nigrosin series black dyes are preferred as black.

The above-described coloring materials can be used independently, or two or more of them may be mixed with any ratio to use.

In view of enhancing dispersion stability and printing density, the content of the coloring material in the aqueous dispersion and the aqueous ink of the invention is preferably from 1 to 30% by weight, more preferably from 2 to 20% by weight, particularly preferably from 2 to 10% by weight.

Regarding weight ratio of the water-insoluble vinyl polymer and the coloring material to be used in the invention, 20 to 1,000 parts by weight of the coloring material is preferred per 100 parts by weight of the solid component of the water-insoluble vinyl polymer in view of enhancing printing density. Particularly, 50 to 900 parts by weight of the coloring material is more preferred, with 100 to 800 parts by weight being still more preferred.

(Process for Producing the Aqueous Dispersion and the Aqueous Ink)

The aqueous dispersion of the invention is preferably obtained by the following steps (1) and (2).

Step (1): a step of dispersing a mixture containing the water-insoluble vinyl polymer, an organic solvent, a neutralizing agent, a coloring material, and water.

Step (2): a step of removing the organic solvent.

In the step (1), first, the water-insoluble vinyl polymer is dissolved in the organic solvent, and then the coloring material, neutralizing agent, water and, as needed, a surfactant, etc. are added to the organic solvent, followed by mixing to obtain an oil-in-water dispersion. In the mixture, the content of the coloring material is preferably from 5 to 50% by weight, the content of the organic solvent is preferably from 10 to 70% by weight, the content of the water-insoluble polymer is preferably from 2 to 40% by weight, and the content of water is preferably from 10 to 70% by weight. The neutralization degree is not particularly limited. It is usually preferred that the finally obtained aqueous dispersion is neutral and has a pH of, for example, from 4.5 to 10. It is also possible to determine pH through desired neutralization degree of the water-insoluble vinyl polymer.

Preferred examples of the organic solvent include alcohol series solvents, ketone series solvents, and ether series solvents, and those solvents are preferred which have a solubility in water of from 10% by weight to 50% by weight at 20° C.

Examples of the alcohol series solvent include ethanol, isopropanol, n-butanol, tertiary butanol, isobutanol, and diacetone alcohol. Examples of the ketone series solvent include acetone, methyl ethyl ketone, diethyl ketone, and methyl isobutyl ketone. Examples of the ether series solvent include dibutyl ether, tetrahydrofuran, and dioxane. Of these solvents, isopropanol, acetone, and methyl ethyl ketone are preferred, with methyl ethyl ketone being particularly preferred. These solvents may be used alone or as a mixture of 2 or more thereof.

As the neutralizing agent, an acid or a base can be used depending upon kind of the salt-forming group in the water-insoluble polymer.

The neutralizing agent includes acids such as hydrochloric acid, acetic acid, propionic acid, phosphoric acid, sulfuric acid, lactic acid, succinic acid, glycolic acid, gluconic acid, and glyceric acid, and bases such as lithium hydroxide, sodium hydroxide, potassium hydroxide, ammonia, methylamine, dimethylamine, trimethylamine, ethylamine, diethylamine, triethylamine, and triethanolamine.

The method for dispersing the mixture in the step (1) is not particularly limited. The water-insoluble polymer particles may be finely divided into fine particles having a desired average particle size only by a substantial dispersion procedure. Preferably, the mixture is first subjected to a preliminary dispersion procedure, and then to the substantial dispersion procedure by applying a shear stress thereto so as to control the average particle size of the obtained polymer particles to a desired particle size.

Upon subjecting the mixture to the preliminary dispersion procedure, there may be used ordinary mixing or stirring devices such as anchor blades. Examples of the preferred mixing or stirring devices include high-speed mixers or stirrers such as Ultra Disper (trade name; Asada Tekko Co., Ltd.), Ebara Milder (trade name; EBARA Corp.), TK Homomixer, TK Pipeline Mixer, TK Homo Jetter, TK Homomic Line Flow, and Filmix (trade names; all available from Tokushu Kika Kogyo Co., Ltd.), Clearmix (trade name: M-Technic Co., Ltd.), and K.D. Mill (trade name; Kinetics Dispersion Inc.).

To apply the shear stress to the mixture in the substantial dispersion procedure, there may be used, for example, kneading machines such as roll mills, beads mills, kneaders, and extruders, homo-valve-type high-pressure homogenizers such as typically High-Pressure Homogenizer (trade name; Izumi Food Machinery Co., Ltd.), and Mini-Labo 8.3H Model (trade name; Rannie Corp.), and chamber-type high-pressure homogenizers such as Micro Fluidizer (trade name; Microfluidics Inc.), Nanomizer (trade name; Nanomizer Co., Ltd.), Altimizer (trade name; Sugino Machine Co., Ltd.), Genus PY (trade name; Hakusui Kagaku Co., Ltd.), and DeBEE 2000 (trade name; Nippon BEE Co., Ltd.).

In the step (2), the organic solvent is distilled off from the dispersion obtained in the foregoing step (1) to render the dispersion aqueous, thereby obtaining an aqueous dispersion of the coloring material-containing water-insoluble polymer particles. Removal of the organic solvent contained in the aqueous dispersion can be conducted by ordinary methods such as distillation under reduced pressure. The organic solvent in the thus-obtained aqueous dispersion containing the water-insoluble polymer particles is substantially removed. The content of the residual organic solvent is usually 0.1% by weight or less, preferably 0.01% by weight or less.

The aqueous dispersion of the coloring material-containing water-insoluble polymer particles is a dispersion wherein a solid component of the coloring material-containing water-insoluble polymer is dispersed in a medium mainly composed of water. Here, the form of the coloring material-containing water-insoluble polymer particles is not particularly limited, and it suffices that the particles are formed by at least the coloring material and the water-insoluble polymer. For example, there are included a particle form wherein the coloring material is contained in the water-insoluble polymer, a particle form wherein the coloring material is uniformly dispersed in the water-insoluble polymer, and a particle form wherein the coloring material is laid bare on the surface of the water-insoluble polymer particle.

the aqueous dispersion of the water-insoluble vinyl polymer particles may be used by itself as an aqueous ink (aqueous ink for inkjet recording), or a wetting agent, a penetrant, a dispersing agent, a viscosity-adjusting agent, a defoaming agent, an antifungal agent, an anti-rust agent, etc. commonly used for aqueous inks for inkjet recording may be added.

The average particle size of the coloring material-containing particles in the thus-obtained aqueous dispersion and in the aqueous ink is preferably from 0.01 to 0.5 µm, more preferably from 0.03 to 0.3 µm, particularly preferably from 0.05 to 0.2 µm in view of preventing clogging of nozzles of a printer and enhancing the dispersion stability. Additionally, the average particle size may be measured by using a laser particle analyzing system ELS-8000 (cumulant analysis) available from Otsuka Denshi Co., Ltd. Measurement is conducted under the conditions of 25° C. in temperature, 90° in angle between incident light and detector, 100 times in cumulative frequency, and a refractive index of water (1.333) is inputted to the analyzing system as a refractive index of the dispersing solvent.

Also, in the aqueous dispersion and in the aqueous ink, the content (solid component) of the coloring material-containing water-insoluble vinyl polymer particles is adjusted to be preferably from 0.5 to 30% by weight, more preferably from 1 to 15% by weight, in view of printing density and ejection stability.

The content of water in the aqueous dispersion and the aqueous ink of the invention is preferably from 30 to 90% by weight, more preferably from 40 to 80% by weight.

Regarding surface tension (20° C.) of the aqueous dispersion and the aqueous ink of the invention, the aqueous dispersion has the surface tension of preferably from 30 to 65 mN/m, more preferably from 35 to 60 mN/m, and the aqueous ink has the surface tension of preferably from 25 to 50 mN/m, more preferably from 27 to 45 mN/m.

The viscosity (20° C.) of the aqueous dispersion of the invention in 10% by weight concentration is preferably from 2 to 6 mPa·s, still more preferably from 2 to 5 mPa·s for the purpose of obtaining a preferred viscosity when formed into an aqueous ink. Also, the viscosity (20° C.) of the aqueous ink of the invention is preferably from 2 to 12 mPa·s, still more preferably from 2.5 to 10 mPa·s for the purpose of maintaining good ejection properties.

EXAMPLES

The present invention will be described in detail based on Examples, but the invention is not limited at all by these Examples. Additionally, in Examples, "parts" means by weight.

The azo pigment of the invention can be synthesized according to the synthesis process to be described in the following Synthesis Example 1 illustrated below.

Measurement of the X-ray diffraction of the pigment composition of the invention is conducted according to Japanese Industrial Standards JISK0131 (General Rule of X-ray diffractiometry) under the following conditions using a powder X-ray diffractometer, RINT 2500 (manufactured by Rigaku Industrial Corp.) and Cu Kα line.

Measuring apparatus used: automatic X-ray diffractometer, RENT 2500 (manufactured by Rigaku Industrial Corp.)
X-ray tube: Cu
Tube voltage: 55 KV
Tube current: 280 mA
Scanning method: 2θ/θ scan
Scanning speed: 6 deg./min
Sampling interval: 0.100 deg.
Starting angle (2θ): 5 deg.
Stopping angle (2θ): 55 deg.
Divergence slit: 2 deg.
Scattering slit: 2 deg.
Receiving slit: 0.6 mm
An upright goniometer is used.

Synthesis Example 1

Synthesis of an Azo Pigment Composition (1a)

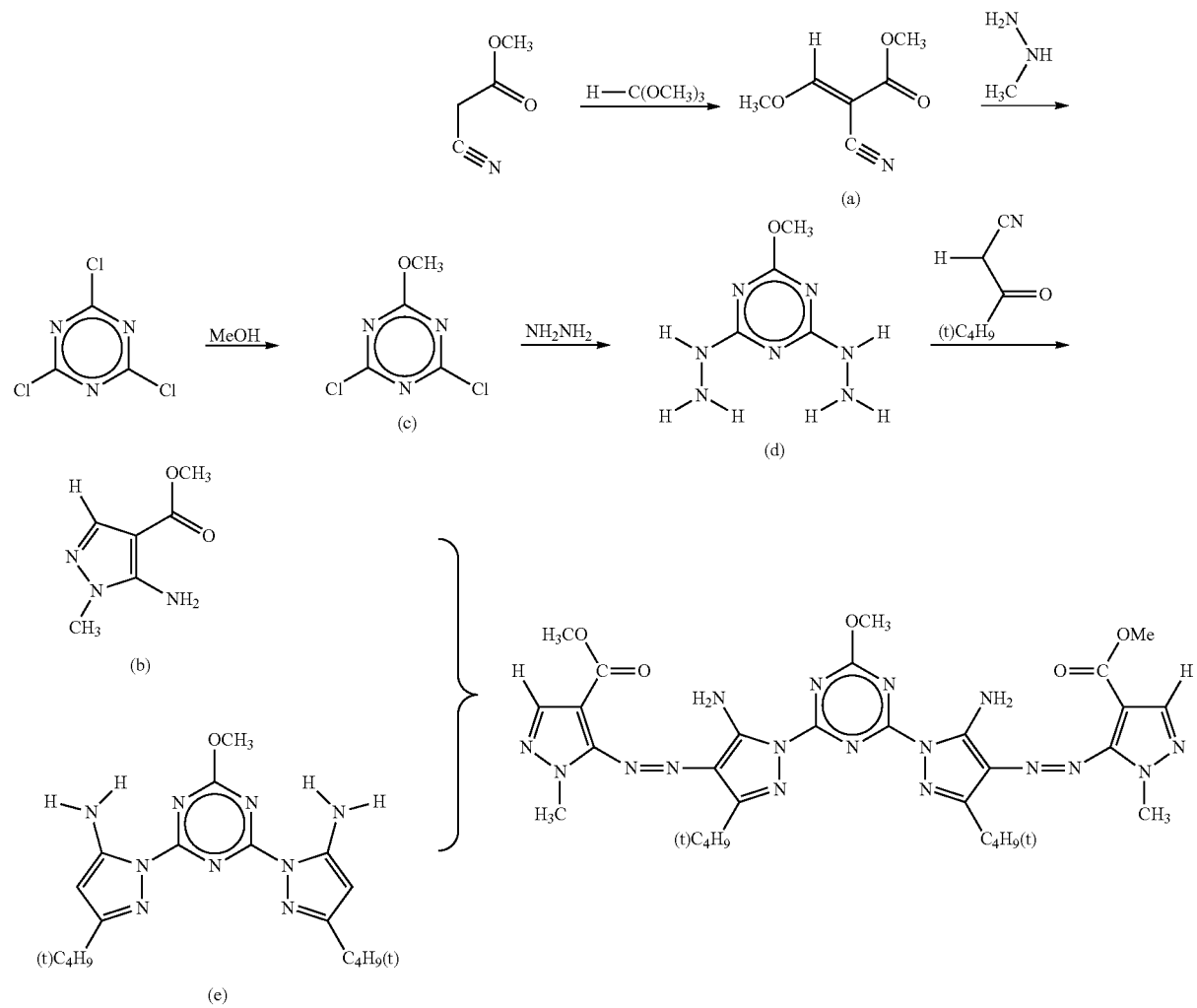

(1) Synthesis of Intermediate (a)

42.4 g (0.4 mol) of trimethyl orthoformate, 20.4 g (0.2 mol) of glacial acetic acid, and 0.5 g of p-toluenesulfonic acid are added to 29.7 g (0.3 mol) of methyl cyanoacetate, and the resulting mixture is heated to 110° C. (external temperature), followed by stirring for 20 hours with distilling off low-boiling components produced from the reaction system. The resulting reaction solution is concentrated under reduced pressure, and is subjected to purification by silica gel column to obtain 14.1 g (yellow powder; yield: 30%) of the intermediate (a). Results of NMR measurement of the thus-obtained intermediate (a) are as follows. $^1$H-NMR (300 MHz, CDCl$_3$): 7.96 (s, 1H), 4.15 (s, 3H), 3.81 (s, 3H)

(2) Synthesis of Intermediate (b)

150 mL of isopropanol is added to 7.4 mL (141 mmol) of methylhydrazine, followed by cooling to 15° C. (internal temperature). After gradually adding 7.0 g (49.6 mmol) of the intermediate (a) to this mixed solution, the resulting mixture is heated to 50° C. and stirred for 1 hour and 40 minutes. This reaction solution is concentrated under reduced pressure, and is then subjected to purification by silica gel column to obtain 10.5 g (white powder; yield: 50%) of the intermediate (b). Results of NMR measurement of the thus-obtained intermediate (b) are as follows. $^1$H-NMR (300 MHz, CDCl$_3$): 7.60 (s, 1H), 4.95 (brs, 2H), 3.80 (s, 3H), 3.60 (s, 3H)

(3) Synthesis of Intermediate (c)

136 mL of water is added to 1.1 L of methanol, and 182 g (2.17 mol) of sodium hydrogencarbonate is added thereto, followed by stirring at room temperature. To the resulting mixture is added 200 g (1.08 mol) of cyanuric chloride by portions at the same temperature. After completion of the addition, the internal temperature is increased to 30° C. After stirring for 30 minutes at the same temperature, 500 mL of water is added thereto, and a precipitated solid product is collected by filtration, spray washed with 500 mL of water and 300 mL of methanol, and dried to obtain 168 g (white powder; yield: 86.2%) of the intermediate (c). Results of NMR measurement of the thus-obtained intermediate (c) are as follows. $^1$H-NMR (300 MHz, CDCl$_3$): 4.14 (s, 3H)

(4) Synthesis of Intermediate (d)

673 mL of water is added to 363 mL (7.46 mol) of hydrazine monohydrate, and the resulting mixture is cooled to 10° C. (internal temperature) and, after gradually adding to this mixed solution 168 g (934 mmol) of the intermediate (c) (at an internal temperature of 20° C. or lower), the ice bath is removed, and the temperature of the reaction solution is allowed to increase to room temperature, followed by stirring for 30 minutes at the same temperature. Crystals precipitated from the reaction solution are collected by filtration, spray washed with 700 mL of water and 1 L of acetonitrile, and dried to obtain a crudely purified product of the intermediate (d) (white powder).

(5) Synthesis of Intermediate (e)

480 mL of ethylene glycol is added to a crudely purified product of the intermediate (d), and the mixture is stirred at room temperature. To this suspension is added 257 g (2.06 mol) of pivaloylacetonitrile, and the resulting mixture is heated till the internal temperature reaches 80° C. A 12M hydrochloric acid aqueous solution is added thereto to adjust the pH to 3, and the resulting mixture is heated till the internal temperature reaches 80° C., followed by stirring for 3 hours. After completion of the reaction, the reaction solution is cooled with ice to an internal temperature of 8° C., and the precipitated crystals are collected by filtration, spray washed with water, and subjected to purification by silica gel column to obtain 105 g (white powder; yield: 29.2% through two steps). Results of NMR measurement of the thus-obtained intermediate (e) are as follows. $^1$H-NMR (300 MHz, d-DMSO): 7.00 (s, 4H), 5.35 (s, 2H), 4.05 (s, 3H), 5.35 (s, 2H), 1.22 (s, 18H)

(6) Synthesis of Azo Pigment (1a)

A mixed solution of 125 mL of acetic acid and 24 mL of sulfuric acid is cooled with ice to an internal temperature of 3° C. 26.4 g of nitrosylsulfuric acid is added thereto at the same temperature and, subsequently, 11.6 g of the intermediate (b) is added thereto by portions at the same temperature to dissolve. After stirring for 1 hour at the same temperature, 1.2 g of urea is added thereto by portions at the same temperature, followed by stirring for 15 minutes at the same temperature to obtain a diazonium salt solution. Separately, 11.6 g of the intermediate (e) is completely dissolved in 405 mL of methanol, and cooled with ice to an internal temperature of −3° C. The above-described diazonium salt solution is added thereto by portions so that the internal temperature becomes 3° C. or lower and, after completion of the addition, the reaction solution is stirred for 2 hours. The ice bath is removed, and the reaction solution is stirred at room temperature for 10 minutes. Precipitated crystals are collected by filtration, spray washed with 150 mL of methanol, then further spray washed with 100 mL of water. Crystals thus-obtained are suspended in 750 mL of water without drying, and a 8N potassium hydroxide aqueous solution is added thereto to adjust the pH to 5.7. After stirring at room temperature for 20 minutes, resulting crystals are collected by filtration, sufficiently spray washed with water, and then spray washed with 80 mL of methanol. The thus-obtained crystals are dried at room temperature for 12 hours.

The thus-obtained crystals are suspended in a mixed solution of 180 mL of dimethylacetamide and 180 mL of water, and then the internal temperature is raised to an internal temperature of 85° C., followed by stirring at the same temperature for 2 hours. Thereafter, the resulting crystals are collected by hot filtration and suspended in 300 mL of methanol, and the suspension is stirred at room temperature for 30 minutes. The resulting crystals are collected by filtration, and dried at room temperature for 5 hours to obtain 19.5 g of the azo pigment (1a). Yield: 90.3%.

Visual observation of the thus-obtained azo pigment (1a) under a transmission microscope (manufactured by JEOL Ltd.; JEM-10 electron microscope) reveals that the length of the long axis of primary particles is about 150 nm.

When X-ray diffraction of the azo pigment (1a) is measured under the aforesaid conditions, characteristic X-ray peaks are shown at Bragg angles (2θ±0.2°) of 7.2° and 25.9.

Figure 2:
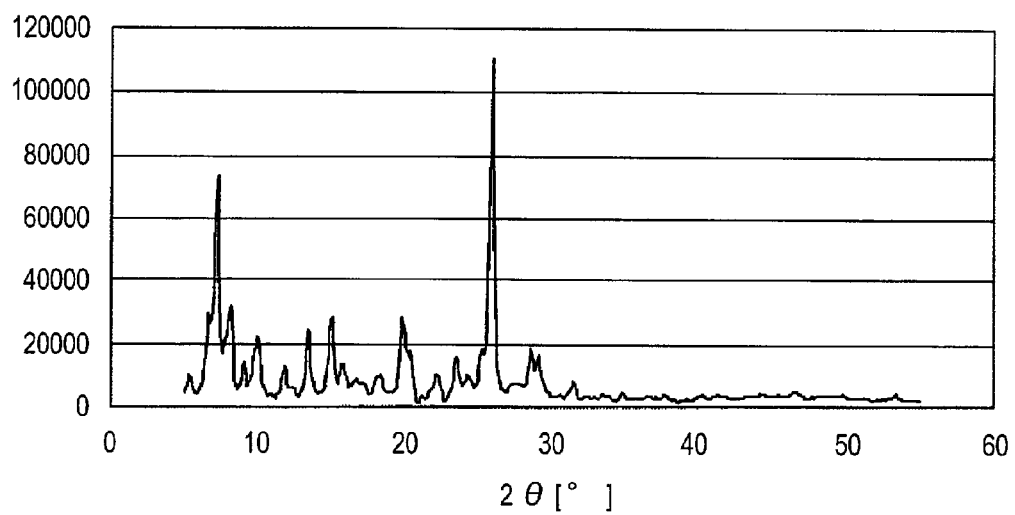
FIG. 2 is a Cu Kα X-ray diffraction pattern of an azo pigment obtained in Synthesis Example 2.

The X-ray diffraction pattern with characteristic Cu Kα line is shown in FIG. 2.

Synthesis Example 2

Synthesis of an Azo Pigment Composition (2a)

Synthesis scheme of azo pigment (2a) is shown below.

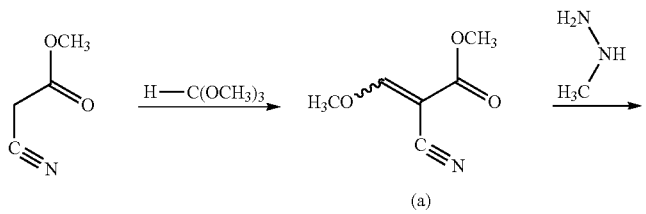

(a)

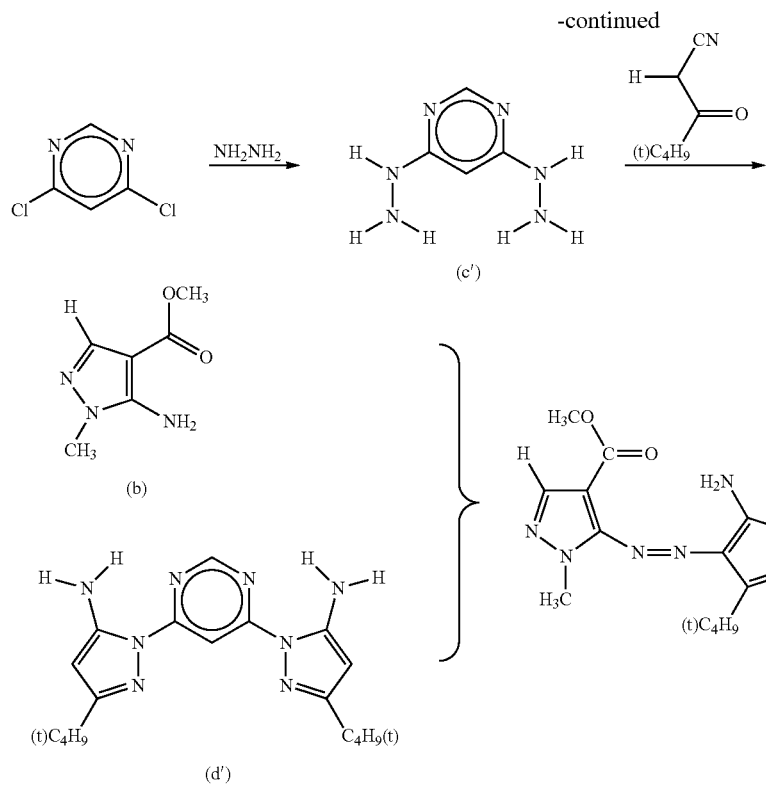
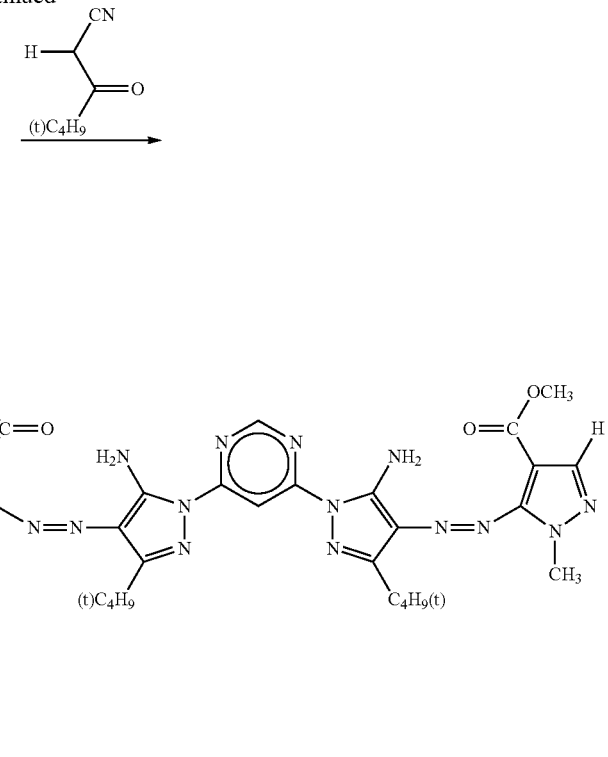

(7) Synthesis of Intermediate (a)

42.4 g (0.4 mol) of trimethyl orthoformate, 20.4 g (0.2 mol) of glacial acetic acid, and 0.5 g of p-toluenesulfonic acid are added to 29.7 g (0.3 mol) of methyl cyanoacetate, and the resulting mixture is heated to 110° C. (external temperature), followed by stirring for 20 hours with distilling off low-boiling components produced from the reaction system. The resulting reaction solution is concentrated under reduced pressure, and is subjected to purification by silica gel column to obtain 14.1 g (yellow powder; yield: 30%) of the intermediate (a). Results of NMR measurement of the thus-obtained intermediate (a) are as follows. $^1$H-NMR (300 MHz, CDCl$_3$): 7.96 (s, 1H), 4.15 (s, 3H), 3.81 (s, 3H)

(8) Synthesis of Intermediate (b)

150 ml of isopropanol is added to 7.4 ml (141 mmol) of methylhydrazine, followed by cooling to 15° C. (internal temperature). After gradually adding 7.0 g (49.6 mmol) of the intermediate (a) to this solution, the resulting mixture is heated to 50° C. and stirred for 1 hour and 40 minutes. This reaction solution is concentrated under reduced pressure, and is then subjected to purification by silica gel column to obtain 10.5 g (white powder; yield: 50%) of the intermediate (b). Results of NMR measurement of the thus-obtained intermediate (b) are as follows. $^1$H-NMR (300 MHz, CDCl$_3$): 7.60 (s, 1H), 4.95 (brs, 2H), 3.80 (s, 3H), 3.60 (s, 3H)

(9) Synthesis of Intermediate (c')

298 mL of methanol is added to 387 mL (7.98 mol) of hydrazine monohydrate, followed by cooling to 10° C. (internal temperature). To the resulting mixture is gradually added 149 g (1.00 mol) of 4,6-dichloropyrimidine (at an internal temperature of 20° C. or lower), and then the ice bath is removed to allow the internal temperature to increase to room temperature, followed by stirring the mixture for 30 minutes at the same temperature. Thereafter, the mixture is further heated to an internal temperature of 60° C., and stirred for 5 hours at the same temperature. After completion of the reaction, 750 mL of water is added thereto, and the reaction solution is cooled with ice to an internal temperature of 8° C. Crystals precipitated are collected by filtration, spray washed with water and with isopropanol, and dried for 36 hours at room temperature to obtain 119 g (white powder; yield: 84.5%) of the intermediate (c'). Results of NMR measurement of the thus-obtained intermediate (c') are as follows. $^1$H-NMR (300 MHz, d-DMSO): 7.80 (s, 1H), 7.52 (s, 2H), 5.98 (s, 1H), 4.13 (s, 4H)

(10) Synthesis of Intermediate (d')

128 mL of water is added to 50 g (357 mmol) of the intermediate (c'), and the mixture is stirred at room temperature. To this suspension is added 98.2 g (785 mmol) of pivaloylacetonitrile and, after dropwise adding thereto a 12M hydrochloric acid aqueous solution to adjust the pH to 3 at the same temperature, the mixture is heated to an internal temperature of 50° C., followed by stirring the mixture for 6 hours at the same temperature. After completion of the reaction, a 8N potassium hydroxide aqueous solution is added thereto to neutralize to a pH of 6.4. The mixture is cooled with ice to an internal temperature of 10° C., and crystals precipitated are collected by filtration, spray washed with water. The thus-obtained crystals are dried at 60° C. under reduced pressure, and 30 mL of toluene is added to the obtained crudely purified product, followed by heating to 60° C. to dissolve. The thus-obtained solution is allowed to stand for 12 hours at room temperature, and crystals precipitated are collected by filtration, spray washed with cooled toluene, and dried at 60° C. under reduced pressure to obtain 87.7 g (white powder; yield: 69.3%) of the intermediate (d'). Results of NMR measurement of the thus-obtained intermediate (d') are as follows. $^1$H-NMR (300 MHz, d-DMSO): 8.74 (s, 1H), 7.99 (s, 1H), 6.87 (s, 4H), 5.35 (s, 2H), 1.24 (s, 18H)

(11) Synthesis of Azo Pigment (2a)

9.2 g of the intermediate (b) is dissolved in a mixed solution of 55 mL of acetic acid and 37 mL of propionic acid at room temperature. The mixture is cooled with ice to an internal temperature of −3° C., and a 40% by weight solution of nitrosylsulfuric acid in sulfuric acid is dropwise added thereto at an internal temperature of from −3° C. to 4° C. in 10 minutes. After stirring for 1 hour at an internal temperature of 4° C., 0.2 g of urea is added thereto, followed by cooling to an internal temperature of −3° C. and further stirring for 10 minutes to obtain a diazonium salt solution. Separately, 10 g of the intermediate (d') is completely dissolved in 150 mL of acetone, and cooled to an internal temperature of 17° C., and then added to the above-described diazonium salt solution in 25 minutes at an internal temperature in the range of from −3° C. to 3° C. After completion of the addition, the reaction solution is stirred for 30 minutes at 3° C., and the ice bath is removed to allow the internal temperature to rise to room temperature. After stirring the reaction solution at room temperature for 30 minutes, precipitated crystals are collected by filtration, spray washed with 150 mL of acetone, then further spray washed with 100 mL of water. Crystals thus-obtained are suspended in 400 mL of water without drying, and an 8N potassium hydroxide aqueous solution is added thereto to adjust the pH to 5.7. After stirring at room temperature for 20 minutes, resulting crystals are collected by filtration, sufficiently spray washed with water, and then spray washed with 80 mL of acetone. The thus-obtained are dried at room temperature for 12 hours.

The thus-obtained crystals are suspended in 580 mL of acetone, and then the mixture is stirred for 30 minutes under reflux. Thereafter, the mixture is cooled to room temperature in 10 minutes, and formed crystals are collected by filtration, and dried at room temperature for 5 hours to obtain 17.1 g of the azo pigment (2a). Yield: 88.5%.

Visual observation of the thus-obtained azo pigment (2a) under a transmission microscope (manufactured by JEOL Ltd.; JEM-1010 electron microscope) reveals that the length of the long axis of primary particles is about 15 μm.

When X-ray diffraction of the azo pigment (2a) is measured under the aforesaid conditions, characteristic X-ray peaks are shown at Bragg angles (2θ±0.2°) of 7.6° and 25.6. The X-ray diffraction pattern with characteristic Cu Kα line is shown in FIG. 1.

Synthesis Examples 3 to 19

Azo pigments of the invention shown in the following Table 1 are synthesized according to the above-described synthesis process of the above-illustrative compounds (Pig.-1) and (Pig.-18) shown in the above-described Synthesis Examples 1 and 2 or by combining the production process of the azo pigments of the present invention.

The X-ray diffraction patterns with characteristic Cu Kα line of the thus-obtained azo pigments are shown in FIGS. 3 to 19.

TABLE 1

Figure 3:
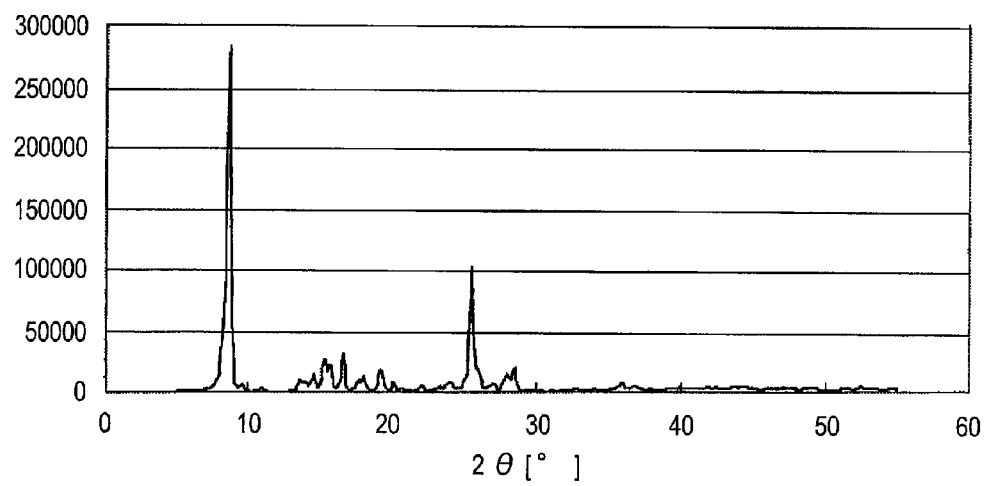
FIG. 3 is a Cu Kα X-ray diffraction pattern of an azo pigment obtained in Synthesis Example 3.
Figure 4:
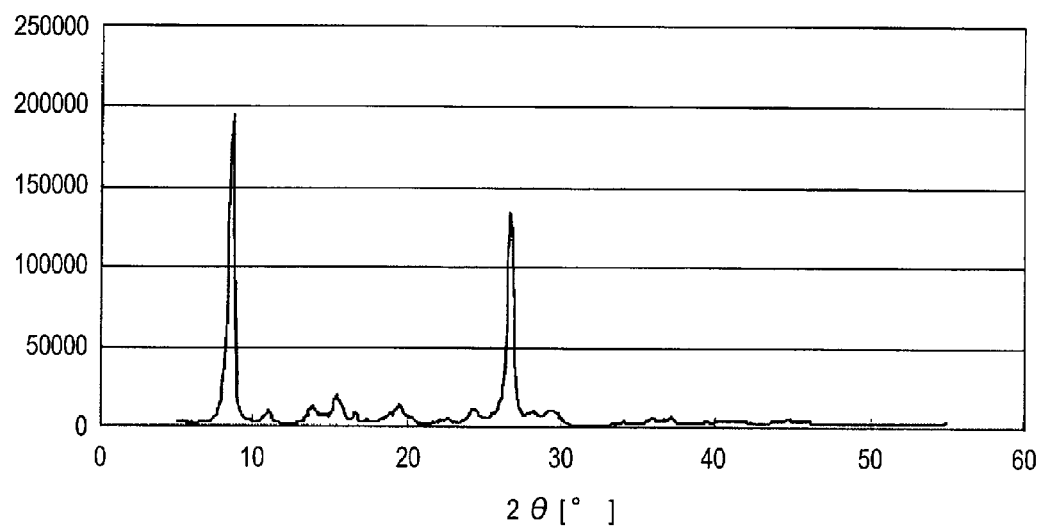
FIG. 4 is a Cu Kα X-ray diffraction pattern of an azo pigment obtained in Synthesis Example 4.
Figure 5:
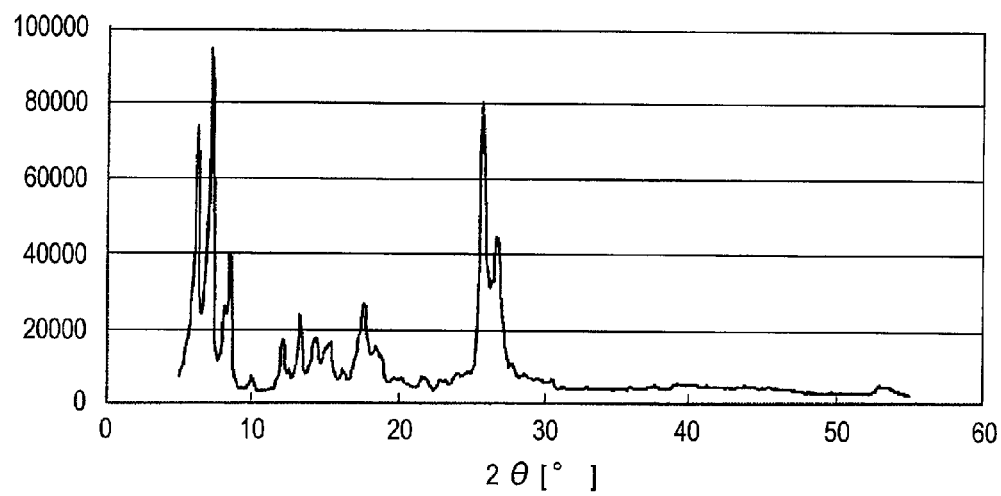
FIG. 5 is a Cu Kα X-ray diffraction pattern of an azo pigment obtained in Synthesis Example 5.
Figure 6:
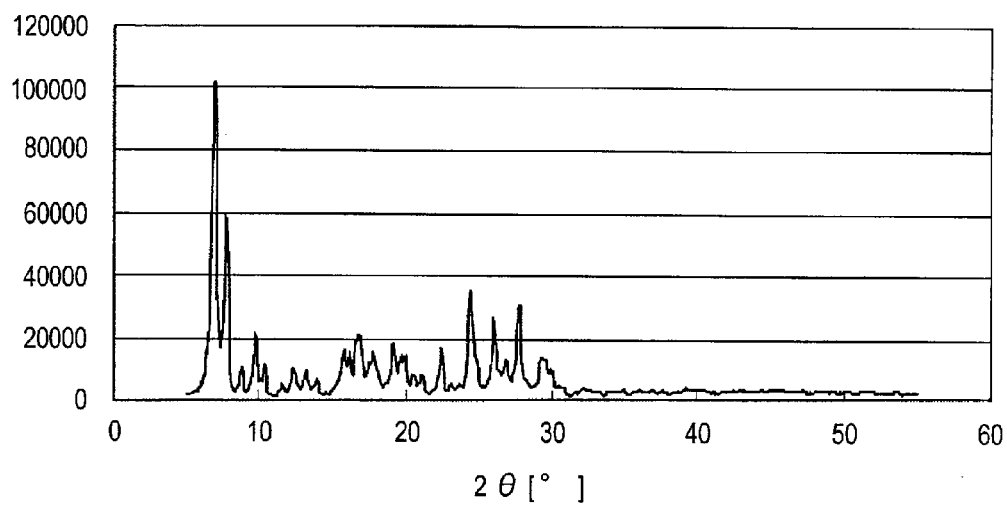
FIG. 6 is a Cu Kα X-ray diffraction pattern of an azo pigment obtained in Synthesis Example 6.

| Azo Pigment of Invention | X-ray Diffraction Pattern with characteristic Cu Kα line |
| --- | --- |
| Pig.-1 | FIG. 1 |
| Pig.-18 | FIG. 2 |
| Pig.-2 | FIG. 3 |
| Pig.-3 | FIG. 4 |
| Pig.-6 | FIG. 5 |
| Pig.-10 | FIG. 6 |

TABLE 1-continued

Figure 7:
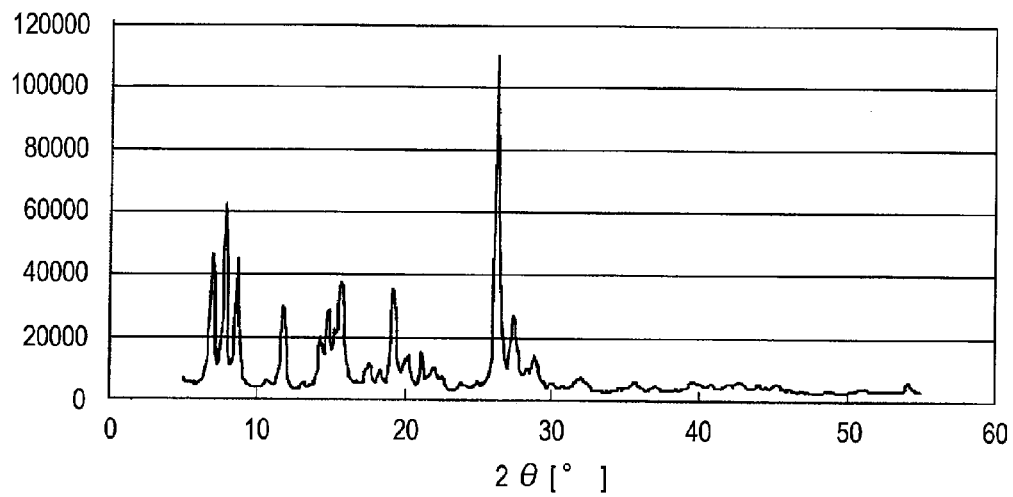
FIG. 7 is a Cu Kα X-ray diffraction pattern of an azo pigment obtained in Synthesis Example 7.
Figure 8:
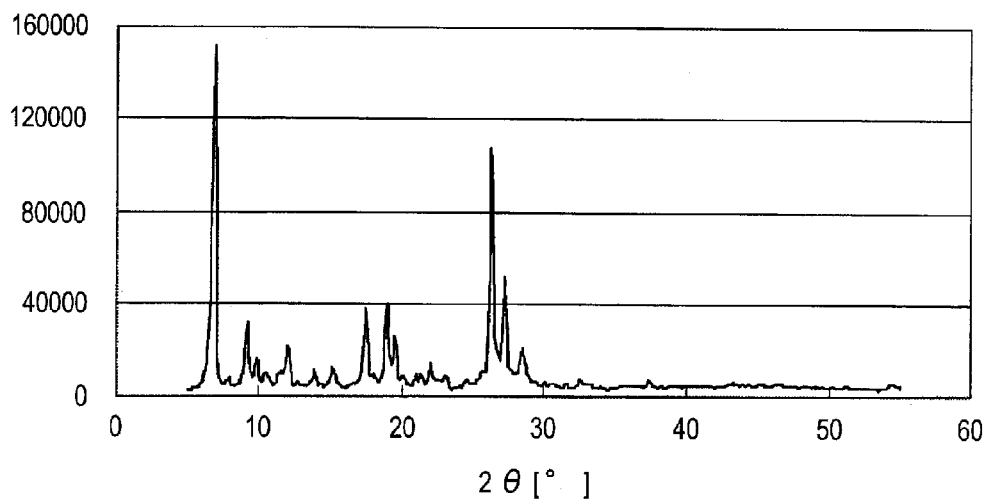
FIG. 8 is a Cu Kα X-ray diffraction pattern of an azo pigment obtained in Synthesis Example 8.
Figure 9:
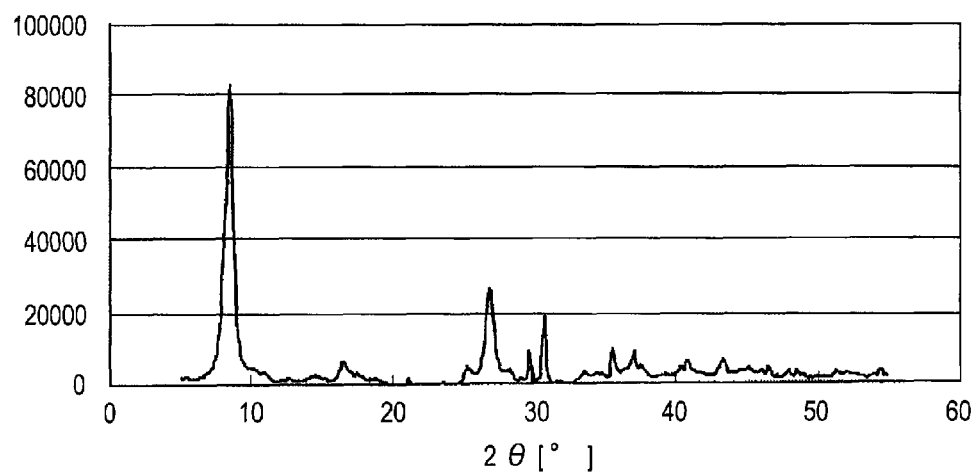
FIG. 9 is a Cu Kα X-ray diffraction pattern of an azo pigment obtained in Synthesis Example 9.
Figure 10:
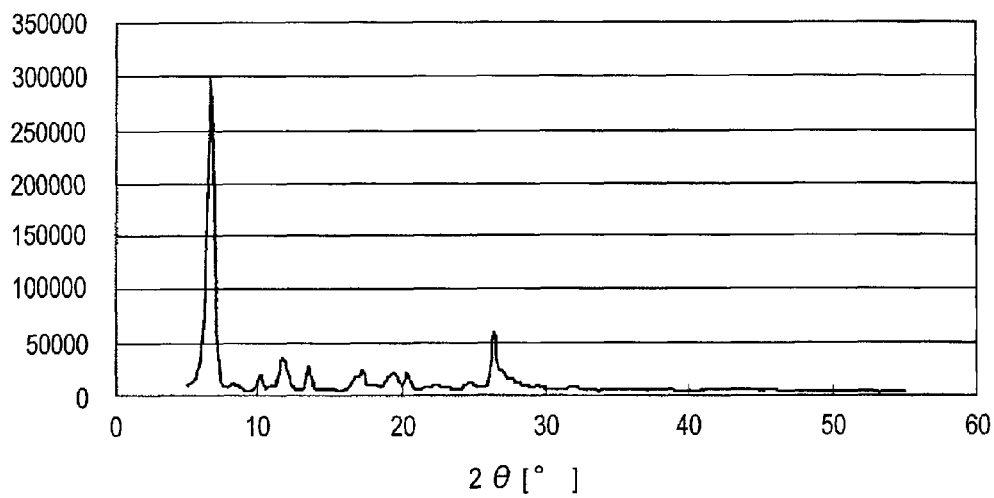
FIG. 10 is a Cu Kα X-ray diffraction pattern of an azo pigment obtained in Synthesis Example 10.
Figure 11:
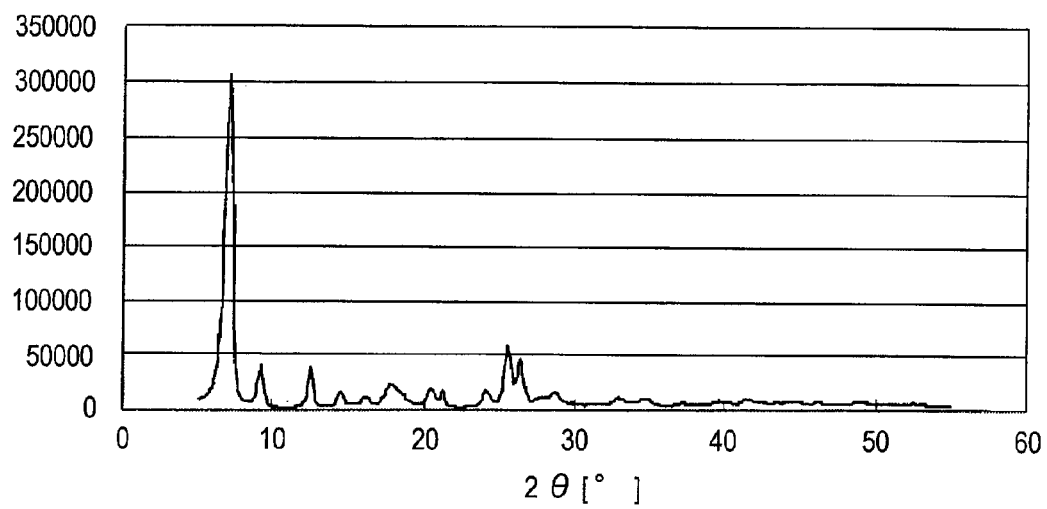
FIG. 11 is a Cu Kα X-ray diffraction pattern of an azo pigment obtained in Synthesis Example 11.
Figure 12:
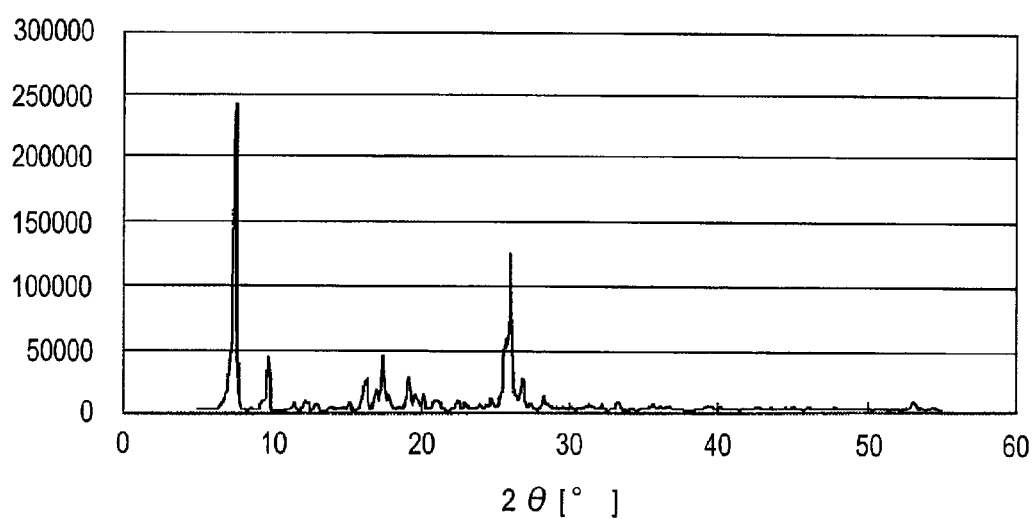
FIG. 12 is a Cu Kα X-ray diffraction pattern of an azo pigment obtained in Synthesis Example 12.
Figure 13:
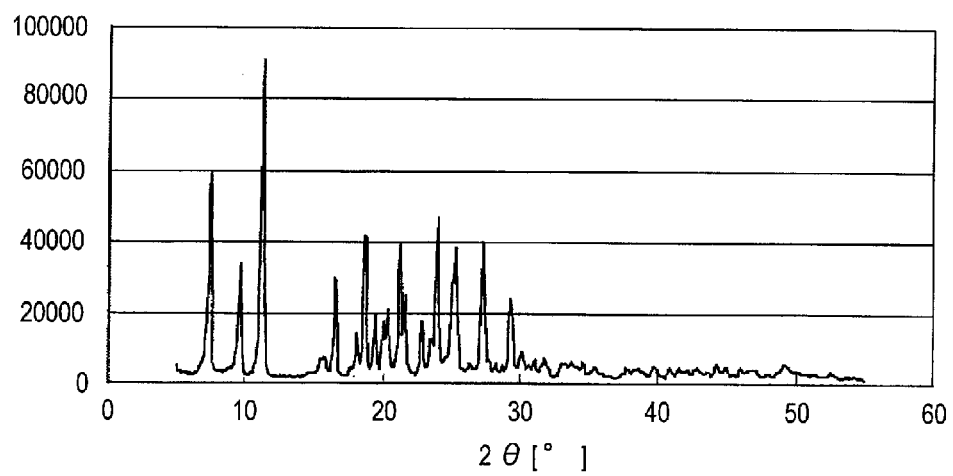
FIG. 13 is a Cu Kα X-ray diffraction pattern of an azo pigment obtained in Synthesis Example 13.
Figure 14:
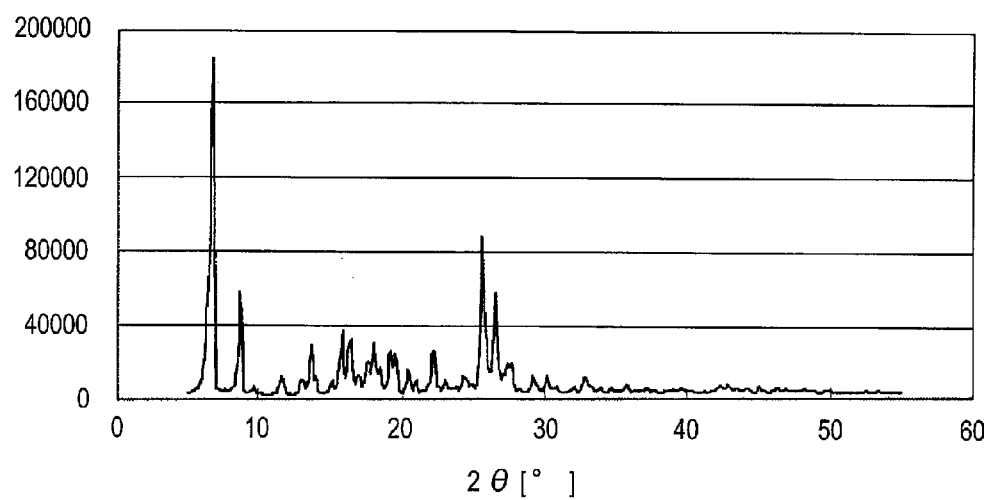
FIG. 14 is a Cu Kα X-ray diffraction pattern of an azo pigment obtained in Synthesis Example 14.
Figure 15:
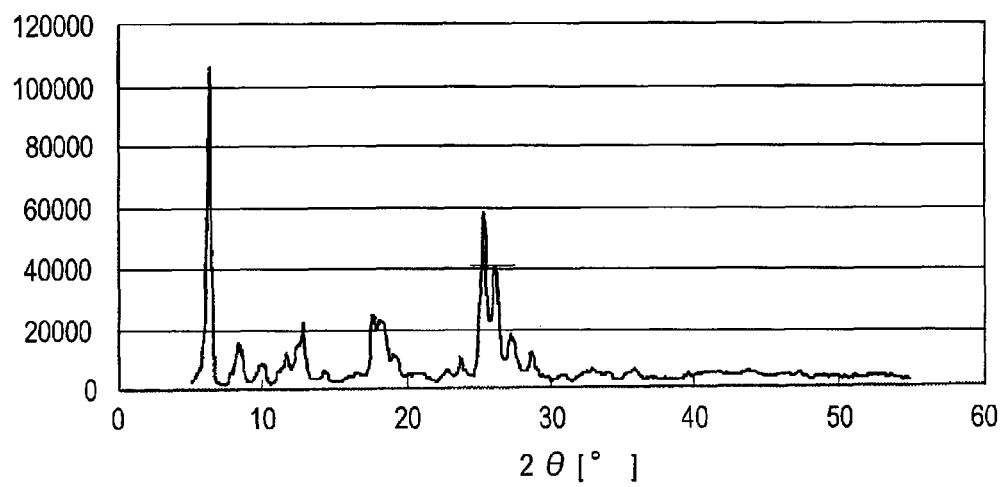
FIG. 15 is a Cu Kα X-ray diffraction pattern of an azo pigment obtained in Synthesis Example 15.
Figure 16:
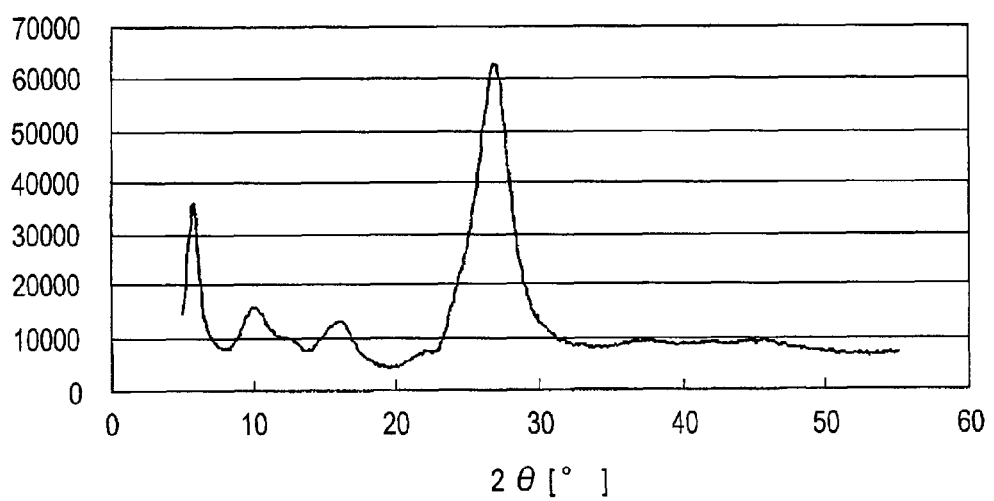
FIG. 16 is a Cu Kα X-ray diffraction pattern of an azo pigment obtained in Synthesis Example 16.
Figure 17:
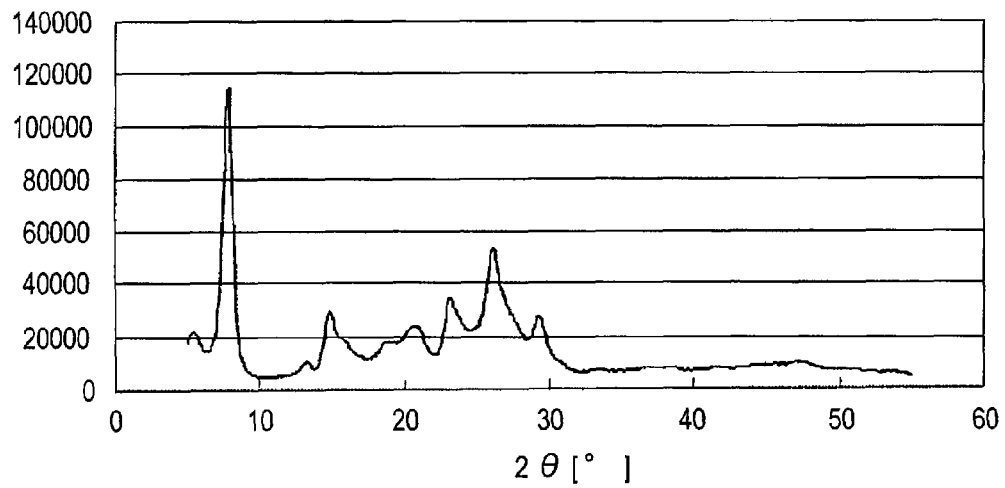
FIG. 17 is a Cu Kα X-ray diffraction pattern of an azo pigment obtained in Synthesis Example 17.
Figure 18:
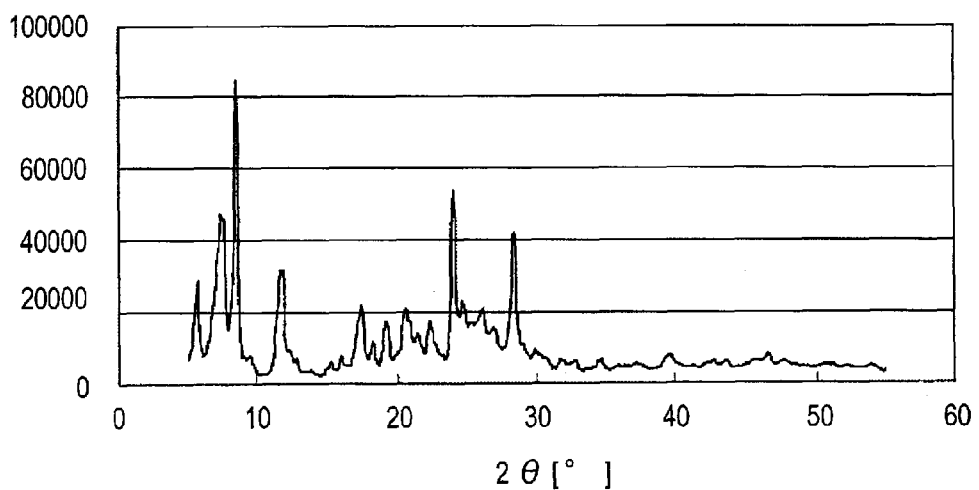
FIG. 18 is a Cu Kα X-ray diffraction pattern of an azo pigment obtained in Synthesis Example 18.
Figure 19:
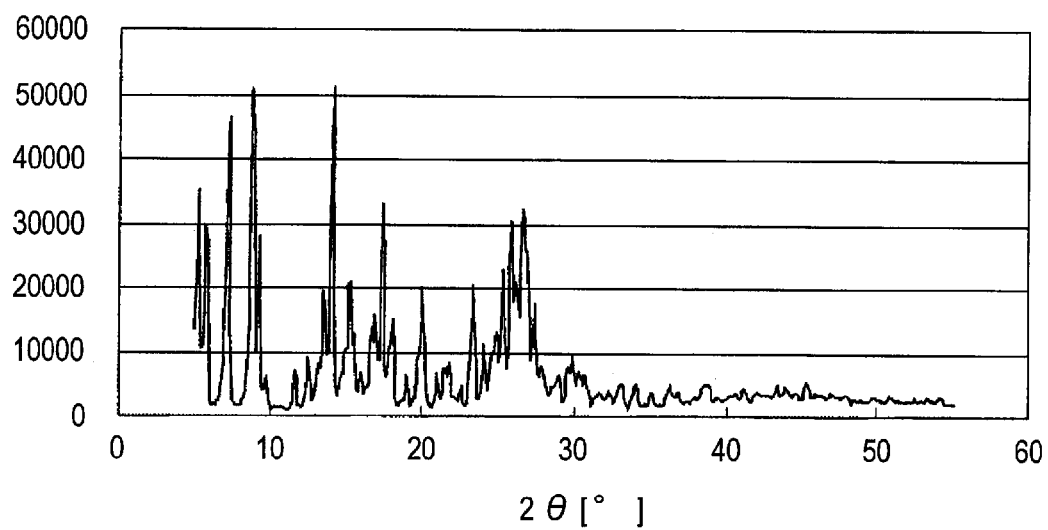
FIG. 19 is a Cu Kα X-ray diffraction pattern of an azo pigment obtained in Synthesis Example 19.
Figure 4:
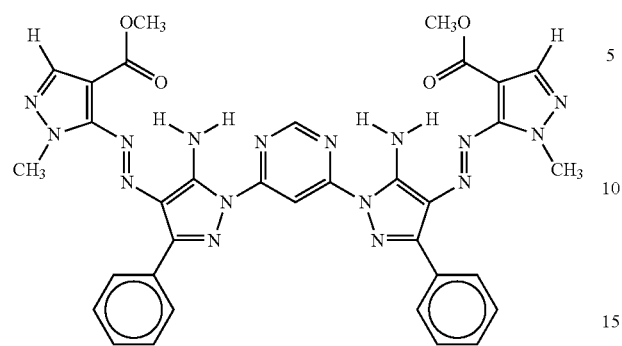
Figure 8:
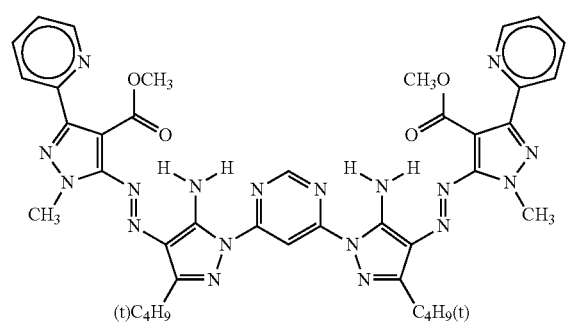
Figure 5:
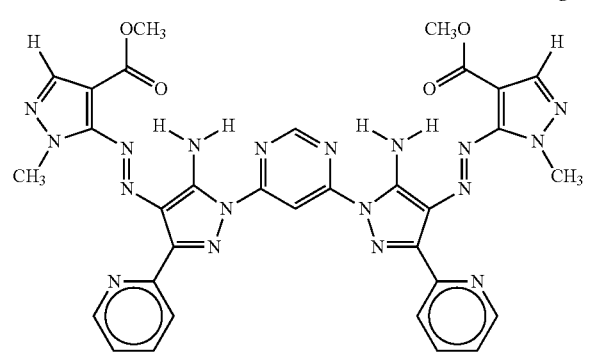
Figure 9:
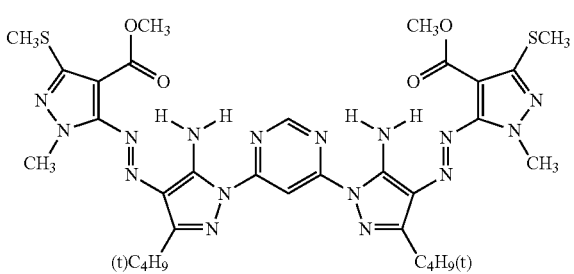
Figure 10:
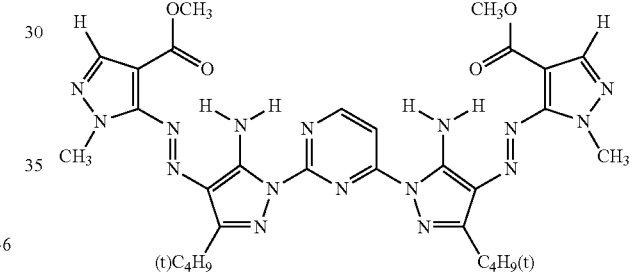
Figure 6:
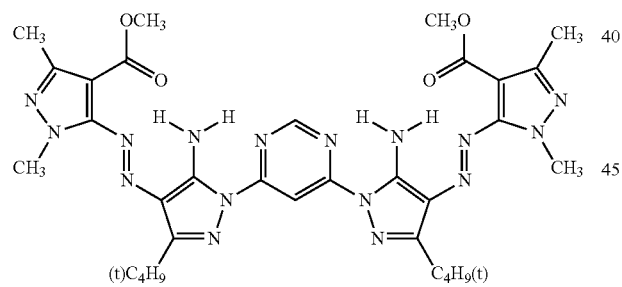
Figure 11:
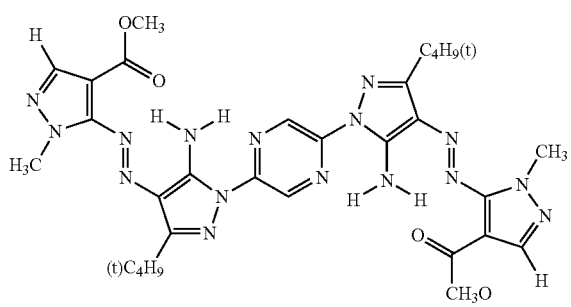
Figure 7:
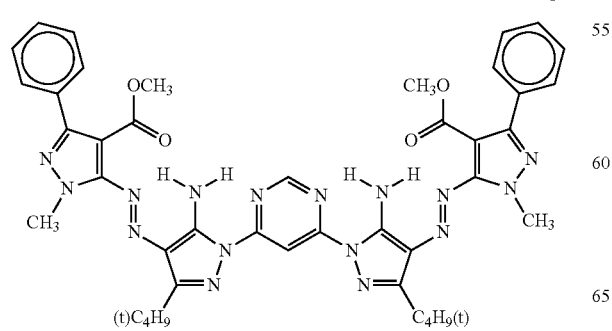
Figure 12:
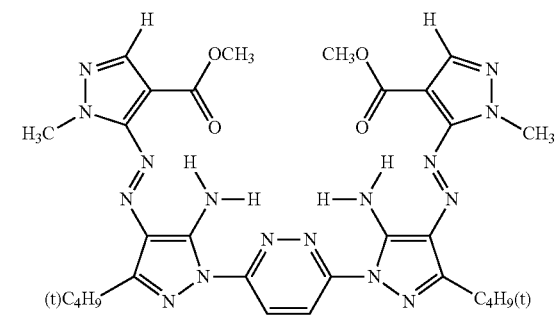
Figure 13:
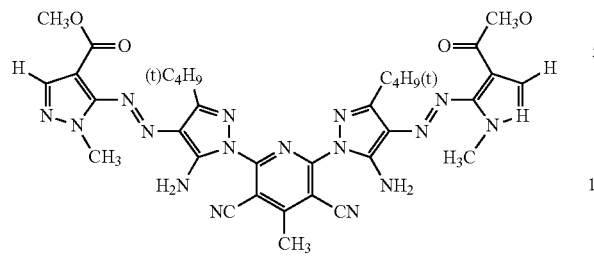
Figure 14:
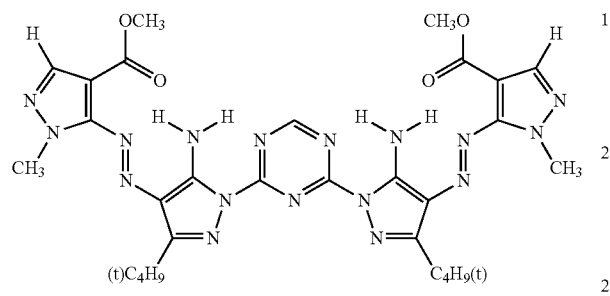
Figure 15:
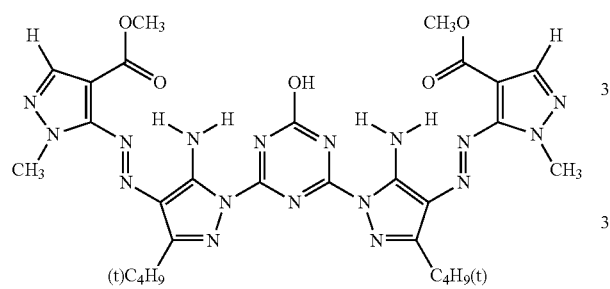
Figure 16:
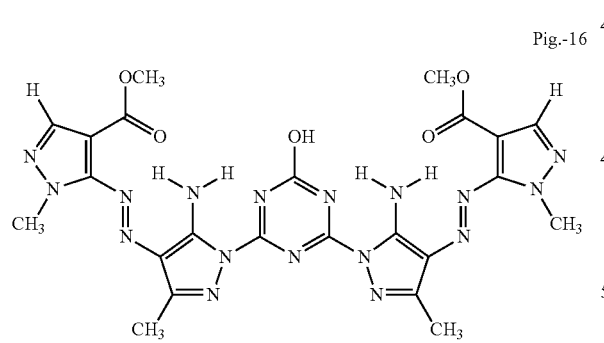
Figure 17:
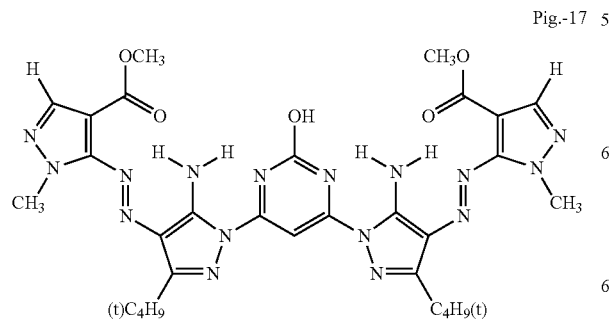
Figure 18:
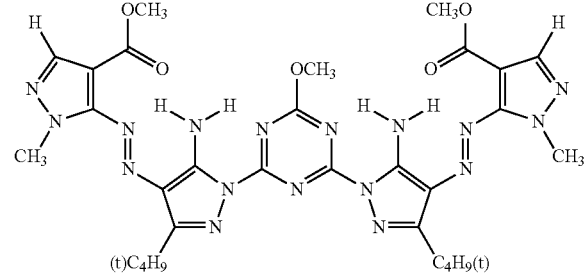
Figure 19:
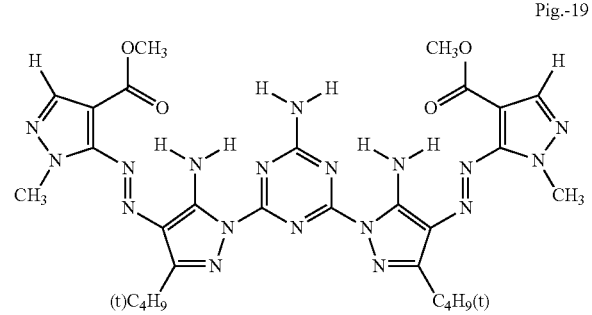
Figure 20:
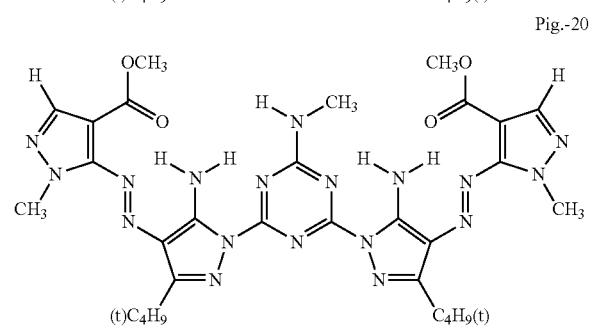
Figure 21:
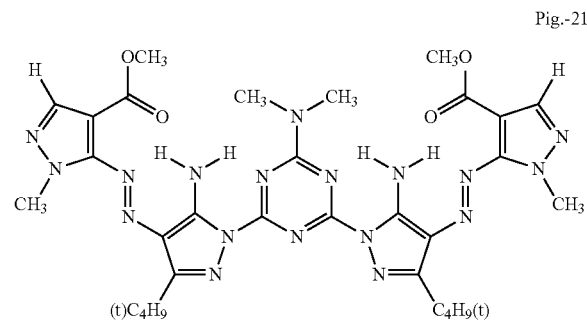
Figure 22:
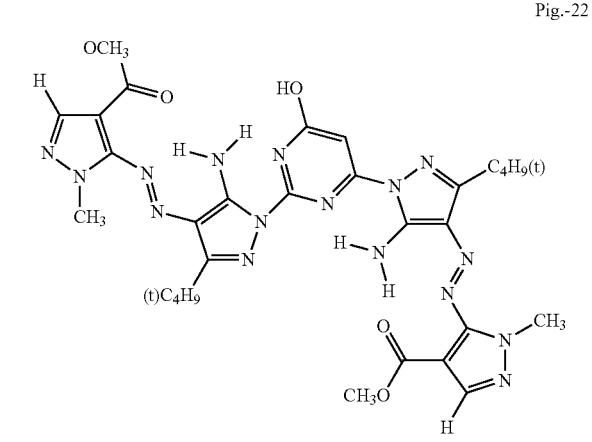
Figure 23:
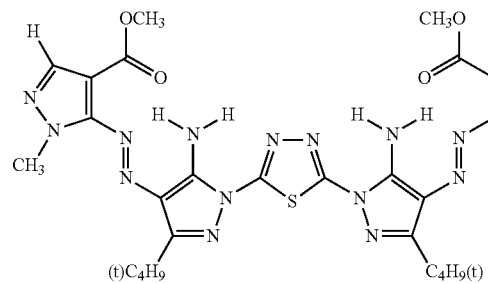
Figure 24:
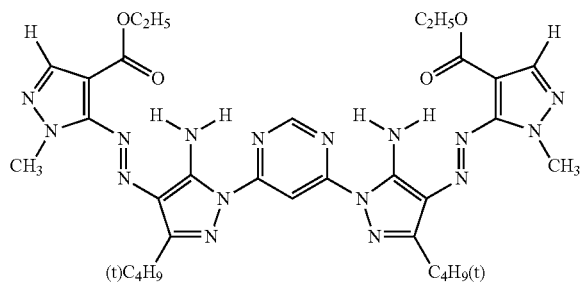
Figure 25:
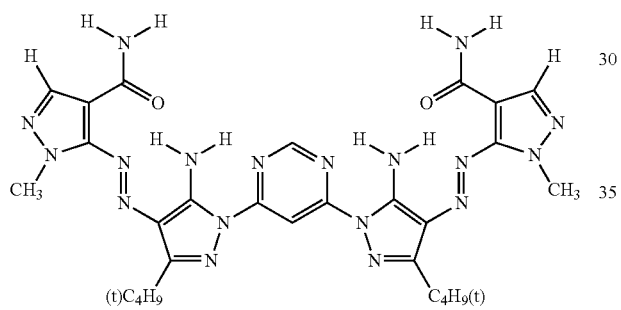
Figure 26:
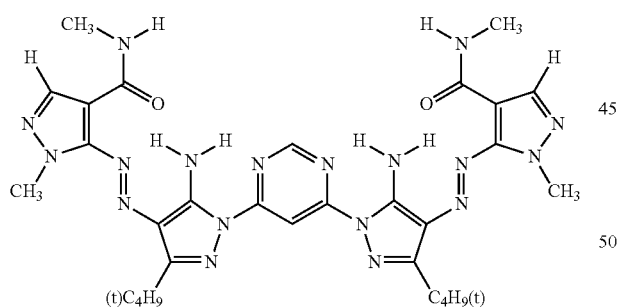
Figure 27:
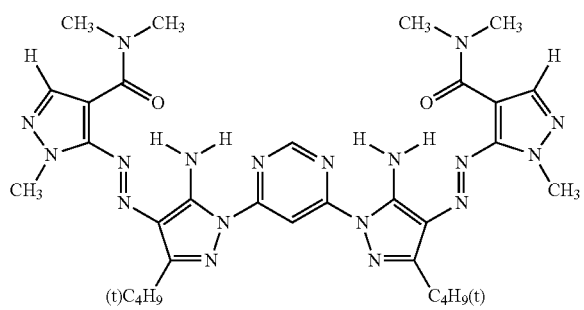
Figure 28:
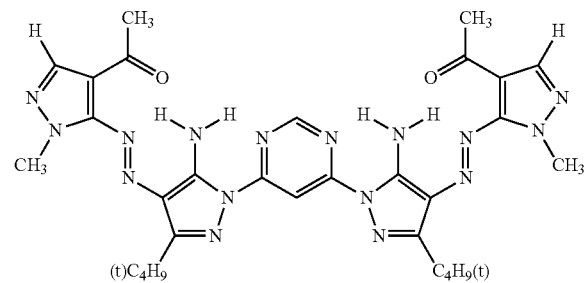
Figure 29:
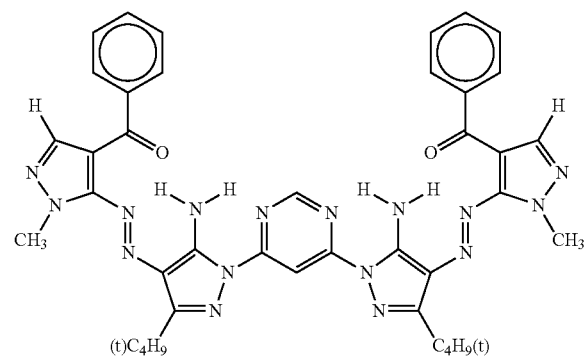
Figure 30:
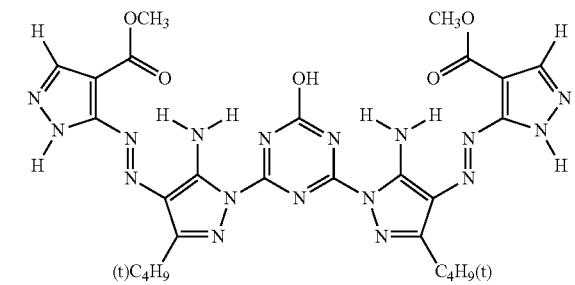
Figure 31:
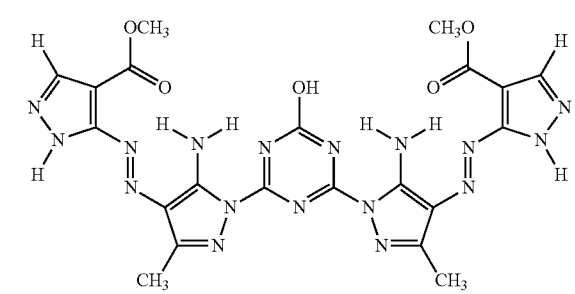
Figure 32:
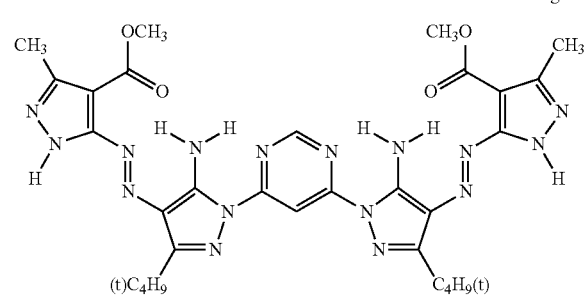
Figure 33:
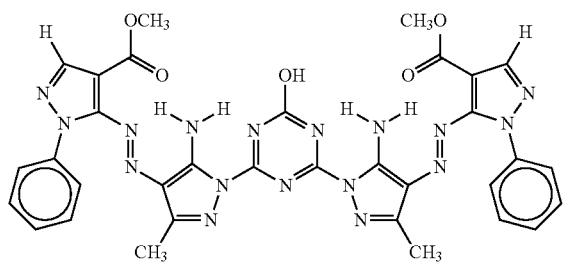
Figure 34:
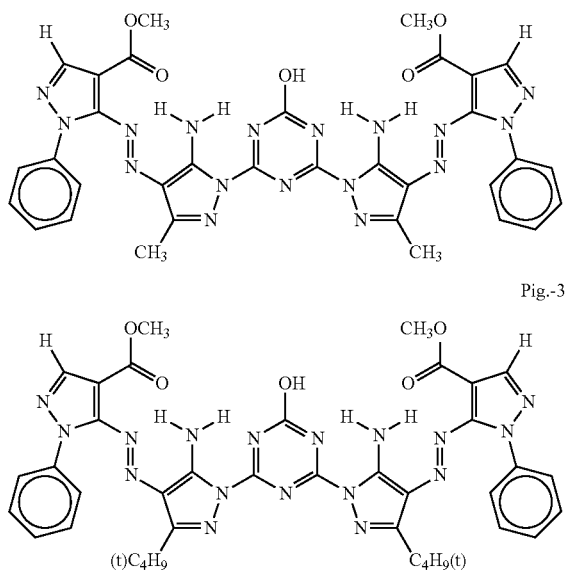
Figure 35:
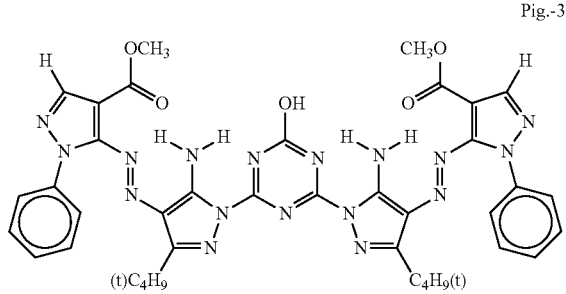
Figure 36:
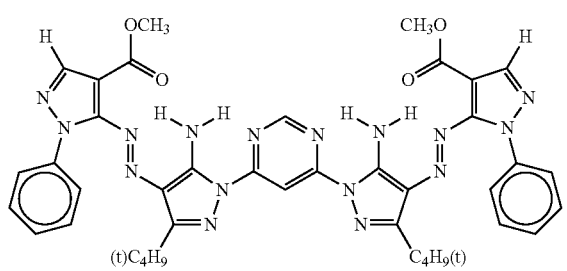
Figure 37:
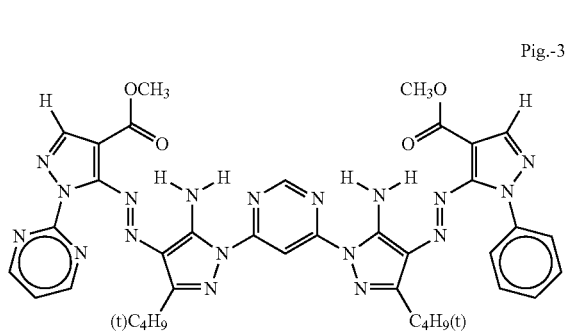
Figure 38:
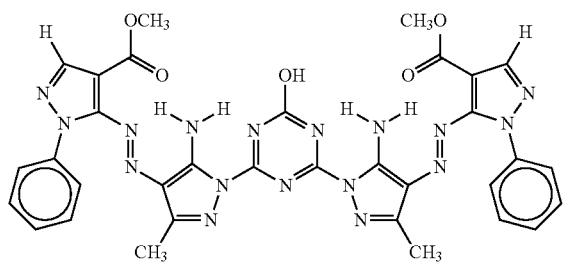
Figure 39:
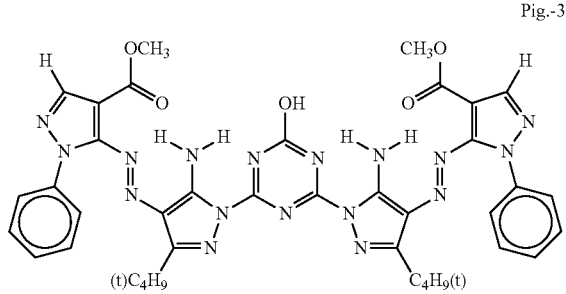
Figure 40:
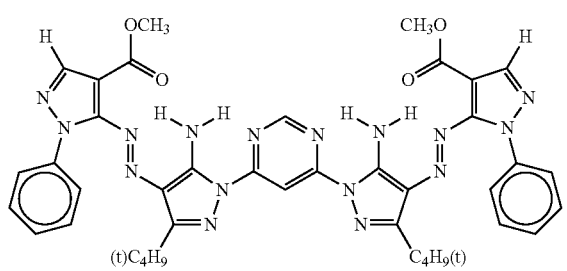
Figure 41:
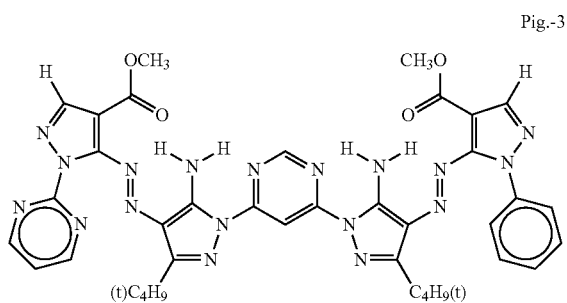
Figure 42:
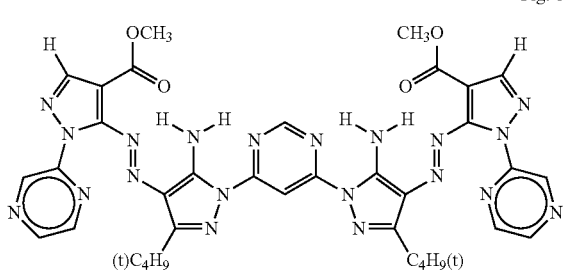

| Azo Pigment of Invention | X-ray Diffraction Pattern with characteristic Cu Kα line |
| --- | --- |
| Pig.-12 | FIG. 7 |
| Pig.-15 | FIG. 8 |
| Pig.-16 | FIG. 9 |
| Pig.-19 | FIG. 10 |
| Pig.-21 | FIG. 11 |
| Pig.-24 | FIG. 12 |
| Pig.-25 | FIG. 13 |
| Pig.-26 | FIG. 14 |
| Pig.-30 | FIG. 15 |
| Pig.-31 | FIG. 16 |
| Pig.-32 | FIG. 17 |
| Pig.-33 | FIG. 18 |
| Pig.-34 | FIG. 19 |

Synthesis Examples 111 to 113, and Comparative Synthesis Examples 1 and 2

20 parts of methyl ethyl ketone, 10% of the polymerization chain transfer agent shown in Table 2, and 10% of 200 parts of each monomer shown in Table 2 are placed in a reaction vessel, followed by mixing and conducting sufficient replacement with nitrogen gas to obtain a mixed solution.

On the other hand, the remaining 90% monomer shown in Table 2 is placed in a dropping funnel, and 90% of the polymerization chain transfer agent shown in Table 2, 60 parts of methyl ethyl ketone, and 1 parts of 2,2'-azobis(2,4-dimethylvaleronitrile) (polymerization initiator) are added thereto, followed by mixing and conducting sufficient replacement with nitrogen gas to obtain a mixed solution.

The temperature of the mixed solution in the reaction vessel is raised to 65° C. under stirring a nitrogen atmosphere, and then the mixed solution in the dropping funnel is gradually dropwise added thereto in 3 hours. Two hours after completion of the dropwise addition at 65° C., a solution of 0.3 part of 2,2'-azobis(2,4-dimethylvaleronitrile) in 5 parts of methyl ethyl ketone is added thereto, followed by ripening for 2 hours at 65° C. and then for 2 hours at 70° C. to obtain a polymer solution.

Part of the thus-obtained polymer solution is isolated by drying at 105° C. for 2 hours under reduced pressure to thereby remove the solvent. The weight-average molecular weight of the polymer is measured by gel permeation chromatography using, as a solvent, dimethylformamide containing 60 mmol/L of phosphoric acid and 50 mmol/L of lithium bromide and using polystyrene as a standard substance.

Additionally, details of the compounds shown in Table 2 are as follows.

Benzyl methacrylate: manufactured by Wako Pure Chemical Industries, Ltd.; reagent Octoxypolyethylene glycol polypropylene glycol monomethacrylate (average addition mole number of ethylene oxide=6; average mole number of propylene oxide=6; 2-ethylhexyl at the end): manufactured by NOF CORPORATION; trade name: Blemmer 50POEP-800B Methacrylic acid: manufactured by Wako Pure Chemical Industries, Ltd.; reagent Styrene macromere: manufactured by Toagosei Co., Ltd.; trade name: AS-6S; number-average molecular weight: 6,000; polymerizable functional group: methacryloyloxy group Styrene: manufactured by Wako Pure Chemical Industries, Ltd.; reagent

TABLE 2

|  |  | Synthesis Example 111 | Synthesis Example 112 | Synthesis Example 113 | Comparative Synthesis Example 1 | Comparative Synthesis Example 2 |
|---|---|---|---|---|---|---|
| Monomer Formulation | Benzyl methacrylate | 38 | 38 | 38 | 38 | — |
|  | Octoxypropylene glycol polypropylene glycol mono-methacrylate | 30 | 30 | 30 | 30 | 30 |
|  | Methacrylic acid | 7 | 7 | 7 | 7 | 7 |
|  | Styrene macromere | 25 | 25 | 25 | 25 | 25 |
|  | Styrene | — | — | — | — | 38 |
| Chain transfer agent | 1-Thioglycerol (part) | 0.6 | — | — | — | 0.6 |
|  | 3-Mercapto-propionic acid (part) | — | 0..6 | — | — | — |
|  | Mercaptosuccinic acid (part) | — | — | 0.9 | — | — |
|  | 2-Mercaptoethanol (part) | — | — | — | 0.3 | — |
| Weight-average molecular weight |  | 100,000 | 134,4000 | 108,000 | 85,000 | 100,500 |

Example 1

35 parts of the polymer obtained by drying under reduced pressure the polymer solution obtained in Synthesis Example 1, and a neutralizing agent (N sodium hydroxide aqueous solution) is added thereto in a given amount (neutralization degree: 75%) to neutralize the salt-forming group.

65 parts of the illustrative compound (Pig.-1) of the invention and 150 parts of deionized water are added thereto, and the resulting mixture is mixed by using DISPER, followed by 20-pass treatment in a disperser (microfluidizer M-140K at 200 MPa).

120 parts of deionized water is added to the thus-obtained kneaded product and, after stirring, methyl ethyl ketone is removed at 60° C. under reduced pressure and, further, part of water is removed, followed by filtering the product using a 25-mL, needle-free syringe (manufactured by TERUMO CORPORATION) provided with a 5-μm filter (acetylcellulose film; outer diameter: 2.5 cm; manufactured by FUJIFILM CORPORATION) to remove coarse particles. Thus, there is obtained an aqueous dispersion of pigment-containing, water-insoluble graft polymer particles having a solid component concentration of 20%.

To the thus-obtained aqueous dispersion of pigment-containing, water-insoluble graft polymer particle are added components shown in Table 3, and the resulting mixed solution is filtered using a 25-mL, needle-free syringe (manufactured by TERUMO CORPORATION) provided with a 1.2-μm filter (acetylcellulose film; outer diameter: 2.5 cm; manufactured by FUJIFILM CORPORATION) to remove coarse particles. Thus, there is obtained an aqueous ink 1 shown in Table 3. Additionally, details of the compounds shown in Table 2 are as follows.

TEGMBE: triethylene glycol monobutyl ether (penetrant)
SURFYNOL 65: nonionic active agent; manufactured by Air Products
Proxel XL2: antibacterial agent; manufactured by Avecia

Example 2

An aqueous ink 2 shown in Table 3 is obtained in the same manner as in Example 1 except for using the polymer solution obtained in Synthesis Example 112 in place of the polymer solution obtained in Synthesis Example 111.

Example 3

An aqueous ink 3 shown in Table 3 is obtained in the same manner as in Example 1 except for using the polymer solution obtained in Synthesis Example 113 in place of the polymer solution obtained in Synthesis Example 111.

Comparative Example 1

A comparative aqueous ink 1 shown in Table 3 is obtained in the same manner as in Example 1 except for using the polymer obtained in Comparative Synthesis Example 1 in place of the polymer solution obtained in Synthesis Example 111.

Comparative Example 2

A comparative aqueous ink 2 shown in Table 3 is obtained in the same manner as in Example 1 except for using the polymer obtained in Comparative Synthesis Example 2 in place of the polymer solution obtained in Synthesis Example 111.

Example 4

An aqueous ink 4 shown in Table 4 is obtained in the same manner as in Example 1 except for using Pig. 12 in place of Pig. 1.

Example 5

An aqueous ink 5 shown in Table 4 is obtained in the same manner as in Example 1 except for using Pig. 18 in place of Pig. 1.

Example 6

An aqueous ink 6 shown in Table 4 is obtained in the same manner as in Example 1 except for using Pig. 25 in place of Pig. 1.

Comparative Example 3

A comparative aqueous ink 3 shown in Table 4 is obtained in the same manner as in Example 1 except for using C.I.PY74 (trade name of Iralite YELLOW GO manufactured by Chiba Speciality Co., Ltd.) in place of Pig. 1.

Comparative Example 4

A comparative aqueous ink 4 shown in Table 4 is obtained in the same manner as in Example 1 except for using C.I.PY155 (trade name of INKJET YELLOW 4G VP2532 manufactured by Clariant Corporation) in place of Pig. 1.

Next, performance of the inks obtained in each of Examples and Comparative Examples is measured according to the following methods. Results are shown in Tables 3 and 4.

(1) Ejection Stability

The aqueous inks described above are put in a PET-made vessel and, after airtight closing, left for aging in an environment of 65° C. for 3 weeks. Using DMP-2831 Printer manufactured by Fujifilm Dimatix Inc. as the inkjet recording apparatus, 10-cm lines are printed with an ink droplet amount of 2 pL at an ejection frequency of 20 kHz in nozzle array direction×delivery direction of 16×1200 dot/25.4 mm. As the recording medium, "Gasai" Photofinishing Pro produced by Fujifilm Corp. is used. The distance between lines at a position 5 cm apart from the hitting initiation part on the printed sample is measured by Dot Analyzer DA-6000 manufactured by Oji Scientific Instruments, and the standard deviation thereof is calculated and used for the evaluation of the accuracy in ejection direction.

A: The standard deviation is less than 3 μm.
B: The standard deviation is from 3 μm to less than 4 μm.
C: The standard deviation is from 4 μm to less than 5 μm.
D: The standard deviation is 5 μm or more.

(2) (Printing Density)

A yellow mono-color image having a stepwise density is printed using the above-described aqueous ink and using, as an inkjet recording apparatus, PX-V630 manufactured by Seiko Epson Corporation. As a recording medium, "Gasai" Photofinishing Pro produced by Fujifilm Corp. is used. The density is measured by means of a reflection densitometer (GRETAG MACBETH Spectrolino) to evaluate OD (Optical Density) in the gradation area and in the solid image area.

OD (Optical Density) in the solid image area is evaluated according to the following criteria. Results are shown in Tables 3 and 4.

A: OD≥2.0
B: 2.0>OD≥1.8
C: 1.8>OD≥1.5
D: 1.5>OD (3) (Light Fastness)

The above-described print is irradiated for 14 days using a xenon weather meter (manufactured by Suga Test Instruments Co., Ltd.) under the conditions of 9.9 kw and a filter and, with the image area having an OD of 1 before irradiation, the colorant residual ratio of [(density after irradiation/density before irradiation)×100%] is determined to evaluate light fastness. Results are shown in Tables 3 and 4.

A: The colorant residual ratio is 95% or more.
B: The colorant residual ratio is from 85% to less than 95%.
C: The colorant residual ratio is from 70% to less than 85%.
D: The colorant residual ratio is from 50% to less than 70%.
E: The colorant residual ratio is less than 50%.

TABLE 3

| | | Example 1 Ink 1 | Example 2 Ink 2 | Example 3 Ink 3 | Comparative Example 1 Comparative Ink 1 | Comparative Example 2 Comparative Ink 2 |
|---|---|---|---|---|---|---|
| Formulation of Ink | Kind of polymer particles | Synthesis Example 111 | Synthesis Example 112 | Synthesis Example 113 | Comparative Synthesis Example 1 | Comparative Synthesis Example 2 |
| | Degree of neutralization of polymer | 75 | 75 | 75 | 75 | 75 |
| | Solid content (% by weight of aqueous dispersion | 7.7 | 7.7 | 7.7 | 7.7 | 7.7 |
| | Glycerin (% by weight) | 5 | 5 | 5 | 5 | 5 |
| | TEGMBE (% by weight) | 5 | 5 | 5 | 5 | 5 |
| | Surfynol 465 (% by weight) | 1 | 1 | 1 | 1 | 1 |
| | Proxel KL2 (% by weight) | 0.3 | 0.3 | 0.3 | 0.3 | 0.3 |
| | Deionized water (% by weight) | 81 | 81 | 81 | 81 | 81 |
| Evaluation | Ejection stability | A | A | A | C | C |
| | Printing density | B | B | B | B | B |
| | Light fastness | A | A | A | A | A |

It is seen from the results shown in Table 3 that the inks obtained in Examples 1 to 3 give high printing density when printed on the inkjet exclusive paper and are excellent in ejection stability. It is seen that the printed products have high light fastness of image.

TABLE 4

| | | Example 4 Ink 4 | Example 5 Ink 5 | Example 6 Ink 6 | Comparative Example 3 Comparative Ink 3 | Comparative Example 4 Comparative Ink 4 |
|---|---|---|---|---|---|---|
| Formulation of Ink | Kind of polymer particles | Synthesis Example 111 | Synthesis Example 111 | Synthesis Example 111 | Synthesis Example 111 | Synthesis Example 111 |

TABLE 4-continued

|  |  | Example 4 Ink 4 | Example 5 Ink 5 | Example 6 Ink 6 | Comparative Example 3 Comparative Ink 3 | Comparative Example 4 Comparative Ink 4 |
|---|---|---|---|---|---|---|
|  | Degree of neutralization of polymer | 75 | 75 | 75 | 75 | 75 |
|  | Solid content (% by weight of aqueous dispersion | 7.7 | 7.7 | 7.7 | 7.7 | 7.7 |
|  | Glycerin (% by weight) | 5 | 5 | 5 | 5 | 5 |
|  | TEGMBE (% by weight) | 5 | 5 | 5 | 5 | 5 |
|  | Surfynol 465 (% by weight) | 1 | 1 | 1 | 1 | 1 |
|  | Proxel KL2 (% by weight) | 0.3 | 0.3 | 0.3 | 0.3 | 0.3 |
|  | Deionized water (% by weight) | 81 | 81 | 81 | 81 | 81 |
| Evaluation | Ejection stability | A | A | A | B | C |
|  | Printing density | B | A | A | B | D |
|  | Light fastness | B | A | B | E | D |

It is seen from the results shown in Table 4 that the inks obtained in Examples 4 to 6 give high printing density when printed on the inkjet exclusive paper and are excellent in ejection stability. It is seen that the printed products have high light fastness of image.

Industrial Applicability

According to the present invention, there can be provided an aqueous ink for inkjet recording, which contains an azo pigment showing excellent ink ejection properties and realizing good hue and high print density (high tinctorial strength), and high image fastness of printed products (for example, light fastness, gas fastness, heat fastness, and water fastness (particularly, light fastness for outdoor use)), a vinyl polymer, and an aqueous medium, and to an aqueous pigment dispersion having excellent dispersion stability and storage stability.

Although the invention has been described in detail and by reference to specific embodiments, it is apparent to those skilled in the art that it is possible to add various alterations and modifications insofar as the alterations and modifications do not deviate from the spirit and the scope of the invention.

This application is based on a Japanese patent application filed on Sep. 4, 2009 (Japanese Patent Application No. 2009-205359) and a Japanese patent application filed on Sep. 2, 2010 (Japanese Patent Application No. 2010-197182), and the contents thereof are incorporated herein by reference.

The invention claimed is:

1. An aqueous pigment dispersion comprising A and B, wherein A is an azo pigment represented by the following general formula (1) and in a crystal form having at least one characteristic peak at Bragg angles (2θ) of 5 to 15° and 20 to 30° in X-ray diffraction with characteristic Cu Kα line, a tautomer thereof, or a salt or hydrate thereof; and B is a vinyl polymer containing a structural unit represented by the following general formula (A1), a structural unit derived from a salt-forming group-containing monomer (a), and a structural unit derived from a monomer selected from a styrene series macromer (b) and a hydrophobic monomer (c), provided that the water-insoluble vinyl polymer has at least either of 2 or more hydroxyl groups and 1 or more carboxyl groups at the end of the main chain:

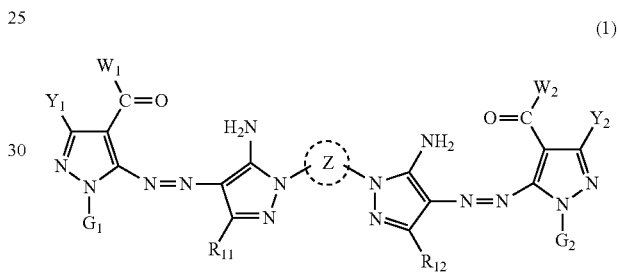

(1)

wherein, Z represents a 5- to 6-membered heterocyclic ring, $Y_1$, $Y_2$, $R_{11}$, and $R_{12}$ each independently represents a hydrogen atom or a substituent, $G_1$ and $G_2$ each independently represents a hydrogen atom, an alkyl group, an aralkyl group, an alkenyl group, an alkynyl group, an aryl group, or a heterocyclic group, and $W_1$ and $W_2$ each independently represents an alkoxy group, an amino group, an alkyl group, or an aryl group);

(A1)

wherein, $R^1$ represents a hydrogen atom or a methyl group, and $R^2$ represents an arylalkyl group which may have a substituent.

2. The aqueous pigment dispersion according to claim 1, wherein $W_1$ and $W_2$ in the azo pigment represented by the general formula (1), a tautomer thereof, or a salt or hydrate thereof each independently represents an alkoxy group containing a total carbon atoms of 5 or less, an amino group, or an alkylamino group containing a total carbon atoms of 5 or less.

3. The aqueous pigment dispersion according to claim 1, wherein $G_1$ and $G_2$ in the azo pigment represented by the general formula (1), a tautomer thereof, or a salt or hydrate thereof each independently represents an alkyl group containing a total carbon atoms of 3 or less.

4. The aqueous pigment dispersion for inkjet recording according to claim 1,
wherein Z in the azo pigment represented by the general formula (1), a tautomer thereof, or a salt or hydrate thereof represents a 6-membered nitrogen-containing heterocyclic ring.

5. The aqueous pigment dispersion according to claim 1,
wherein the azo pigment represented by the general formula (1) is represented by the following general formula (10):

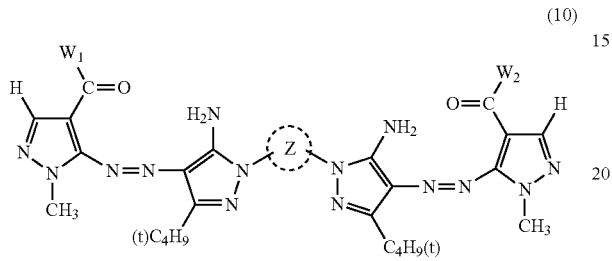

(10)

wherein, Z represents a 5- to 6-membered nitrogen-containing heterocyclic ring, and $W_1$ and $W_2$ each independently represents an alkoxy group, an amino group, an alkyl group, or an aryl group.

6. The aqueous pigment dispersion according to claim 5,
wherein the azo pigment represented by the general formula (10) is represented by the following general formula (11):

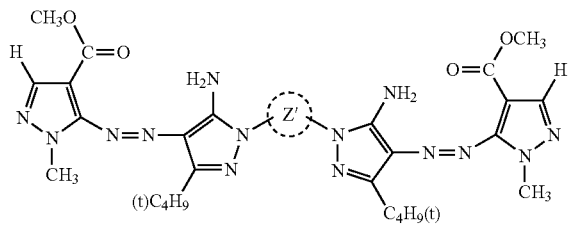

(11)

wherein, Z' represents a 6-membered nitrogen-containing heterocyclic ring.

7. The aqueous pigment dispersion according to claim 1,
wherein the azo pigment represented by the general formula (1), a tautomer thereof, or a salt or hydrate thereof contains at least one azo pigment represented by the following general formula (1a) and having characteristic X-ray peaks at Bragg angles (2θ±0.2°) in X-ray diffraction with characteristic Cu Kα line of 7.2° and 25.9 or a tautomer thereof:

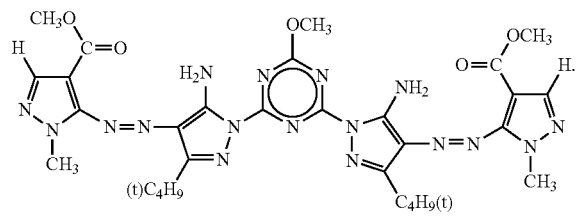

(1a)

8. The aqueous pigment dispersion according to claim 1,
wherein the azo pigment represented by the general formula (1), a tautomer thereof, or a salt or hydrate thereof contains at least one azo pigment represented by the following general formula (2a) and having characteristic X-ray peaks at Bragg angles (2θ±0.2°) in X-ray diffraction with characteristic Cu Kα line of 7.6°, 25.6°, and 27.7 or a tautomer thereof:

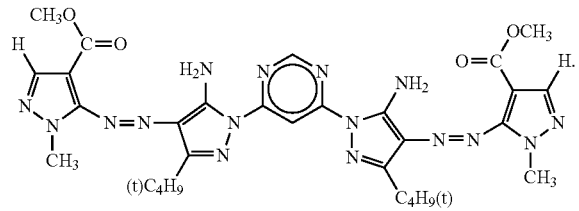

(2a)

9. The aqueous pigment dispersion according to claim 1,
wherein the azo pigment represented by the general formula (1), a tautomer thereof, or a salt or hydrate thereof contains at least one azo pigment represented by the following general formula (3a) and having characteristic X-ray peaks at Bragg angles (2θ±0.2°) in X-ray diffraction with characteristic Cu Kα line of 7.5°, 11.2°, 18.6°, 21.2°, and 23.9 or a tautomer thereof:

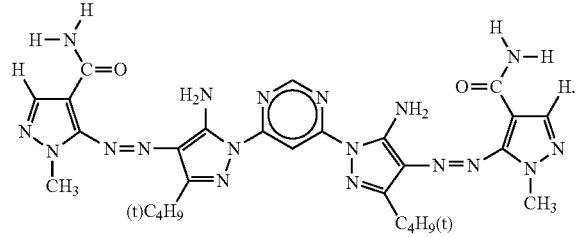

(3a)

10. The aqueous pigment dispersion according to claim 1,
wherein the structural unit represented by the general formula (A1) is a structural unit derived from benzyl (meth)acrylate.

11. The aqueous pigment dispersion according to claim 1,
wherein the styrene series macromer (b) is a styrene macromer having a polymerizable functional group at one end thereof.

12. The aqueous pigment dispersion according to claim 1,
wherein the water-insoluble vinyl polymer further contains a structural unit represented by the following general formula (A2):

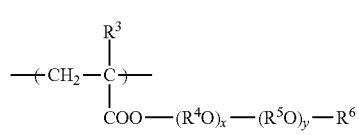

(A2)

wherein $R^3$ represents a hydrogen atom or a methyl group, $R^4O$ represents an oxypropylene group, $R^5O$ represents an oxyalkylene group containing 2 or 4 carbon atoms, $R^6$ represents a hydrogen atom, an alkyl group, or a phenyl group which may have an alkyl group, x and y each represents an average addition mole number, with each of y $R^5Os$ being the same or different from every other $R^5O$.

13. The aqueous pigment dispersion according to claim 1, which further contains an aqueous medium.

14. An aqueous ink for inkjet recording comprising the aqueous pigment dispersion described in claim 1.

* * * * *